(12) United States Patent
Kley

(10) Patent No.: US 7,571,638 B1
(45) Date of Patent: Aug. 11, 2009

(54) TOOL TIPS WITH SCANNING PROBE MICROSCOPY AND/OR ATOMIC FORCE MICROSCOPY APPLICATIONS

(76) Inventor: Victor B. Kley, 1119 Park Hills Rd., Berkeley, CA (US) 94708-1715

( * ) Notice: Subject to any disclaimer, the term of this patent is extended or adjusted under 35 U.S.C. 154(b) by 421 days.

(21) Appl. No.: 11/531,248

(22) Filed: Sep. 12, 2006

Related U.S. Application Data

(63) Continuation-in-part of application No. 11/382,651, filed on May 10, 2006, now abandoned.

(60) Provisional application No. 60/711,899, filed on Aug. 25, 2005, provisional application No. 60/707,840, filed on Aug. 11, 2005, provisional application No. 60/698,356, filed on Jul. 11, 2005, provisional application No. 60/679,926, filed on May 10, 2005.

(51) Int. Cl.
*G01B 7/34* (2006.01)
(52) U.S. Cl. .......................................................... 73/105

(58) Field of Classification Search ................. 250/306; 73/105
See application file for complete search history.

(56) References Cited

U.S. PATENT DOCUMENTS 5,877,412 A * 3/1999 Muramatsu et al. ........... 73/105

* cited by examiner

*Primary Examiner*—Kiet T Nguyen
(74) *Attorney, Agent, or Firm*—Townsend and Townsend and Crew LLP

(57) ABSTRACT

A micro-object is affixed to a mounting structure at a desired relative orientation. The micro-object may be a tool tip optimized to work with particular microscope objectives permitting the tip to be imaged along with the object surface and used to make measurements or modifications through a travel range along the microscope imaging axis equal to or nearly equal to the working distance of the given objective. The tool tip may have a lengths exceeding 80 microns, say up to several millimeters; even the longest tips can have widths of tens of microns.

12 Claims, 50 Drawing Sheets

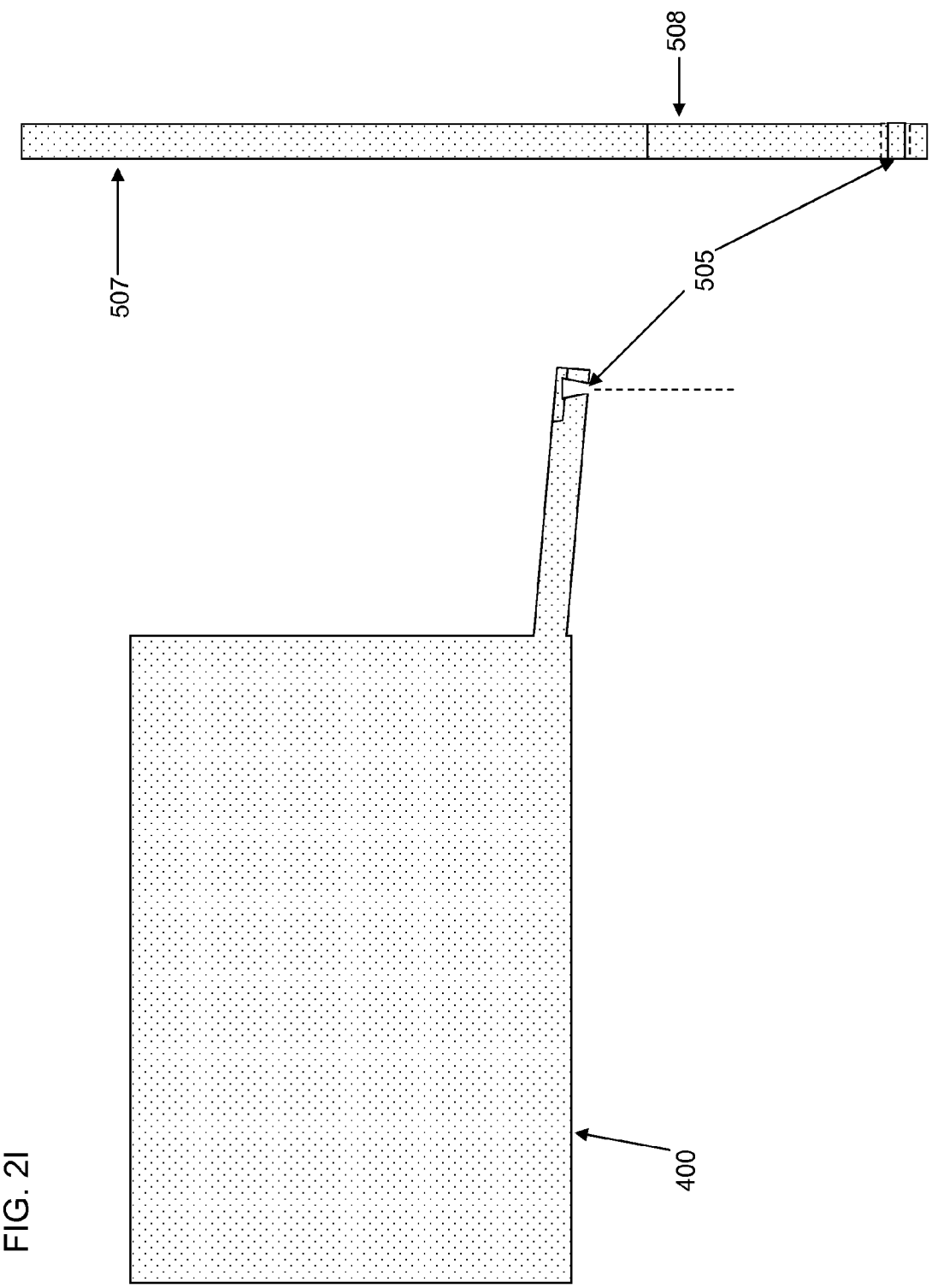

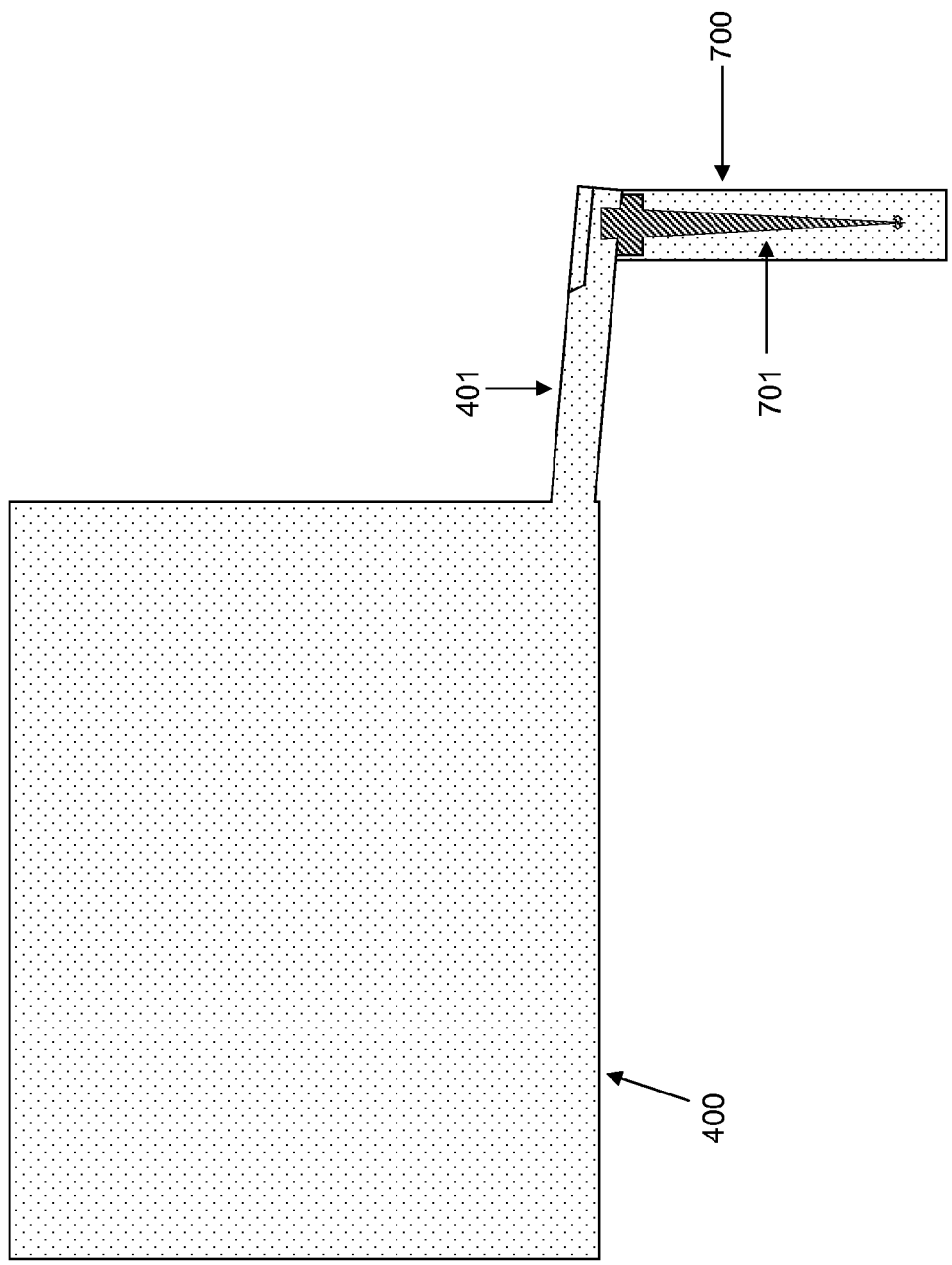

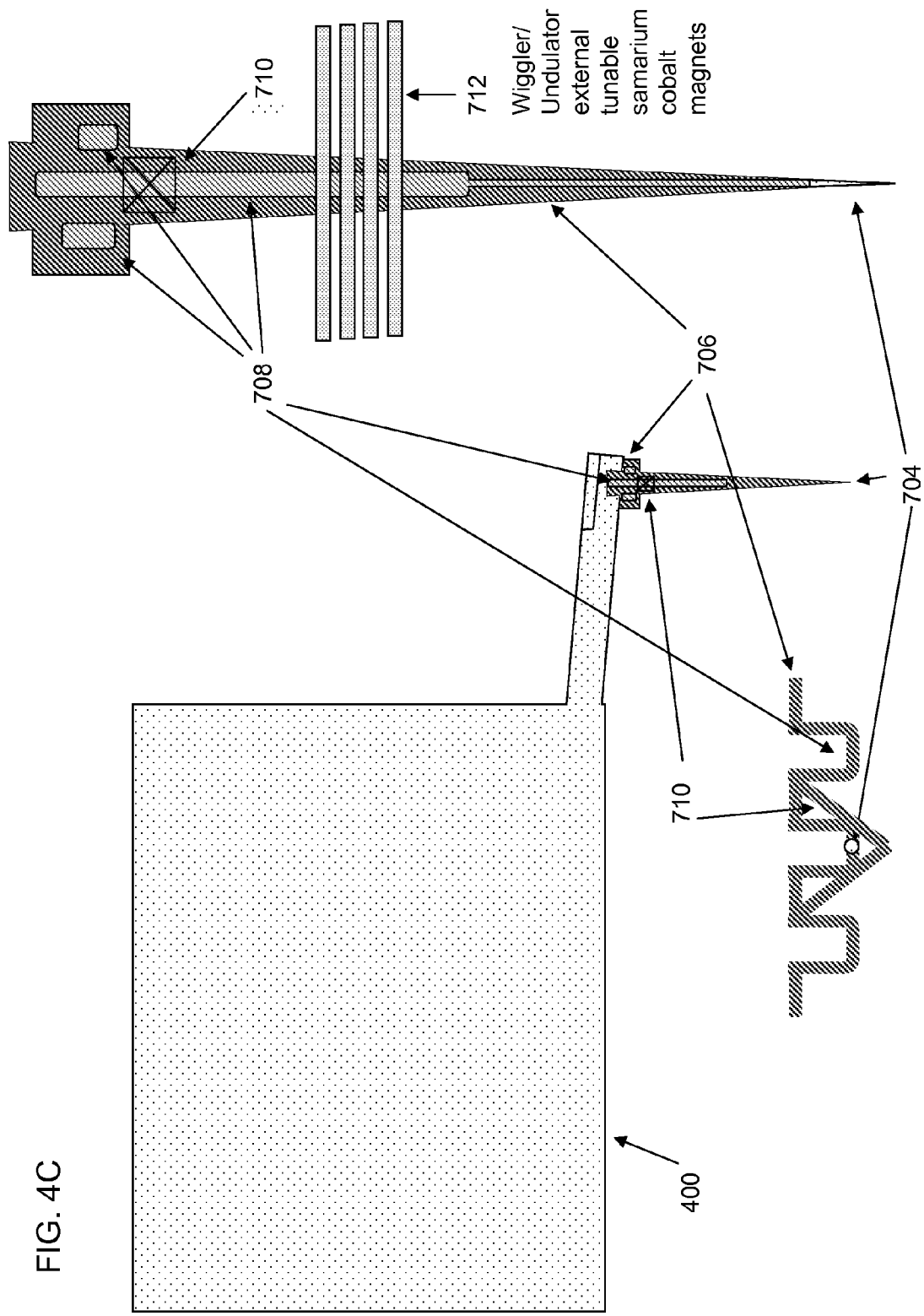

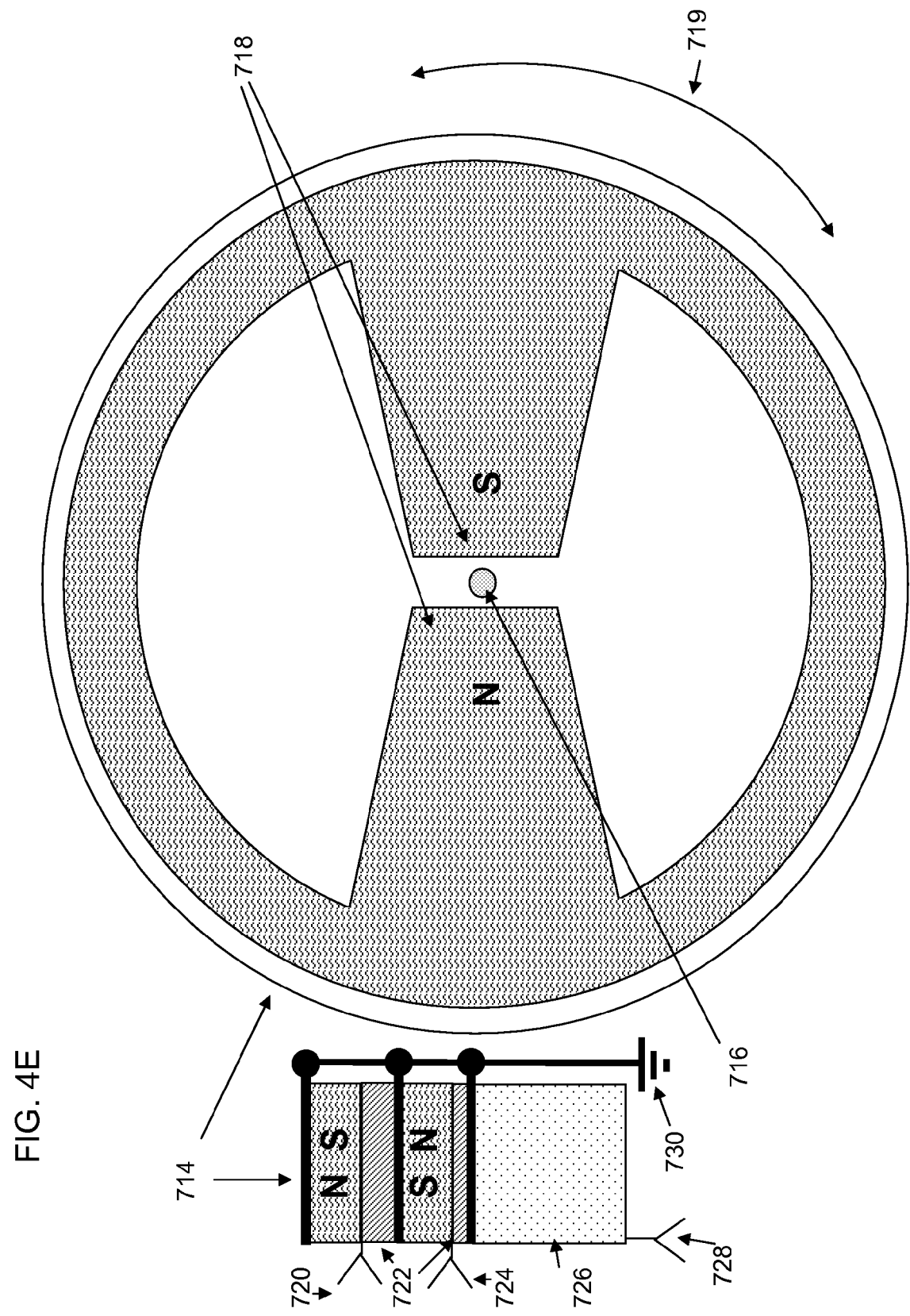

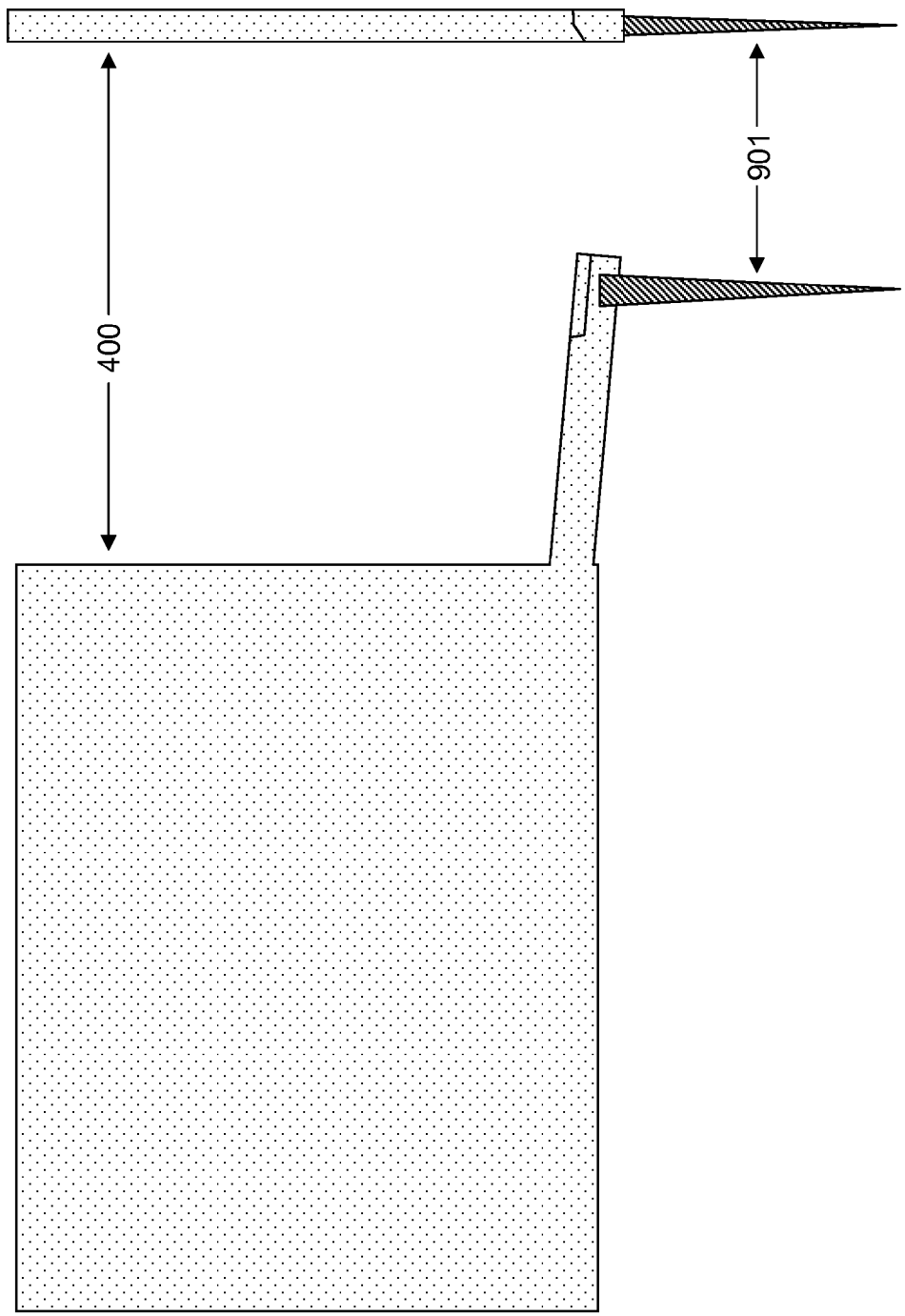

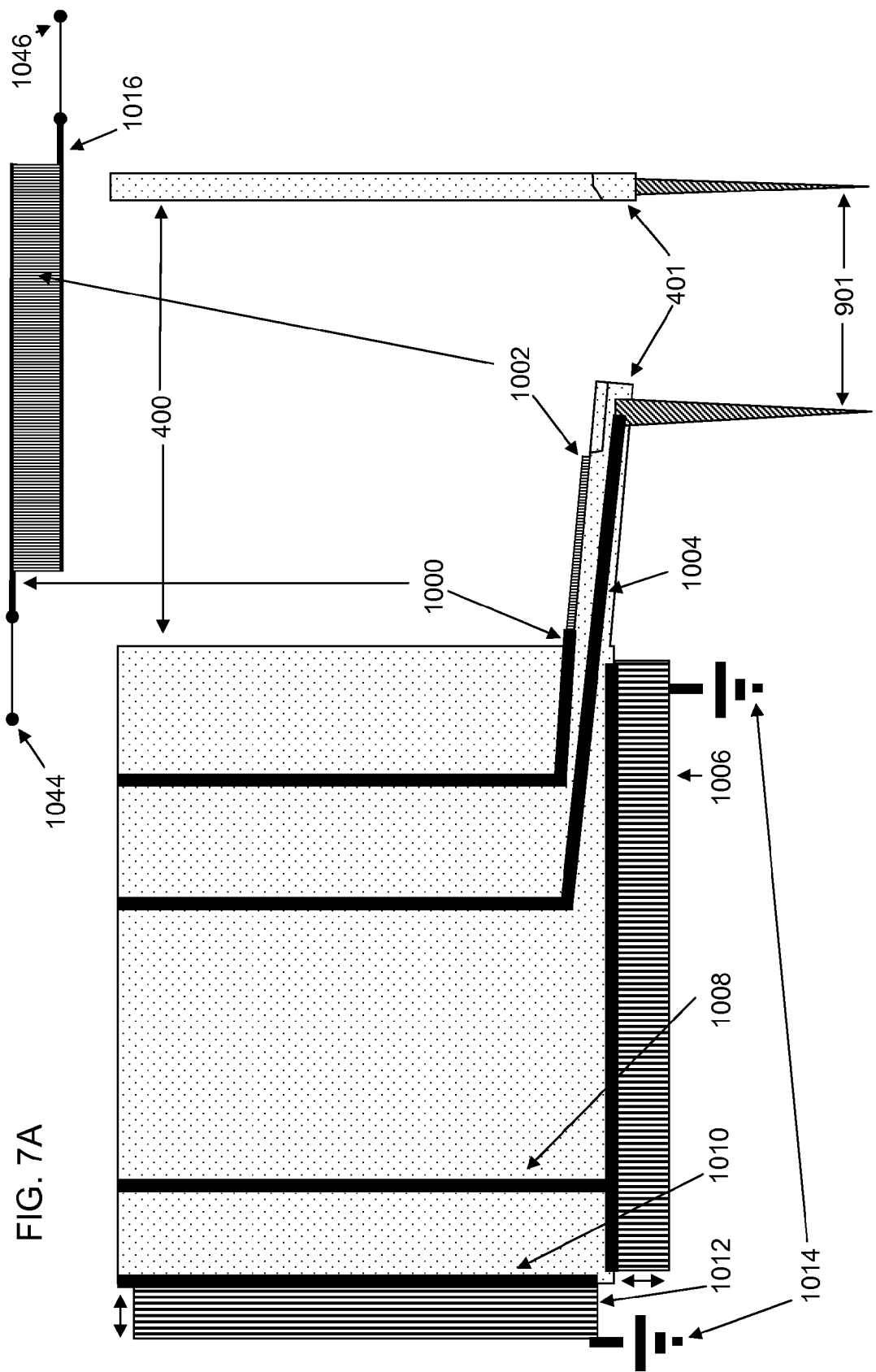

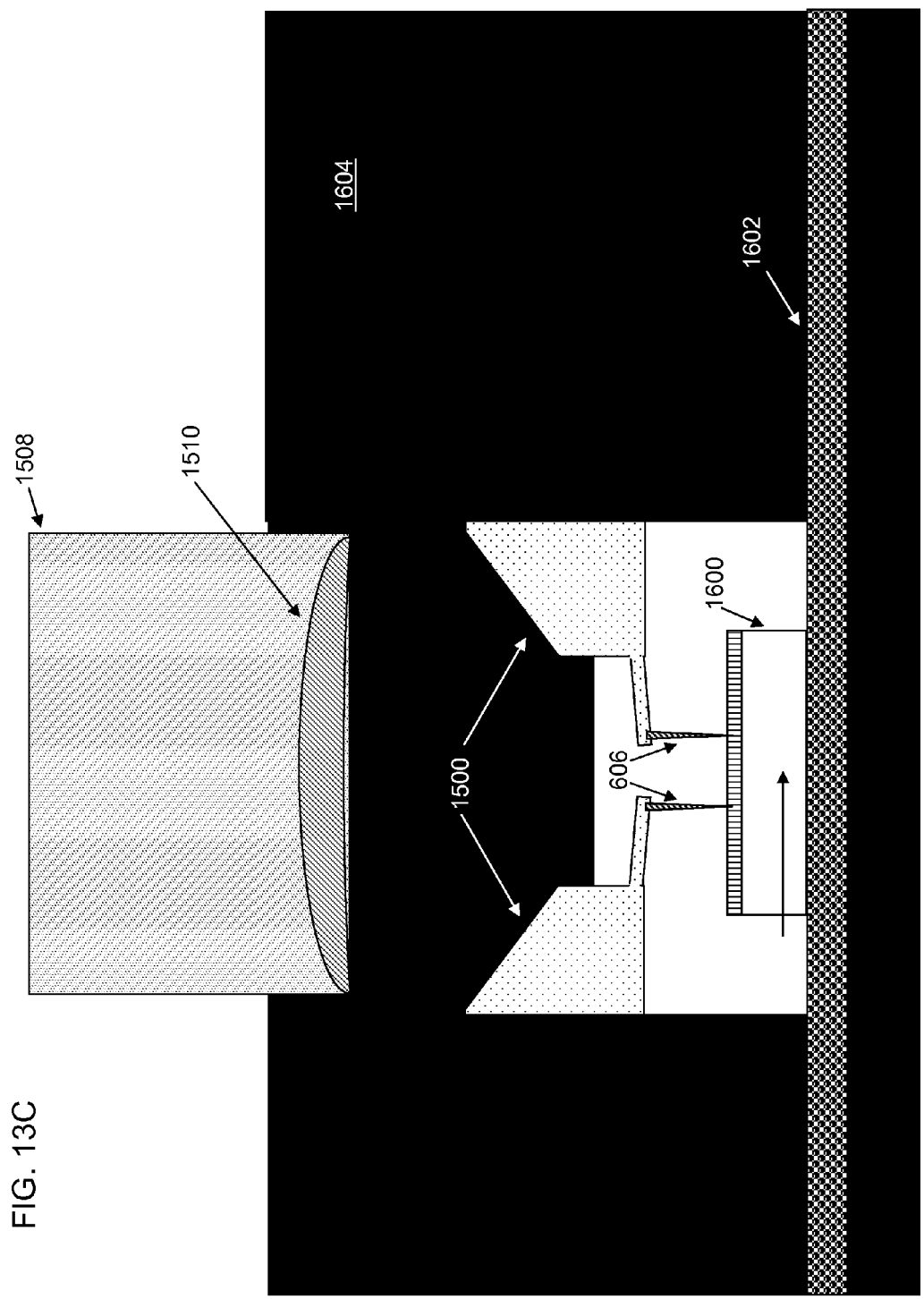

TOOL TIPS WITH SCANNING PROBE MICROSCOPY AND/OR ATOMIC FORCE MICROSCOPY APPLICATIONS

CROSS-REFERENCES TO RELATED APPLICATIONS

This application is a continuation-in-part of U.S. patent application Ser. No. 11/382,651, filed May 10, 2006, entitled "Tool Tips with Scanning Probe Microscopy and/or Atomic Force Microscopy Applications," which claims the benefit of each of the following four U.S. Provisional Applications:

Application No. 60/679,926, filed May 10, 2005, entitled "Manufacturing of Micro-Objects Such as Miniature Diamond Tool Tips";

Application No. 60/698,356, filed Jul. 11, 2005, entitled "Manufacturing of Micro-Objects Such as Miniature Diamond Tool Tips";

Application No. 60/707,840, filed Aug. 11, 2005, entitled "Manufacturing of Micro-Objects Such as Miniature Diamond Tool Tips"; and Application No. 60/711,899, filed Aug. 25, 2005, entitled "Manufacturing of Micro-Objects Such as Miniature Diamond Tool Tips."

BACKGROUND OF THE INVENTION

The present invention relates generally to the manufacture and handling of micro-objects such as shaped tool heads or tips, and more particularly to the manufacture of miniature tools incorporating or consisting of shaped structures.

Manufacturing and other processes pertaining to scanning probe microscopy, nanomachining, micromachining, machining, optics, biotechnology, and biomedicine often require highly specialized miniature tools. Such tools typically consist of a shaped tool head formed and parted from a diamond or other hard material work piece and mounted on a body or handle. Depending on the particular application, the spatial orientation of the tool head relative to the tool body, once mounted thereupon, may be critical to the usefulness of the miniature tool.

Execution of present methods for handling, aligning and mounting small structures, particularly structures smaller then 200 microns (referred to as micro-objects), is highly difficult and often results in uncertain orientation of the fine tool head structure relative to the tool body. Present methods for cantilever and tip manufacture also limit the length of tool pieces and make it necessary to provide substantial extra unused material in the tool head which can be expensive and limiting in the use of special high performance materials.

BRIEF SUMMARY OF THE INVENTION

Embodiments of the present invention address some or all of the above difficulties. Some embodiments may provide further advantages, including any or all of those listed herein.

It is further desirable to be able to configure tool body or cantilever structures which have a minimum cross section to electromagnetic radiation, electrons, and ions while being coaxial and visible to systems such as optical, uv, x-ray microscopes and/or electron and/or ion microscopes and/or beams. It is also desirable to provide a means to make the tool piece or tip at any angle with respect to the main body and/or cantilever.

Further it is desirable to make the tool body and/or tool piece from expensive materials such as sapphire, diamond including diamond like carbon, amorphous, polycrystalline, nanocrystalline and single crystal diamond, silicon, silicon carbide, silicon nitride or boron nitride and to conserve and limit the amount of such material used in the manufacturing process. It is further desirable to make numerous special variations with out requiring the production of large numbers of devices.

It is yet another desirable outcome to be able to define tool pieces or tips whose length is very large compared to the tool body and millimeters for bodies whose width is only a few tens of microns. It is desirable to make tool bodies with integrated tip pieces for various precise and special applications such as indentation by limiting the secondary shaping or sharpening of the tool piece to the minimum material removal consistent with the application.

It is also desirable to be able to assemble multiple independent tool bodies and tool pieces or cantilever, substrate and tip so as to make an array of tip assemblies for inspection, manipulation and modification or interaction with various subjects including the testing of semiconductor chips, biochips and reagent or biochemical trays in arrays.

Additionally it is desirable to be able to detect SPM and particularly AFM interactions in two or three axis of action (X, Y, and Z). It is yet another desirable feature to permit operation of such systems in fluids such as water or oil with minimum interaction of the fluid with the cantilever.

Yet another aim of some embodiments of this invention is to configure custom systems at very high performance and minimum tooling costs to test semiconductor chips, biochips and special operations such as inserting or removing material from wells for chemical, biological or material testing or evaluation and development.

It is also a purpose of some embodiments of this invention to provide a tip, cantilever and body structure which allows for the integration of the SPM and confocal and/or interferometric, ad/or electron beam and/or ion beam and/or x-ray and/or acoustic, and/or infrared, and/or ultraviolet microscopy.

It is another aim of some embodiments of this invention to provide a method for creating AFM and/or SPM bodies, cantilevers and tips which are optimized to work with particular microscope objectives permitting the tip to be imaged along with the object surface and used to make measurements or modifications through a travel range along the microscope imaging axis equal to or nearly equal to the working distance of the given objective.

By forming the entire tool body and tool piece from one slab of material whose thickness closely approximates the desired width of the cantilever a broad range of different designs can be implemented with minimum cost and tool development. Further a special shape can be designed and then material such as CVD diamond coated on the shape such that final finishing by other means such as lithographic wet or dry etching, ion milling and/or additions, electron beam milling and/or chemical mediation to add or subtract material, and/or nanolapping, and/or lapping and/or polishing and/or grinding or conventional machining including water jetting may be used alone or in combination to make the particular desired forms.

It should also be noted that in some embodiments using techniques described herein, AFM and/or SPM tool tips with lengths exceeding 80 microns can be fabricated.

Tip lengths which are long compared to the width of the cantilever may be imaged by suitably chosen x-ray, uv, infrared, optical, ion, or electron objectives while still permitting the direct imaging of the surface immediately below the tip and the tip itself and clear examples of such arrangements are provided. Thus a commercially available objective has a working distance of 1 mm with a power of 100× and a depth of field of 340 nanometers. For the later lens one embodiment of this invention provides a cantilever of width 50 microns at a height above the surface of 250 microns with an effective contrast reduction of 1.5% and no decrease in resolution (220 nanometers). This result is entirely due to the narrow cantilever and support structure (which is optimal for all objectives in the same commercial class—that is the body of the cantilever, body and tip assembly does not obtrude into the field of view for lower power objectives in a given range of such optics).

By providing an angled reflector AFM designers are freed up to locate laser and detector plus their optics in places not presently easily usable further this design permits the simultaneous sensing of two axis or even three if a third reflector is placed on the tip itself. Freedom to make a range of cantilevers and tips on one wafer run means that staggered structures may be configured to provide tip structures precisely as a process or test setup requires them while also permitting such structures to be packed side by side and provided with resonant ranges which are not harmonically coupled to the other components in the array, yet a single array component structure may be removed and replaced as necessary without the requirement to replace the entire array. In an alternative arrangement the light source for scan detection and/or the light sensor is built into the body, and/or cantilever and/or tip of the cantilever assembly and electrically or wirelessly connected to the other system components.

Further a one, two or three axis translation means such as a piezoelectric element may be placed on the cantilever assembly along the body in the x,y, and z directions to permit individual elements of a one, two or greater number array of such elements to be individually positioned, scanned, or manipulated to make measurements or modifications.

Further a drive element or series of drive elements such as the piezoelectric material ZnO may be placed on the cantilever and/or tip structure to provide an effective means of resonant actuation of the device in one, two or three axis. Alternatively all or some of the three axis of motion may be detected by tip contact (contact mode of operation well known in the SPM art) in that axis exclusive of the other axis detection scheme.

A further understanding of the nature and advantages of the present invention may be realized by reference to the remaining portions of the specification and the drawings.

BRIEF DESCRIPTION OF THE DRAWINGS

FIG. 2I is a side and bottom plan view of a tip body and cantilever with a tapered tip mounting socket which passes through the cantilever perpendicular to the axis of the tip.

FIG. 4A is a side plan view of a tip body, cantilever, integral tip mold, with molded material in place.

FIG. 4C is a side plan view of a tip body, cantilever, molded tip shaft, etched tip with an enlarged side plan view of the specific molded tip shaft form and etch formed tip and an enlarged bottom view of the tip and cross section of the tip shaft. FIG. 4C also shows a side cross section view of the magnet stack for external undulator magnets that can be used in some embodiments.

FIG. 4E is an enlarged side cross section view of a section of the tunable magnetic undulator, piezo undulator spacing tuner and the x-ray/uv detector. Also shown is a top plan view of one magnetic section showing the pole set, and the freedom to rotate the assembly to control linear polarity of the emitted radiation.

FIG. 6B shows a side plan view and front plan view showing the mold removed and the resulting formed tip.

FIG. 7A is a side plan view of the thin body, cantilever and tip along with piezoelectric positioning and resonant drive structures and conductive connections to the tip structure.

FIG. 13C is a side cross section view of the two arrays, well object, object translation means, and objective lens of an integrated viewing system.

DETAILED DESCRIPTION OF THE INVENTION

Figure 1A:
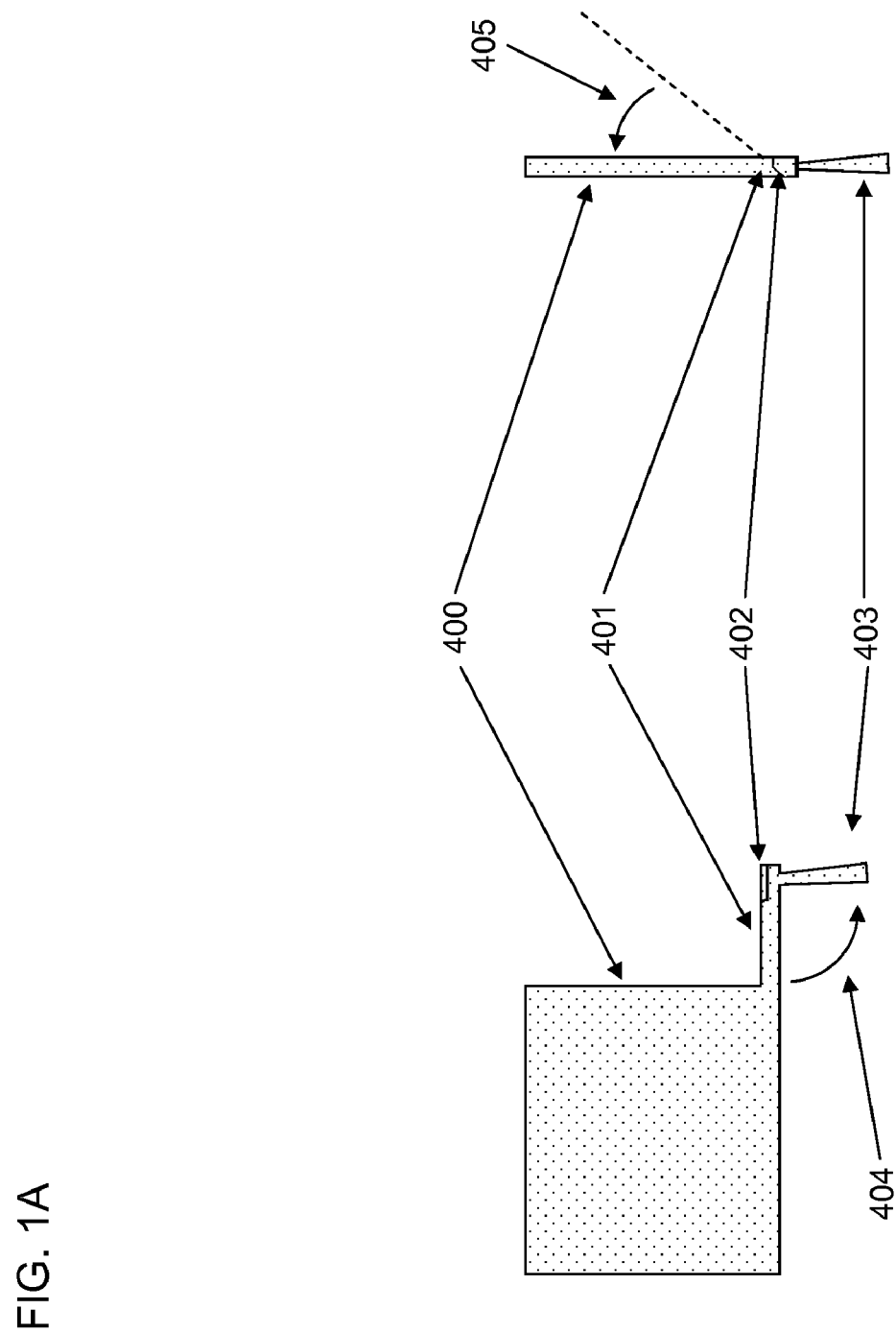
FIG. 1A is a side plan view and end view of thin cantilever and tip construction.

FIG. 1A shows a body 400, cantilever 401 with angled reflecting surface 402 and tip 403 formed by etching, wet or dry, laser cutting, ion milling/addition, electron beam mediated chemical milling/addition, direct electron beam milling, coating by any means, machining, abrasive water jet, or grinding, lapping and polishing or any combination of the latter methods in single crystal silicon 100, single crystal silicon 110 or any single crystal silicon orientation appropriate to the desired structure, or in amorphous or polycrystalline silicon, silicon carbide, single crystal diamond, polycrystalline or nanocrystalline diamond or amorphous diamond, boron nitride, boron carbide, tungsten nitride, tungsten carbide, single crystal or amorphous quartz, glass, sapphire, metals, alloyed metals, plastics, ceramics, or composites, In one embodiment the integrated structure composed of 400, 401, 402 and 403 is formed by a combination of wet etching and dry etching of single crystal silicon 100 of the desired width of the cantilever (or somewhat thicker) bonded by a silicon dioxide layer to a handle layer of silicon and the entire assembly commonly known in the art as an SOI wafer (silicon on insulator). Since the cantilever length, thickness, angle and tip shape are all defined by the projected lithography on the wafer any combination or variation of such forms may be made on a wafer limited in dimensions only by the wafer diameter. Alternatively the common method for cantilever, body and tip fabrication may be used in which the body portion to which the cantilever is attached is reduced to or is somewhat wider then the cantilever width, however this method is known to be very limiting on tip shape, tip angle to the cantilever and particularly tip length.

As shown in FIG. 1A the tip 403 has a shape which gets larger at the end furthest away from the cantilever 401 and a length almost equal to the length of the cantilever and a precise angle 404 with respect to the cantilever to meet any particular design goal. Further the angled reflecting surface 402 is formed by the angled recess made by the self-limiting wet etch by KOH of silicon 100, off axis single crystal silicon can produce different angles of this surface which as is well known in art is atomically smooth in crystalline material with few or no dislocations or faults. The formation of the entire cantilever and tip by using the planar surface of the bulk structure (silicon wafer, diamond wafer, sapphire wafer) is a substantial departure from the present method for cantilever and tip manufacture and as shown in FIGS. 3A, 4A, 4B, 4C, 7A, 7B, 8A, 8C, 8D, 14C, and 14D can lead to improved and/or additional functionality for the cantilever and tip assembly or as in FIG. 8C an ability to make the tip rigid as the end of a pinned beam rather then a cantilever. Thus the embodiment of FIG. 8C can function unclamped as any of the common SPM techniques requiring a cantilever beam while after being clamped can function as a true STM or mode of SPM in which the tip must be extremely rigid.

Figure 1B:
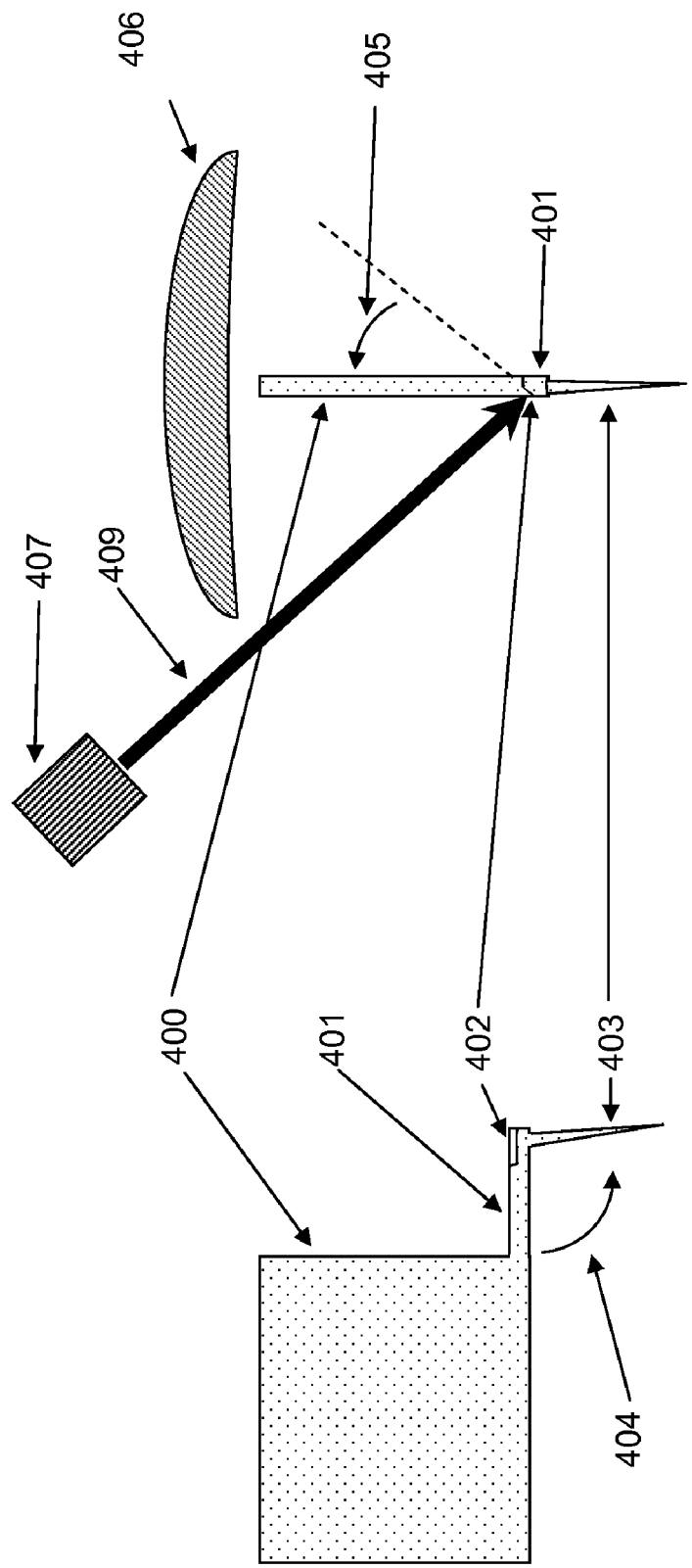
FIG. 1B is a side plan view, end view with objective optical lens and top view of the thin cantilever and tip construction showing the side mirror cantilever reflector with laser light lever emitter and detector.
Figure 1C:
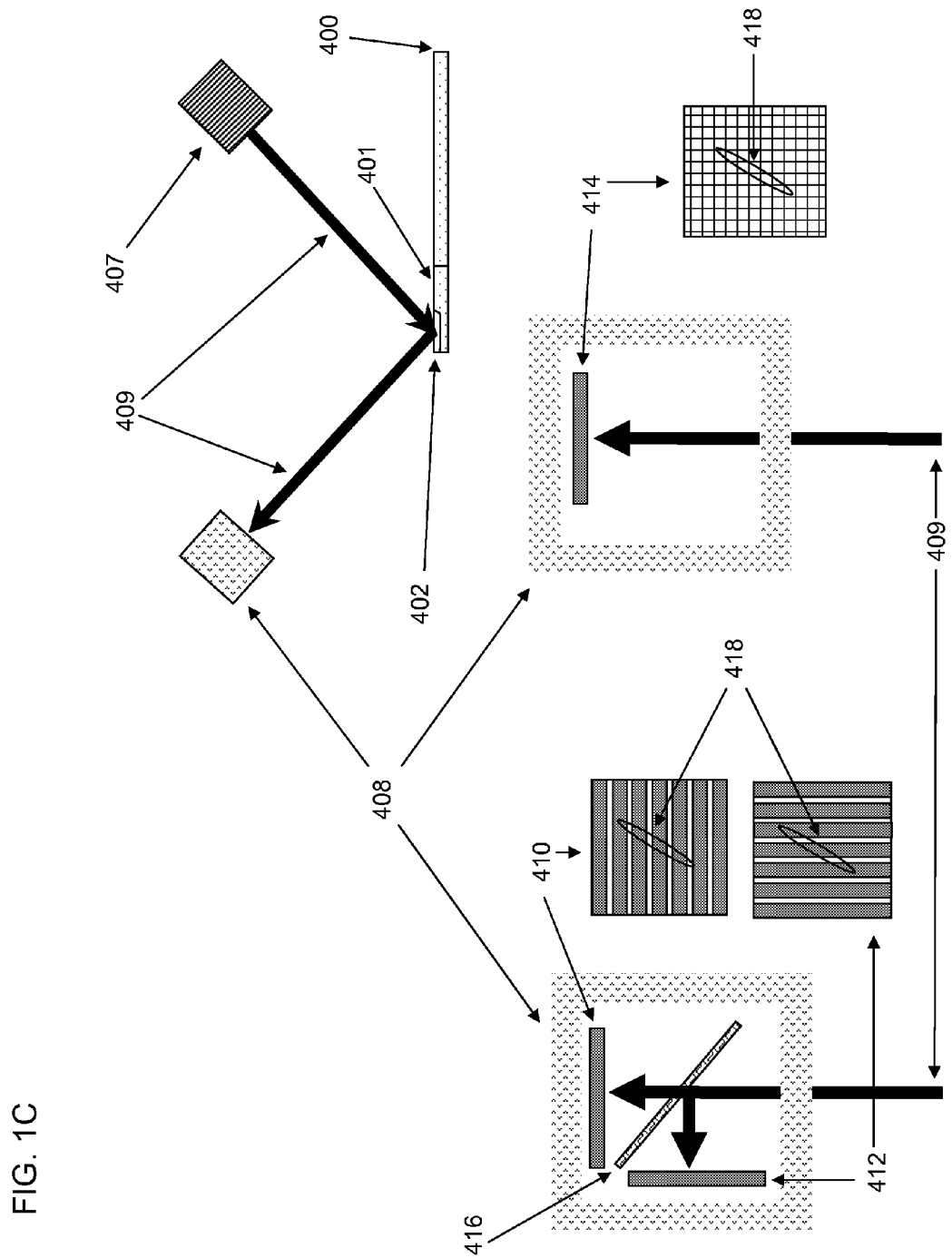
FIG. 1C is a side plan view with insets showing details of the laser light emitter and detector for the SPM arrangement in FIG. 1B, illustrating that the angled reflector can also reveal surface interactions in a direction perpendicular to the cantilever in the plane of the surface to be scanned.

In operation shown in FIG. 1B the cantilever of FIG. 1A with a different tip design 403 is combined with a portion of the components of a typical SPM or AFM system including optical objective 406, laser source 407 and light beam 409 reflecting off of angled reflecting surface 402 etched at angle 405. The thin body subtends the minimum amount of the microscope objectives 406 cone of acceptance while supporting the cantilever while the angled reflector offers a way to put the optics, laser and detector somewhere besides the z plane or plane of body, cantilever and tip support, and near the translation structures (not shown but well known in the art). Furthermore the angled reflector also reveals surface interactions in a direction perpendicular to the cantilever in the plane of the surface to be scanned by the SPM as seen in FIG. 1C. In FIG. 1C a beam of light emitted by laser and optic assembly 407 is reflected off 402 and into the detector assembly 408. Detector 408 may consist of two sensors 410 and 412 and a beam splitter 416 so that the Z and X components of the beam spot motion may be separated, with 410 seeing only beam excursions in the vertical direction, while 412 sees only X excursions, or alternatively just one of 410 or 412 with no beam splitter 416 may be used to see their respective motions of the cantilever end. In one embodiment of 408 a detector square or rectangular array 414 may be used to detect both types of excursions simultaneously. Thus the angled reflector permits an unambiguous method for detecting SPM (such as AFM-atomic force, MFM-magnetic force, CFM-chemical force, and other cantilever motion techniques well known in the art) interactions in two axis.

Figure 2A:
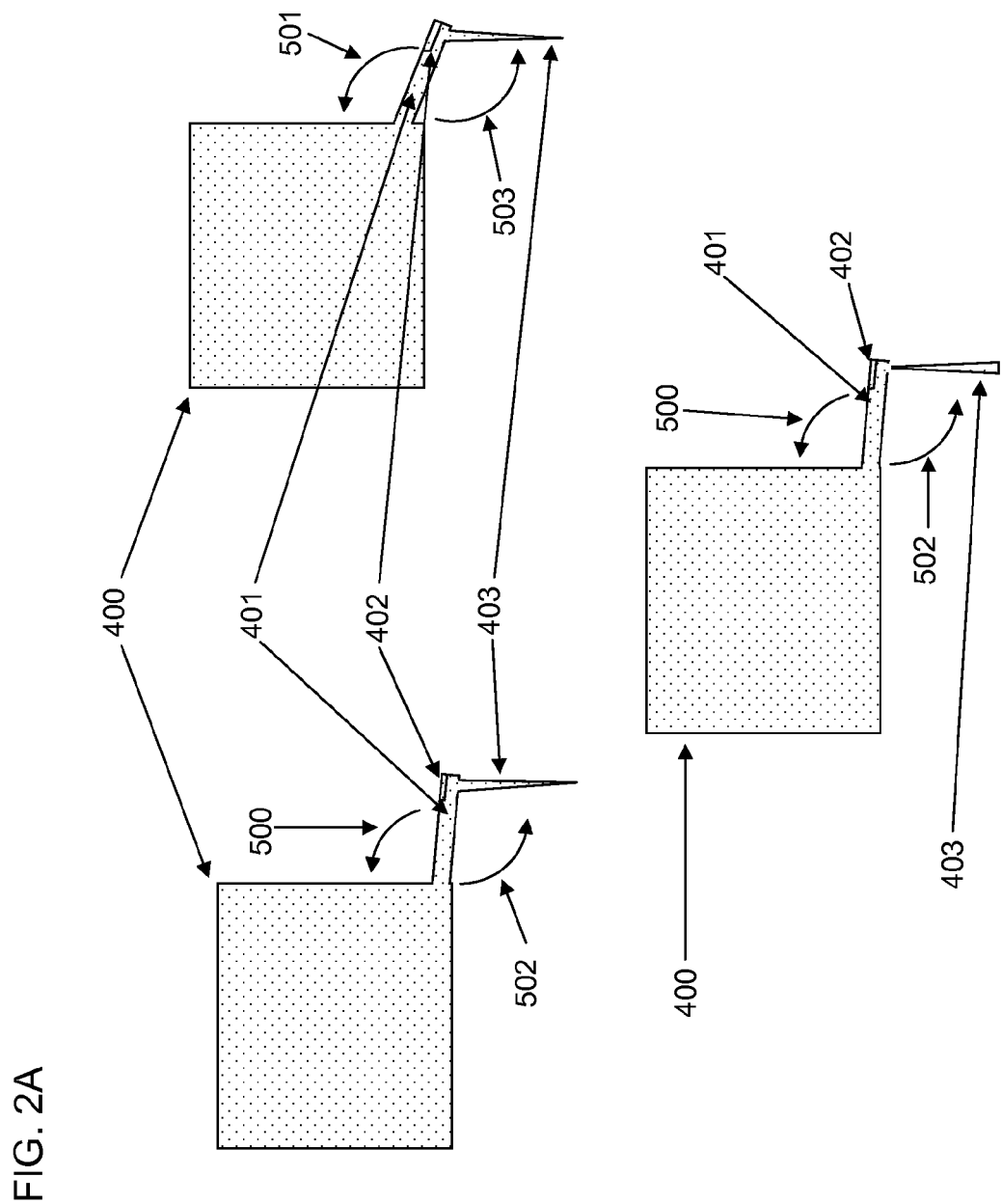
FIG. 2A is a side plan view of three thin cantilevers with varying approach angles to the object to be scanned.
Figure 2B:
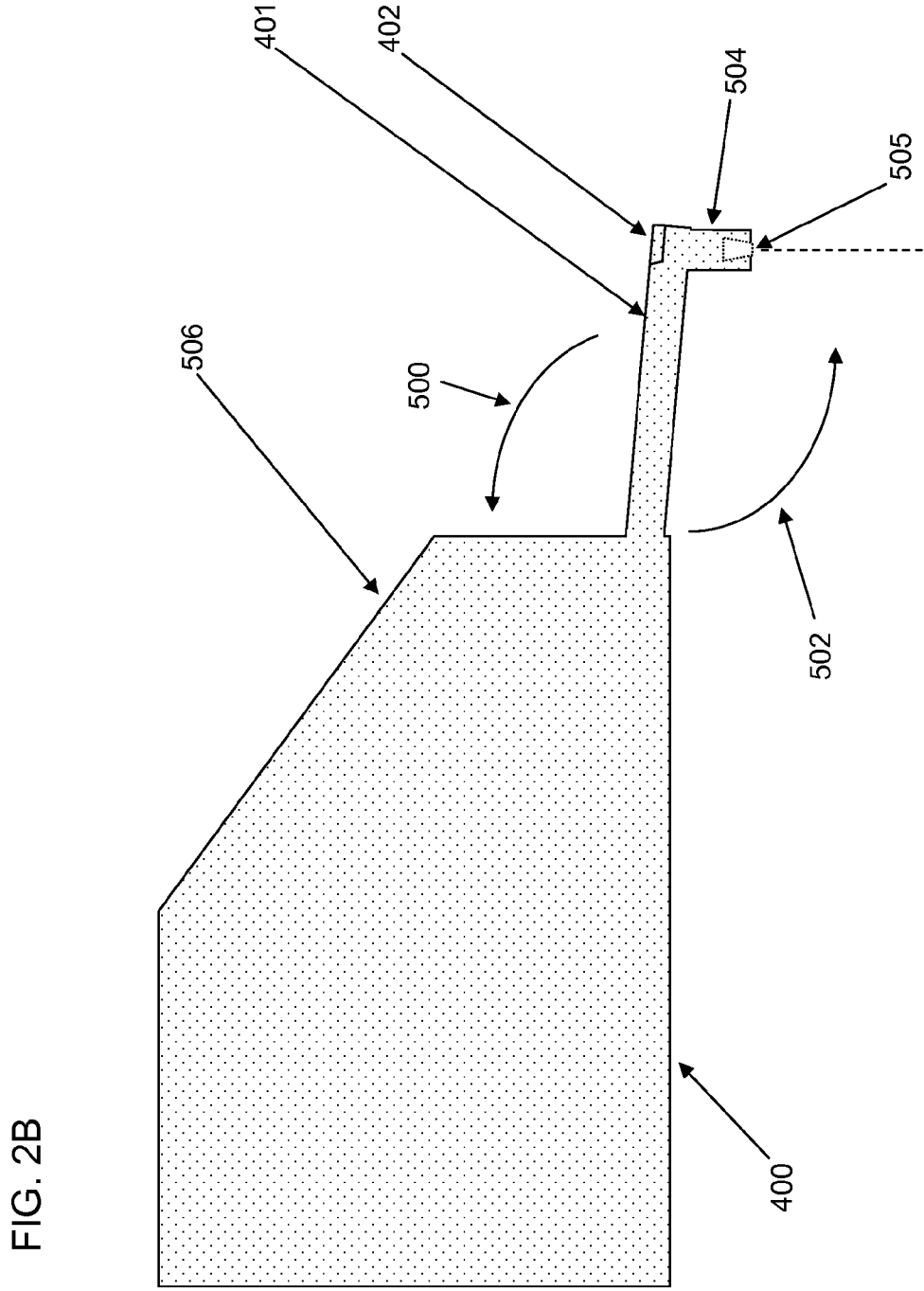
FIG. 2B is a side plan view of a thin cantilever construction in which the body behind the cantilever is cut away to permit optical monitoring from the top of the cantilever.

The cantilever assembly of FIG. 2A shows the freedom unknown in conventional SPM cantilever manufacturing to build the cantilever itself at any reasonable angle (502) to the body (400) while also providing an exact lithographic fabrication of the tip at the precise desired correction angle (500) which best brings it perpendicular to the plane of the object surface. FIG. 2A also illustrates an alternative cantilever angle (503) and tip angle (501). FIG. 2B further extends the flexibility of the approach showing a particular tip stub (504) and socket or through hole recess (505) with precise lithographically defined side angles. FIG. 2B also shows a relief angle (506) on the body (400).

Figure 2C:
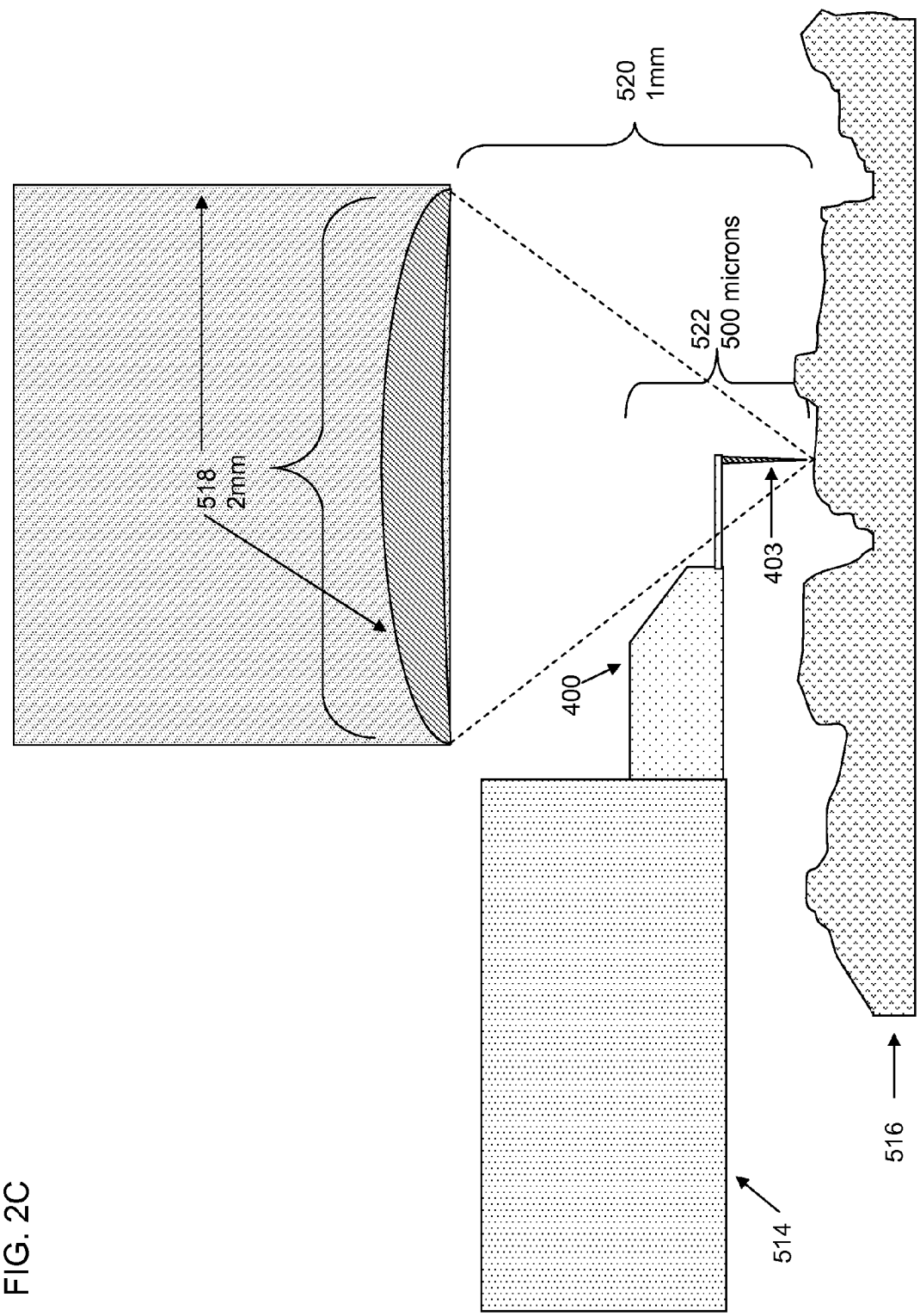
FIG. 2C is a side plan view of a typical sized cantilever and built up body and a typical high numerical aperture objective arranged to permit deep scanning and direct imaging of the object and tip end coaxially without interference from the cantilever body.
Figure 2D:
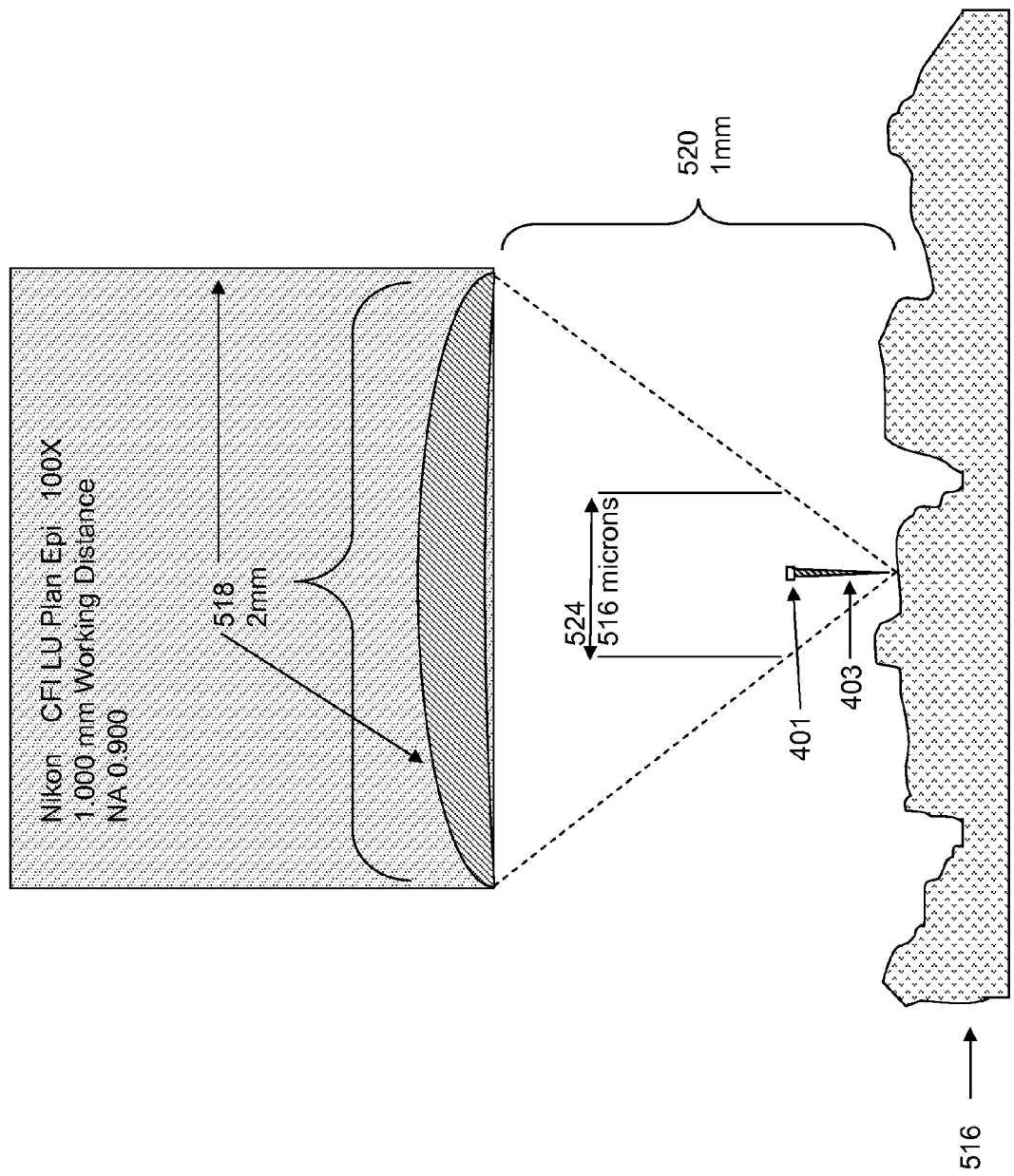
FIG. 2D is an end on cross section of the cantilever, tip, lens and object showing the portion of the effective aperture obscured by the cantilever.

FIG. 2C is a specific example of a cantilever body, cantilever and tip (514, 400, 403) used in conjunction with a specific commercial lens (518) manufactures number CFI LU Plan Epi 100X with a 1.000 mm Working Distance and a Numerical Aperture of 0.900 resolution of 310 nanometers and a depth of field of 340 nanometers. In the case of 518 only the cantilever beam (50 microns by 400 microns) obscures the cone (defined by the dashed lines) while the tip (403) length of 250 microns limits the effective working distance of the combined elements 518 and the AFM (not shown but encompassing 514, 400, 403 and other components well known in the art and incorporated by reference herein) is limited by the tip length of 250 microns. Obscuring only 1.5% of the cone of light collected by the objective no significant diminution of contrast is imposed while the apex of the tip (403) is visible and may be held above the surface of the object (516) to permit both the tip apex and the area directly below the tip to be imaged.

Used in a confocal system such as a Nipkow disc system the objective depth of field is typically reduced by 10 times to 34 nanometers thus allowing the tip (403) apex to be held clear of the object surface when only a few tens of nanometers away from the surface permitting alignments of less then +/−250 nanometers or better and enabling the rapid location of surface features and the use of small scan areas for the AFM which are particularly fast (a few seconds for a 1000 by 1000 points and lines on a 500 nanometer area providing a local resolution of 0.5 nanometers or 5 Angstroms). As described in this inventor's referenced earlier art, the Confocal map of the object (516) obtained before bring the AFM tip assembly (514, 400, 403) near the object can be used to map the motion of the tip (403) to keep it near the surface but clear of interference for the entire object. Thus substantially speeding up the process of locating and approaching the surface for the AFM scan. FIG. 2C is a side cross section looking along the length of the cantilever (401) and cross sectioning the axis of the tip (403) showing the diameter of the plane perpendicular to the optical axis (524) of 516 microns used to calculate the obscuration of the cantilever (401) of the overall optical image of 1.5%.

As shown in FIG. 2C, by suitable choice of tip shaft length and numerical aperture of the microscope objective, both the tip point (shaft end) and the object under or adjacent to the tip point may be imaged optically. The minimum length to obtain tip and object imaging around the cantilever is a function of the numerical aperture (N.A.). For very large N.A.'s approaching the theoretical maximum (about 2.5 with known optical materials, such as diamond) in a matching immersion medium, the tip shaft length may be quite short (less then the width of the cantilever); however, for commonly available N.A.s of air (index 1) or water (index about 1.2) the tip shaft will be at least equal to or greater then the cantilever width. Operationally, it is also very desirable to use long tip shafts to permit an SPM image z range approaching the working distance of the objective. After obtaining sufficient length to permit tip point and object imaging the working distance determines the ultimate length of the tip shaft.

As is known in the art (see, e.g., Peter V. Sengbusch, "Microscopy" at URL Reference www.biologie.uni-hamburg.de/b-online/e03/03.htm, attached hereto and incorporated herein by reference), the numerical aperture is defined as the sine of half the angle of the cone of light from each point of the object, that can be accepted by the objective (a) multiplied by the index of refraction of the medium in which the object is immersed (n):

$$A = n \sin \alpha. \quad (1)$$

The medium is usually air with index of refraction n=1. Angle α can never be bigger than 90°, and thus the numerical aperture in air does not exceed 1. In practice, the N.A. is limited to about 0.95 since the distance between objective and the surface of the cover glass does not reach zero; an N.A. of 0.95 corresponds to an angle α of roughly 72°. An increase of the numerical aperture (beyond 1) can be achieved by using a medium between objective and object that has an index of refraction higher than that of air. For instance, special immersion oil with an index of n=1.515 can be used with a specially constructed objective. In some cases, the index of refraction of the objective itself (n=1.525 for typical optical materials) can become limiting; thus no further N.A. gain is realized if the index of the immersion medium exceeds the index of the objective. In immersion oil, if α is 67.5°, the N.A. is 1.515× 0.92=1.40. The degree of resolution (d) is set by the wavelength of light (λ) and the numerical aperture (Aobj):

$$d = \lambda / A_{obj}. \quad (2)$$

For instance, if λ is 550 nm (green light), then:

$$d = 550 \text{ [nm]}/(2 \times 1.40) = 200 \text{ nm} = 0.2 \text{ } \mu\text{m}.$$

Note that 0.2 μm is the highest theoretical resolution that can be reached with a light microscope. A rough approximation shows that the power of resolution of a light microscope is about half the length of the light wave if a good immersion objective is used. If the limit of resolution of a microscope is known, then the maximal useful magnification can be calculated. A magnification is called useful when two barely distinguishable points are magnified so strongly that they are seen as separate units by the human eye. The rule of thumb is that a useful magnification is about 500-1000×Aobj; for instance, an objective with an aperture of 1.4 has a maximal useful magnification of 1400-fold.

Thus, in a microscope combined with an SPM (e.g., as shown in FIG. 2C), the tip shaft length can be chosen such that the tip point and an adjacent object surface can both be imaged with a given optical objective. For instance, the tip shaft length can be chosen to match or to be somewhat smaller than the working distance of the optical objective lens used with the tip assembly.

Figure 2E:
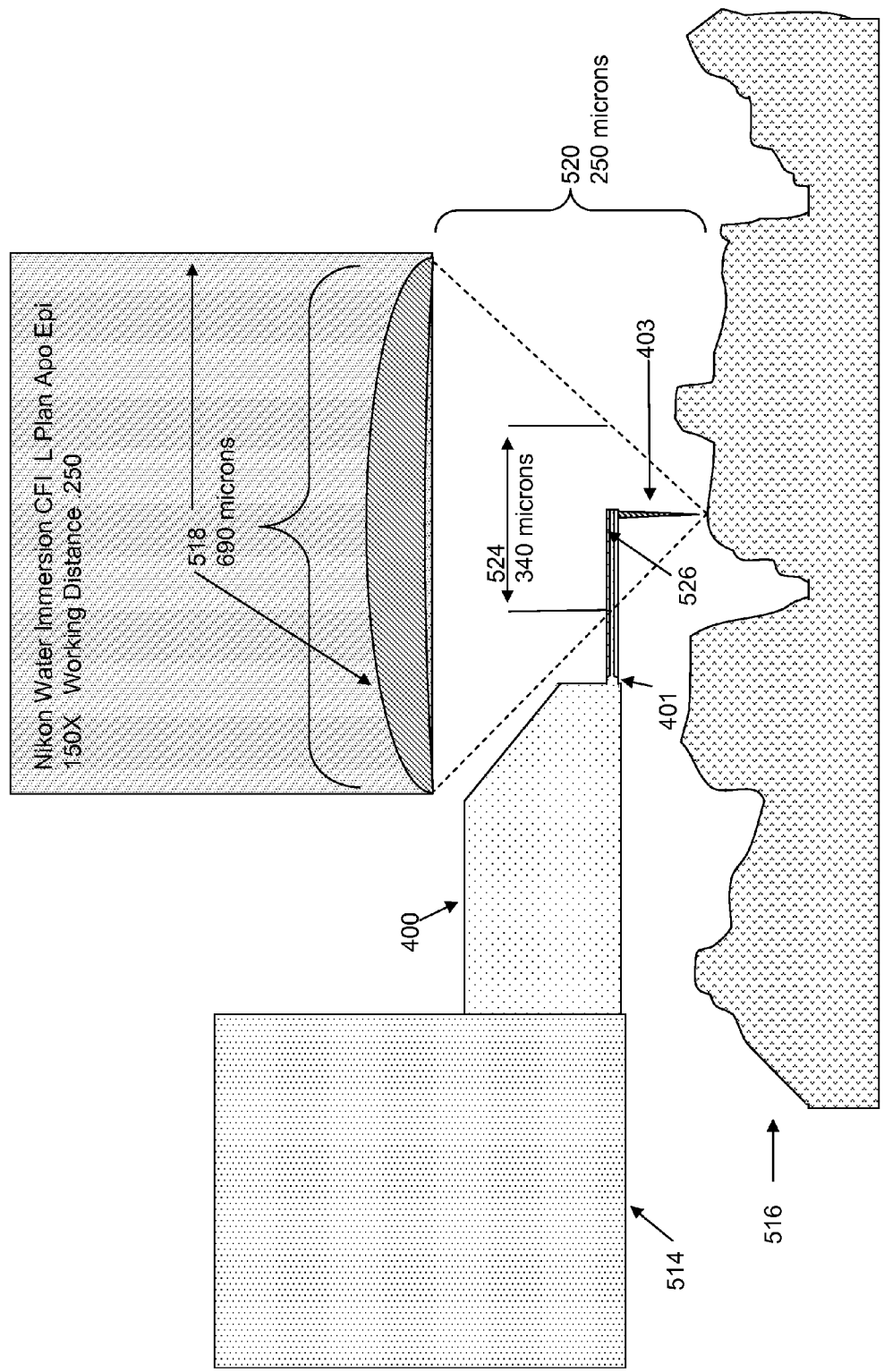
FIG. 2E is a side plan view of a typical sized cantilever and built up body and a typical high numerical aperture water immersion objective arranged to permit deep scanning and direct imaging of the object and tip end coaxially without interference from the cantilever body.

FIG. 2E is another example using another commercial lens (518) Nikon Water Immersion CFI L Plan Apo Epi 150X Working Distance 0.250 in which the tip (403) has been created with a length of 100 microns. This lens is used immersed in water and therefore the tip (403) and cantilever (401) have been designed to work in water also. This lens has a N.A. of 1.25, a resolution of 220 nanometers and a depth of field of 180 nanometers providing a typical confocal depth of field of 18 nanometers. The smaller optical field of view of 200 nanometers permits the requisite scan area of the AFM to be reduced by half nearly doubling the speed for a resolution of 2 Angstroms in near real time. Certain special methods such as on cantilever excitation (FIG. 7A, 1002) which can improve scan speeds by more then 10 times make this method compatible with real time exploration of chemical and biological phenomena.

Figure 2F:
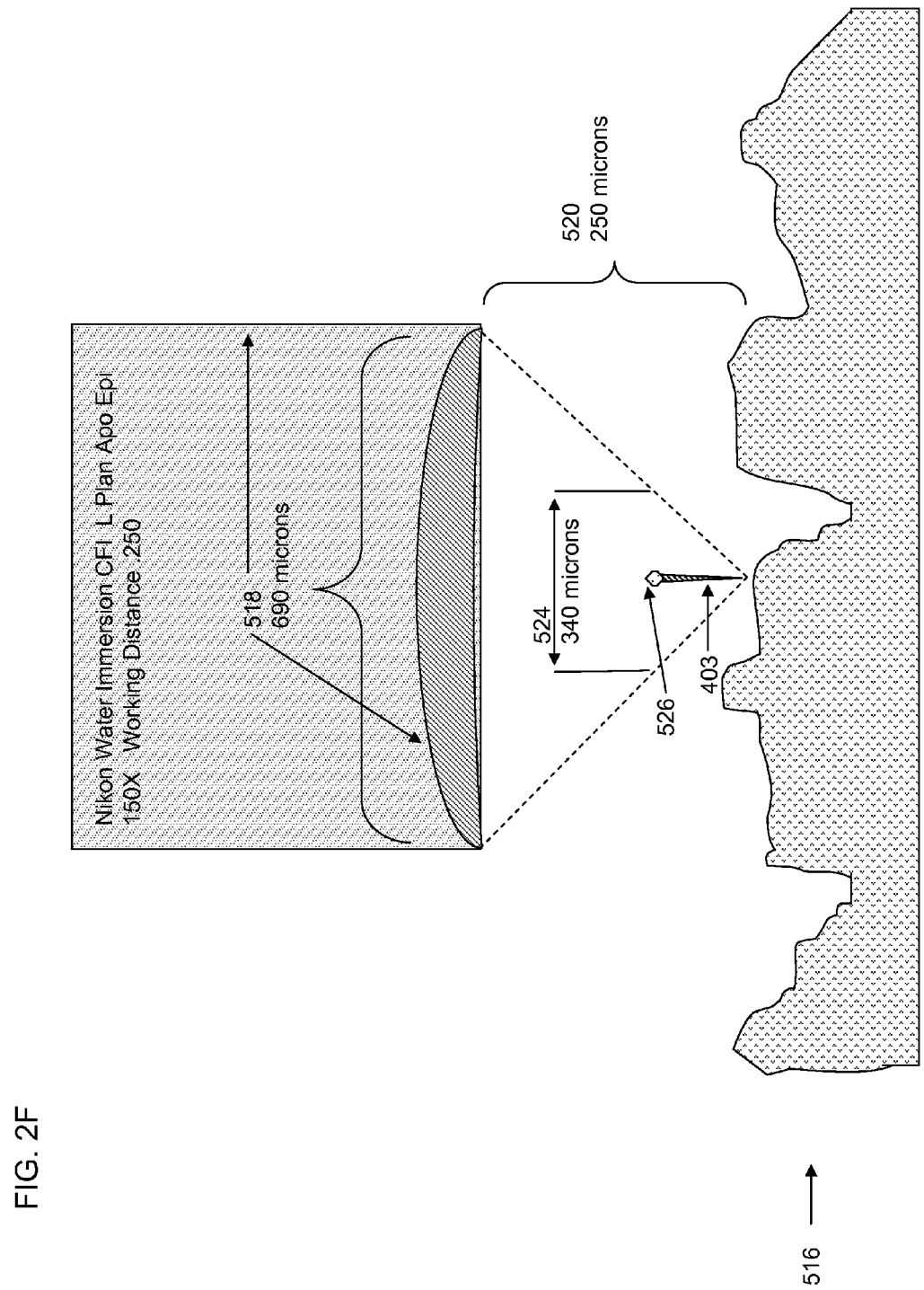
FIG. 2F is an end on cross section of the cantilever, tip, lens and object showing the portion of the effective aperture obscured by the cantilever and the unique cantilever shape to reduce water resistance and improve the sensitivity of the SPM while also providing a highly reflective angled surface for the sensing laser beam.

FIG. 2F shows another cross section view in which the tapered edge form (526) is visible etched lithographically into the cantilever (401) so as to make a form which offers less resistance to motion through the fluid. This edge form (526) is also the reflecting surface (402) for the laser beam (409) which senses the cantilever (401) motion.

Figure 2G:
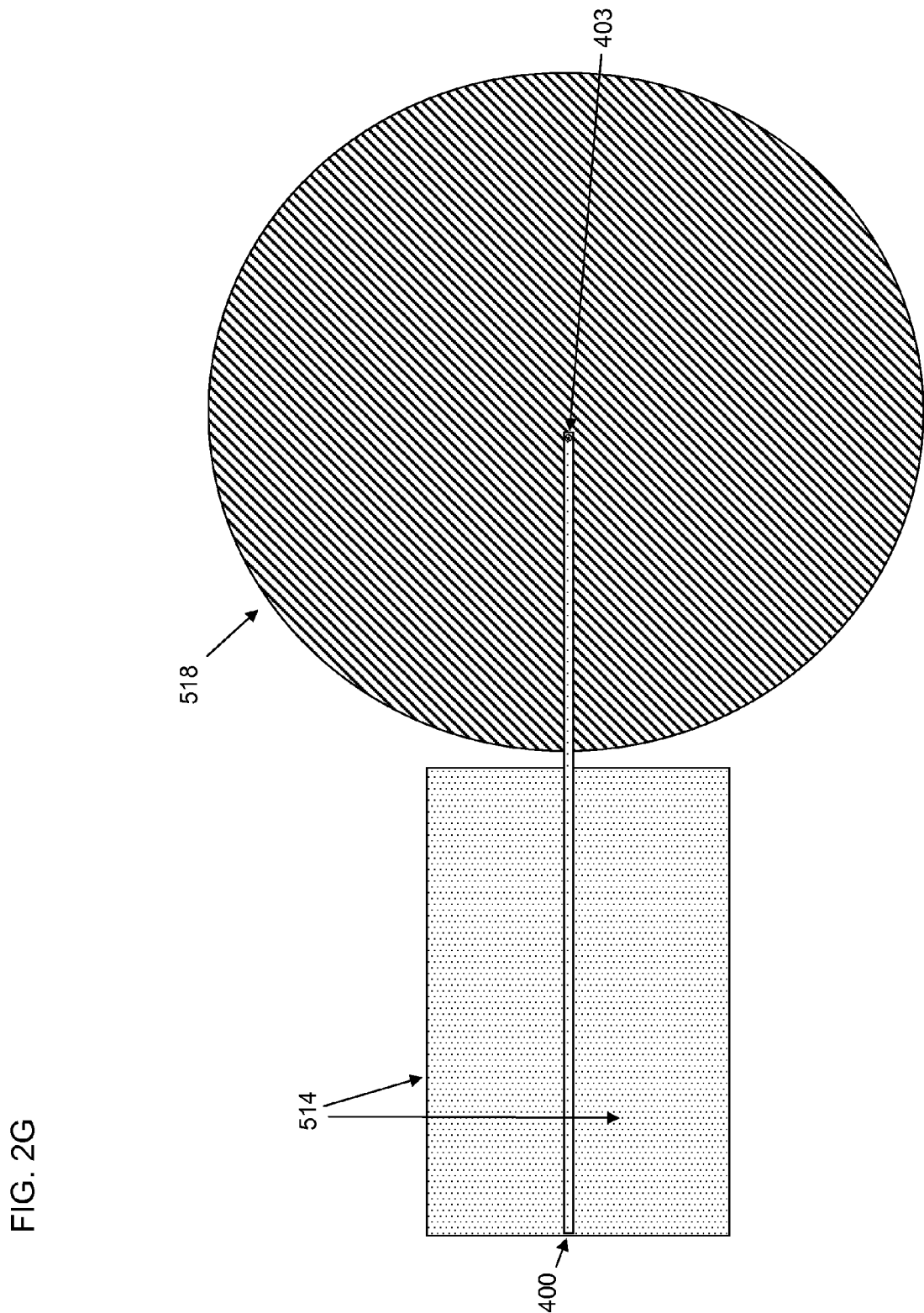
FIG. 2G is a bottom plan view of the tip body, cantilever, tip and objective lens of FIG. 2C.

FIG. 2G shows a view from the object (516) into the tip (403) end and the objective lens (518). FIG. 2G also makes the tip body parts 514 visible along with their attachment to the body part (400) from which the cantilever (401) and tip (403) are formed. This body part (400) may be silicon, sapphire or diamond or any other suitable material, while body part (514) may also be one or more materials suitable to be joined to 400.

Figure 2H:
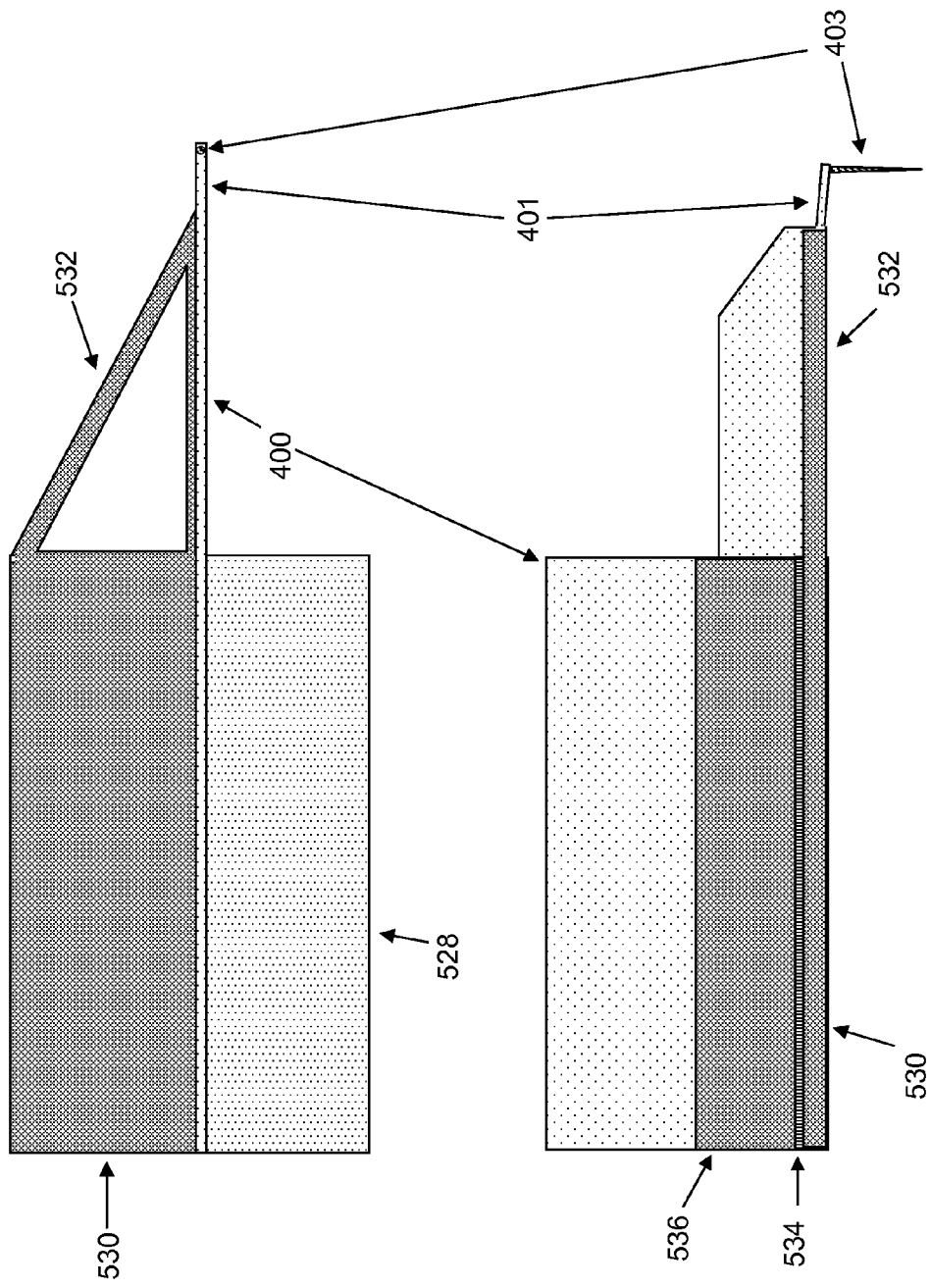
FIG. 2H is a bottom and side plan view of a tip body with relieved stiffener, cantilever and tip.

FIG. 2H is a bottom and side view of a cantilever assembly where a planar lithographically defined cantilever assembly (400 and 528) is joined at right angle to another such structure (530, 532, 534, 536). Looking from the bottom tip (403) is at the end of the cantilever (401) while stiffening arm (532) stabilizes and damps any vibrations in the thin section of 400 behind the cantilever (401). The side planar view shows the structure of the SOI (silicon on insulator) bonded reinforcing assembly (530, 532, 534, 536) where the device layer (530, 532) is patterned to provide a minimally obscuring angled reinforcement and stabilizing structure (532). 534 is the conventional silicon dioxide layer of an SOI wafer.

FIG. 2I shows a side and bottom plan view of a through slot (505) patterned on the orthogonal to the side of cantilever (401).

Figure 2J:
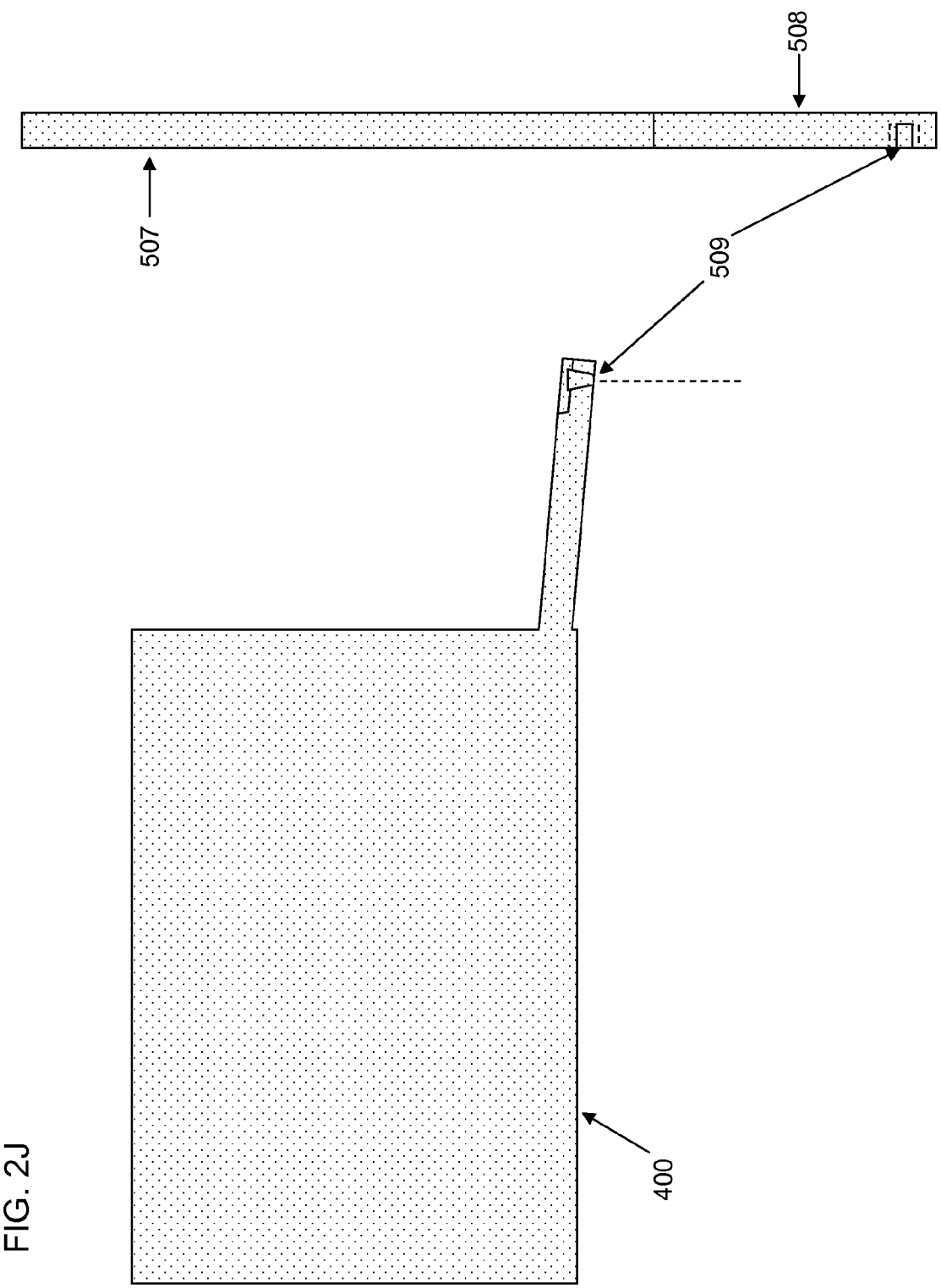
FIG. 2J is a side and bottom plan view of a tip body and cantilever with a tapered tip mounting socket which is recessed in the cantilever in two directions.

FIG. 2J shows a side and bottom plan view of a recessed slot (509) patterned on the cantilever (401).

Figure 2K:
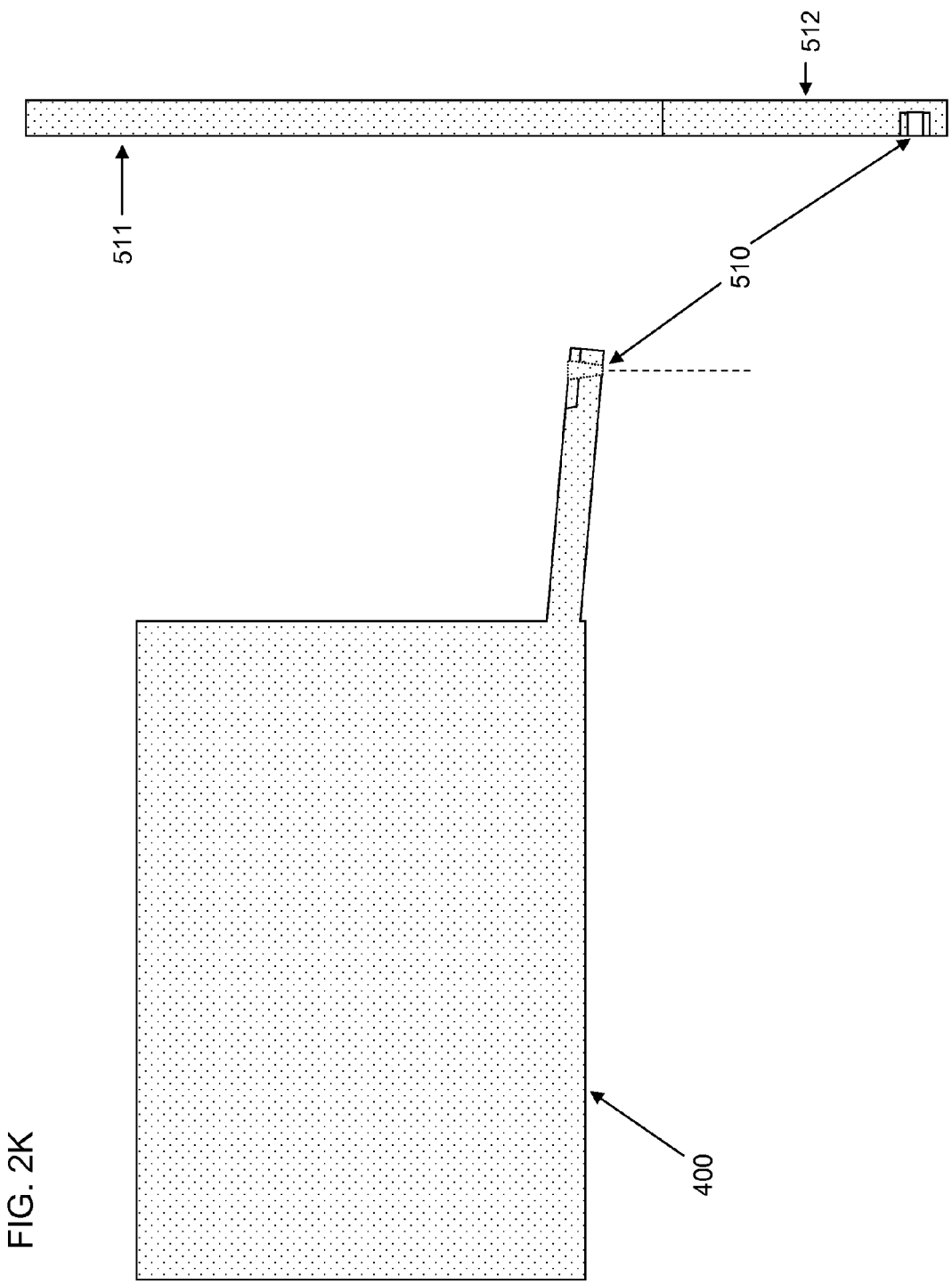
FIG. 2K is a side and bottom plan view of a tip body and cantilever with a tapered tip mounting socket which is recessed in the direction perpendicular to the tip axis and a through hole along the axis.

FIG. 2K shows a side and bottom plan view of a recessed through slot (510) extending from the bottom to the top of the cantilever (401).

Figure 3A:
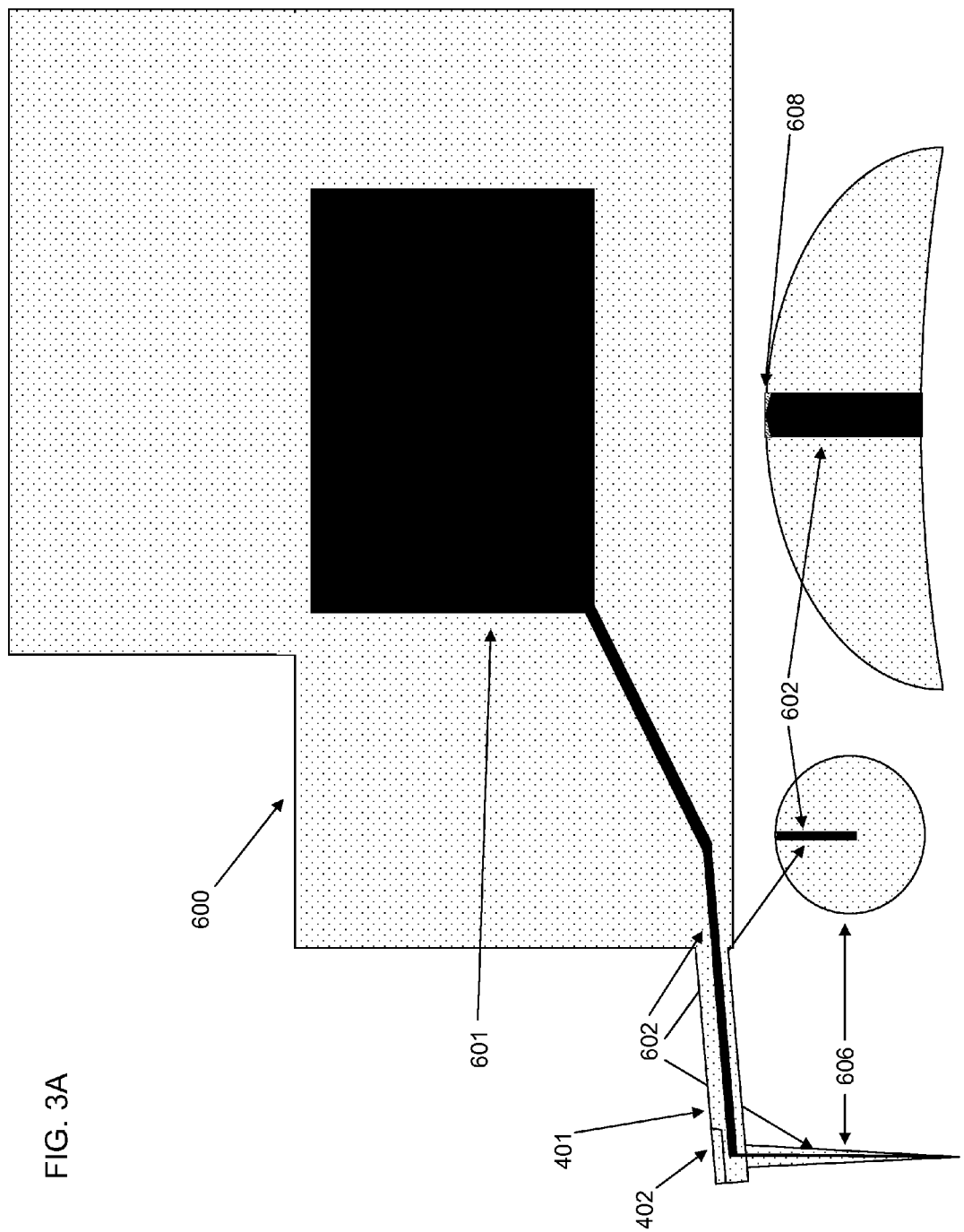
FIG. 3A is a side plan view of a tip body, cantilever, integral tip, fluid passage and reservoir, tip cross section view and detail of the tip cross section.

FIG. 3A is side sectional view of a channel (602), reservoir and supply (601) and cantilever assembly body (600) and close end sectional views of the slot on the tip (606). The channel (602) connects the reservoir and supply (601) to the tip end. A cover consisting of a silicon nitride and/or silicon carbide and/or silicon dioxide layer (not shown) closes off the channel where it leaves the layered main body (FIG. 3C, 603) and joins cantilever (401) to seal the fluid into the channel. Along the tip the channel (602) is closed off by growing silicon dioxide on the silicon tip until the channel is closed off (606) due to the slower growth in the deep part of the channel towards the tip center. After closure (608) is fabricated by the oxide on the tip (606), cantilever (401) and body extension (600) an over coat of silicon nitride and/or silicon carbide is patterned everywhere except the tip which sharpened and has the channel exposed by repeated oxidation and oxide removal (oxidation sharpening) or by use of electron beam, and/or ion beam, and/or electron or ion induced chemical addition or subtraction of material and/or lapping by chemical or abrasive means.

Figure 3B:
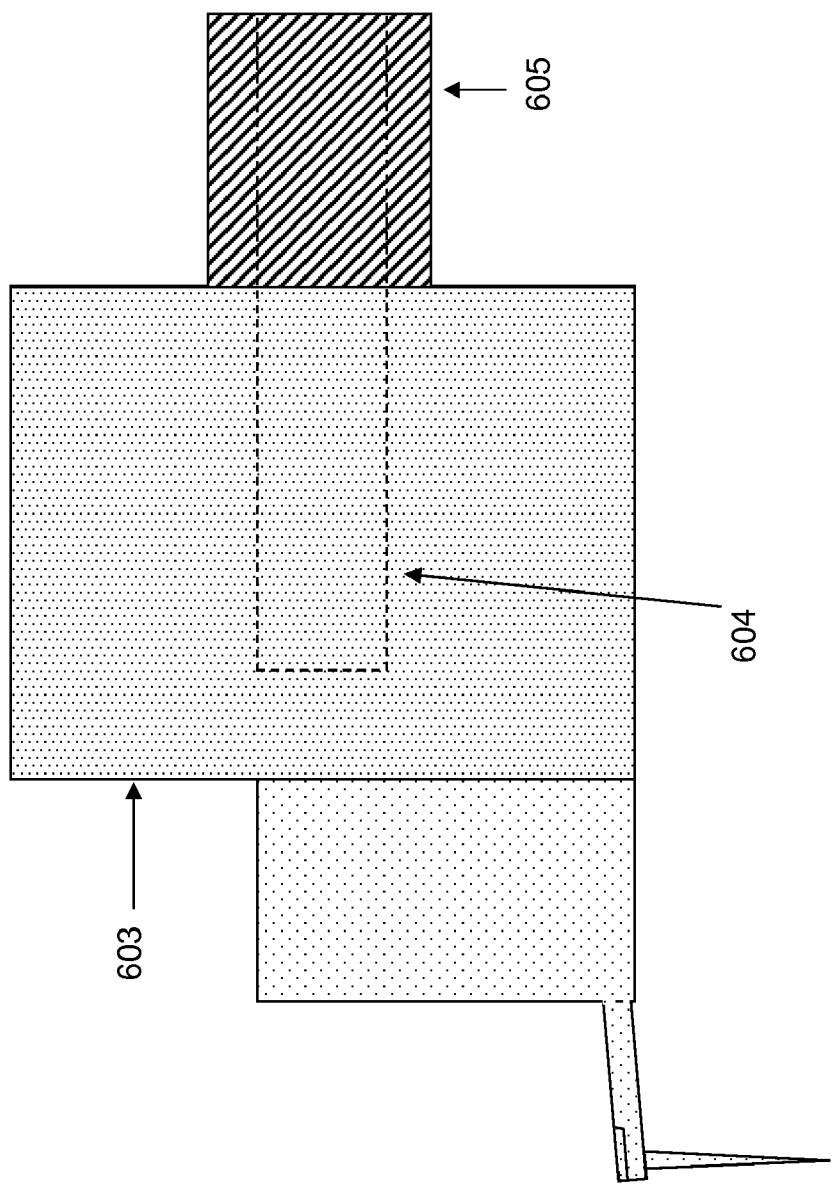
FIG. 3B is a side plan view of FIG. 3A showing the internal hollow and external fluid connection.
Figure 3C:
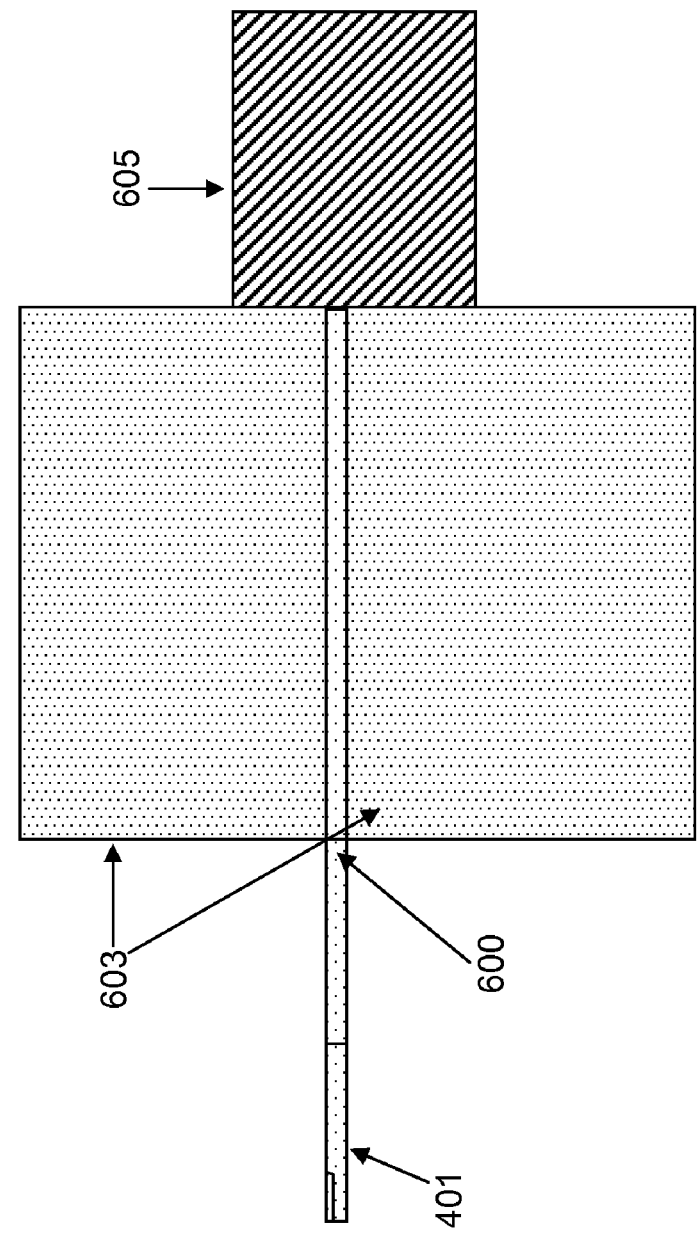
FIG. 3C is a top plan view of FIG. 3A showing the internal hollow and external fluid connection.

FIG. 3B shows the delivery channel (604) and external source connector (605) preformed or inserted into 603, and 600 as shown in FIG. 3C a top plan view of the entire assembly. In an alternative embodiment two or more channels are formed in the tip assembly and are brought in proximity or mixed together in any combination at the tip end.

Figure 4B:
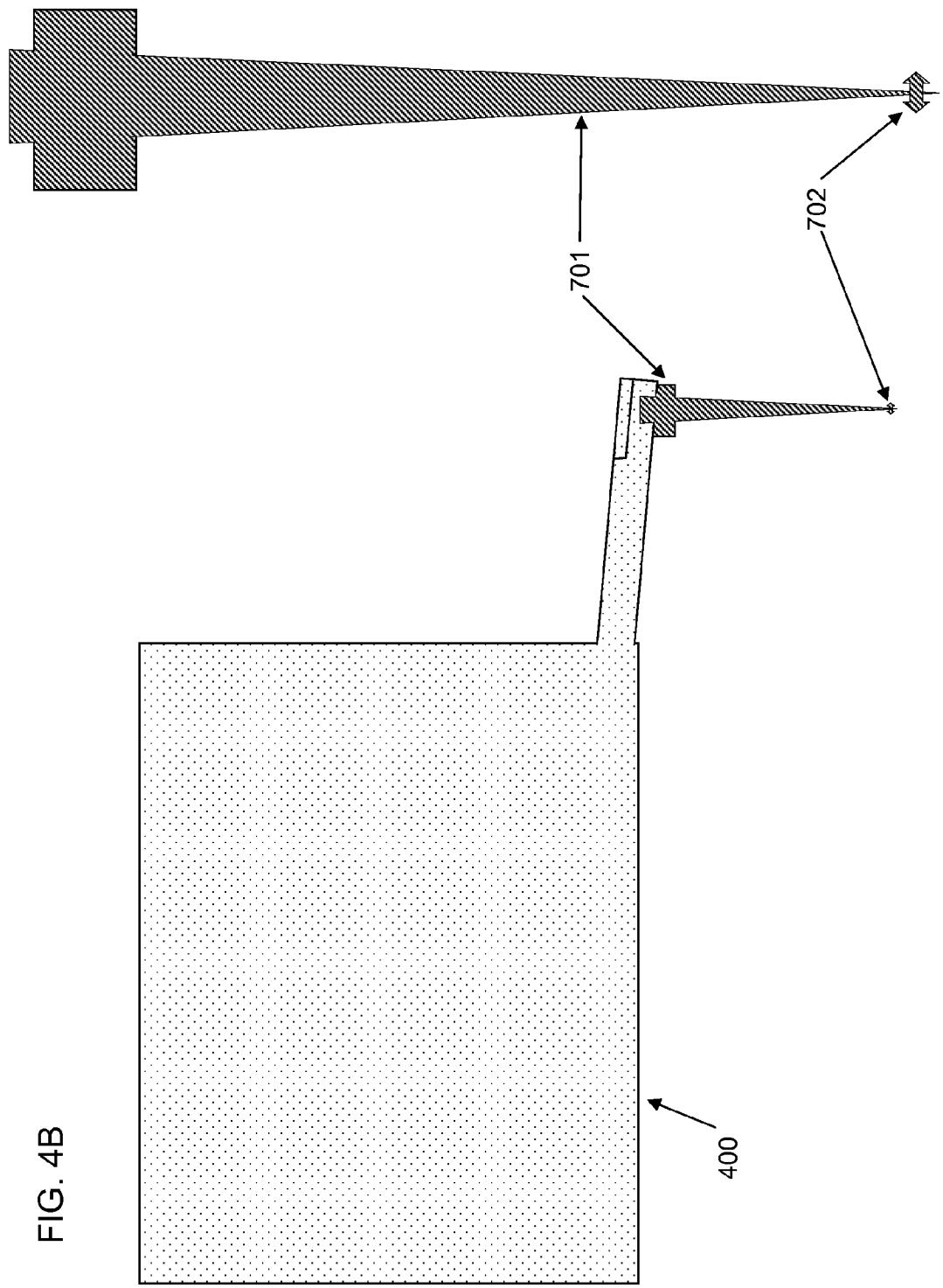
FIG. 4B is a side plan view of a tip body, cantilever, molded tip, with an enlarged side plan view of the specific molded tip form.

FIG. 4A shows the silicon mold (700) fabrication of a diamond, silicon carbide, silicon nitride or metal tip structure (701). In FIG. 4B the silicon mold has been etched away to leave the tip structure (701) with its three way tip apex (702) seen enlarged at right. FIG. 4C shows an example of an alternative molded diamond tip structure (706) in which a series of mold recesses (708) plus special four sided pyramidal recess (710) form a strong but thin shell shown in side plan view and bottom plan view and including a molded in silicon tip apex (704) which can be oxidation etched and sharpened and/or shaped by electron beam, ion beam, electron beam mediated chemical addition or subtraction or may alternatively be formed from diamond and be sharpened by any of the means mentioned herein.

Figure 4D:
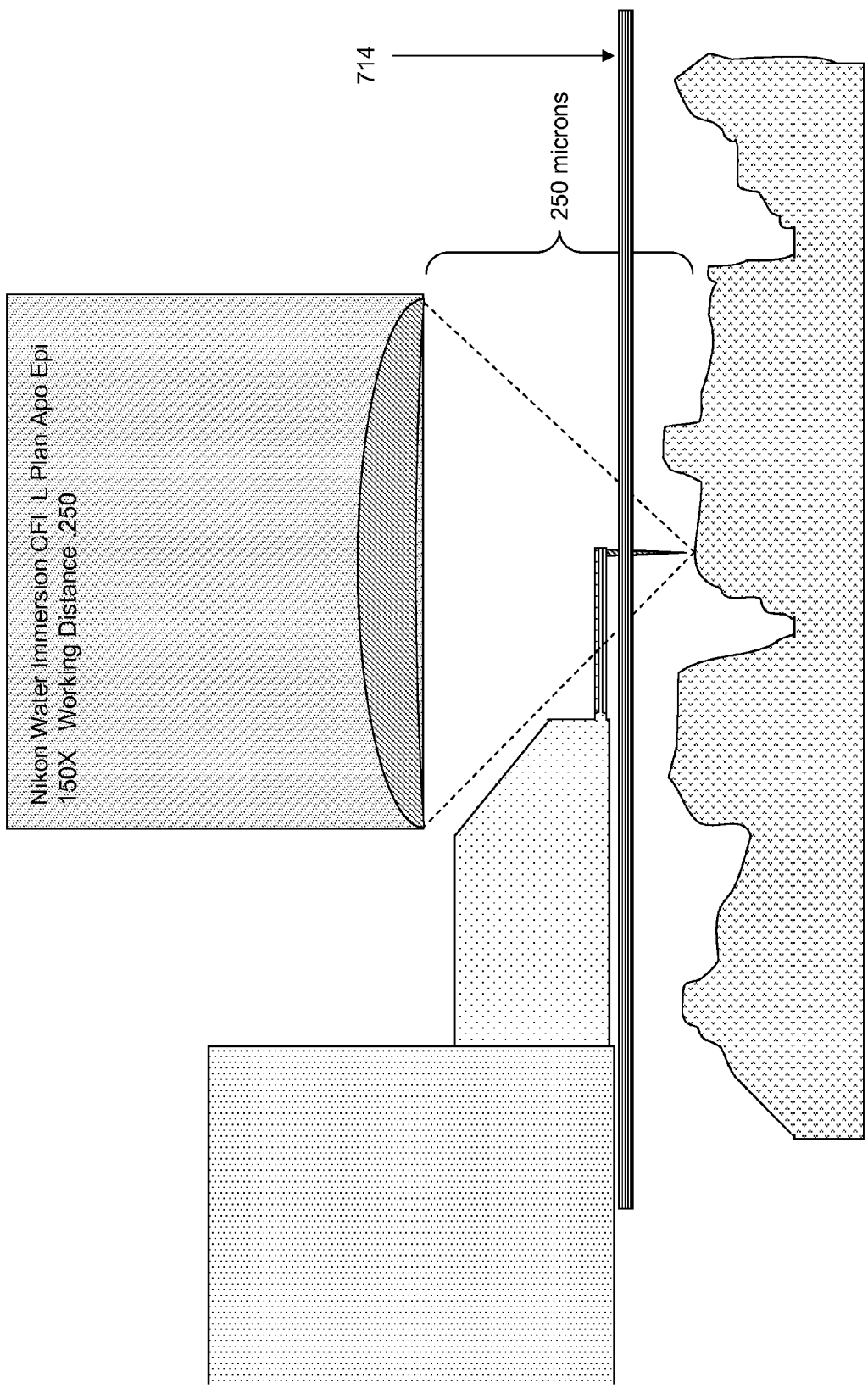
FIG. 4D is a side cross section view of a tunable undulator stack with attached x-ray/uv detector, tip body, cantilever, molded tip shaft, etched tip with a long working distance optical microscope objective. Also included is an enlarged side plan view of a specific molded tip shaft form and etch formed tip and an enlarged bottom view of the tip and cross section of the tip shaft.
Figure 4F:
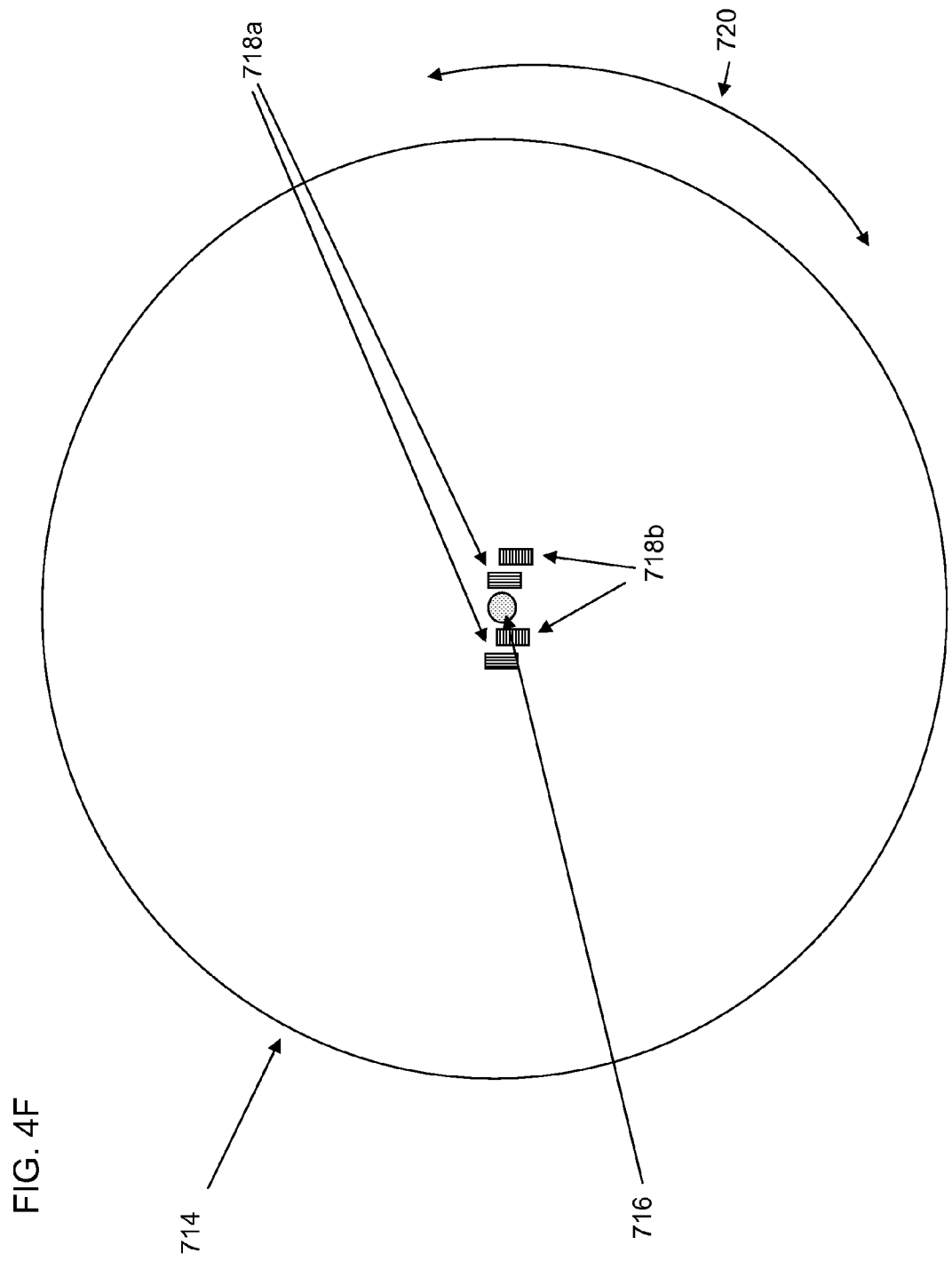
FIG. 4F is a top plan view of a magnetic section showing two sets of pole piece ends for controlling elliptical polarization.

In addition, FIG. 4C shows an external undulator consisting of one or more sets of oppositely arranged magnetic poles (712) arranged close to the tip shaft and forming a free electron laser (FEL) or free ion laser (FIL) in conjunction with an electron or ion beam propagating down the tip shaft. FIG. 4D shows a magnetic pole stack fabricated and combined with a uv or x-ray detector layer or structure (714) mounted and completely surrounding the object to be viewed or inspected so as to form a structure which can capture most of the radiation emitted by the sample or object of interest. Further the very wide area of the structure permits a very large but thin magnetic structure permitting a high flux density in spite of the minimal thickness of the magnetic material, which may be samarium cobalt, neodymium iron or any other magnetic material. As shown in FIG. 4E, the stack 714 and detector 726 (consisting of intrinsic diamond or other responsive materials) may also include a piezoelectric (722) or thermal or other means whereby the magnetic pole components (718) may have their respective spacings along the tip shaft modified. Further the aligned magnets are formed so as to precisely match the aperture such as is shown in FIG. 4E at the hole through the stack 718. By rotating the stack 719 control of the polarization exhibited in the radiation is achieved, as indicated in FIG. 4E. FIG. 4F shows another method in which adjacent magnetic fields tend produce a bias such that the output electromagnetic wave are elliptically polarized.

Figure 5A:
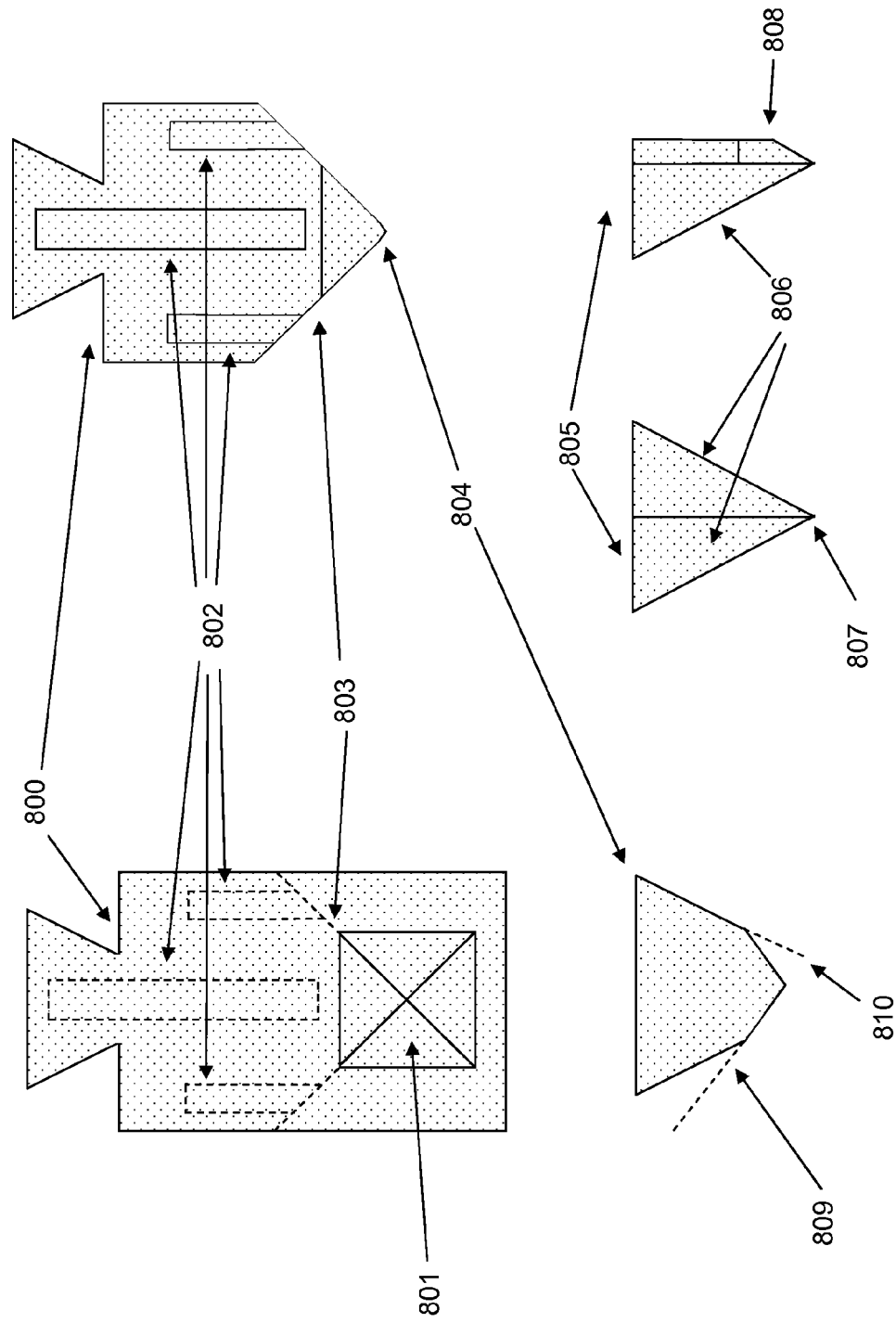
FIG. 5A is a top plan view of a part formed to be coated showing two steps in the forming process along with one enlarged top plan view and two side plan views of the tip portion of part showing two side structure variations.
Figure 5B:
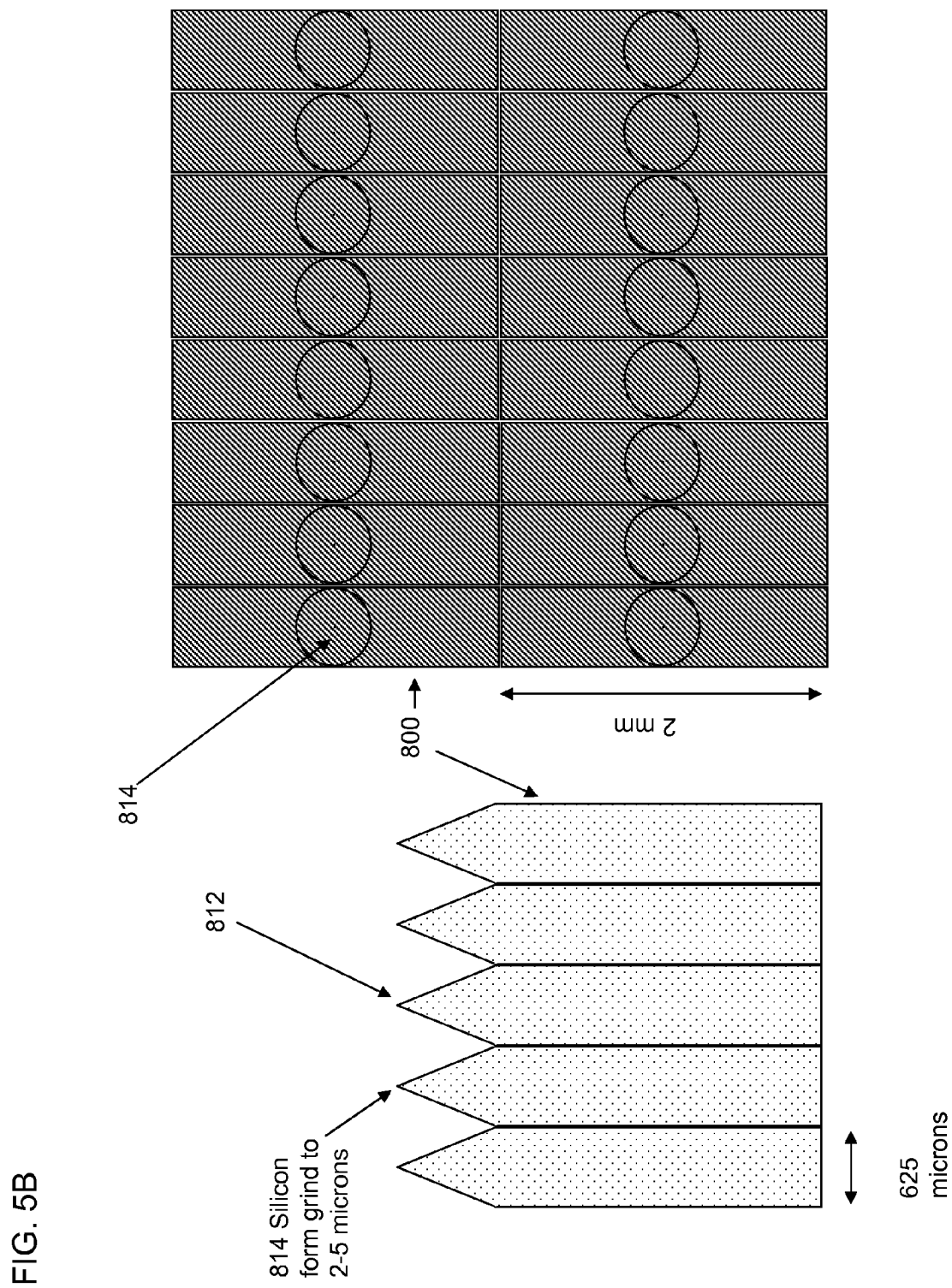
FIG. 5B is a side plan view of the narrow side of the part after separation and surface machining of the silicon to nearly final form and a top view of these forms after diamond coating.

FIG. 5A shows the fabrication structures (800) at some of the first stages of forming a silicon part (802) with recesses and angled surfaces (801), separation of the part by dry etching (809, 810) or (806, 807 or 808) and shaping the part by secondary operations (FIG. 5B, 812) grinding, machining, lapping operations as a precision mandrel, coating the mandrel (FIG. 5B, 814 shaded area) and shaping the coated part by secondary operations such as lapping, polishing, grinding, machining, electron beam or ion beam, electron beam or ion beam chemical mediation, nanolapping.

Figure 6A:
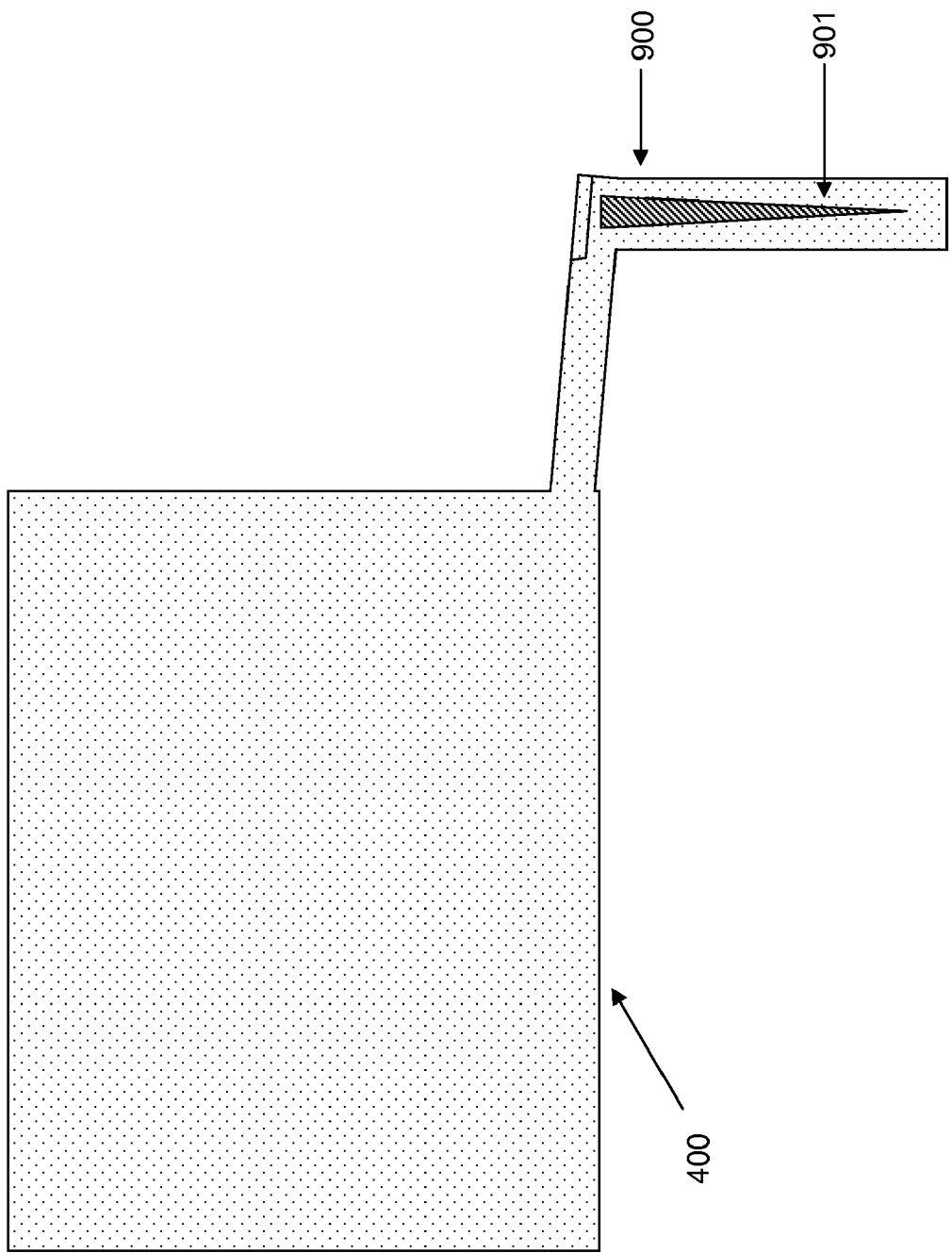
FIG. 6A shows a side plan view of the thin body and cantilever construction with another integral tip mold.

FIG. 6A is a side and end plan view of a mold (900) formed into the cantilever to receive diamond tip (901). The mold is formed by one or more wet and/or dry etch steps and then exposed through a resist or mask (see earlier diamond molding applications by this inventor) and then the mold is etched away by wet and/or dry processes to form the end result in FIG. 6B, 901.

Figure 7B:
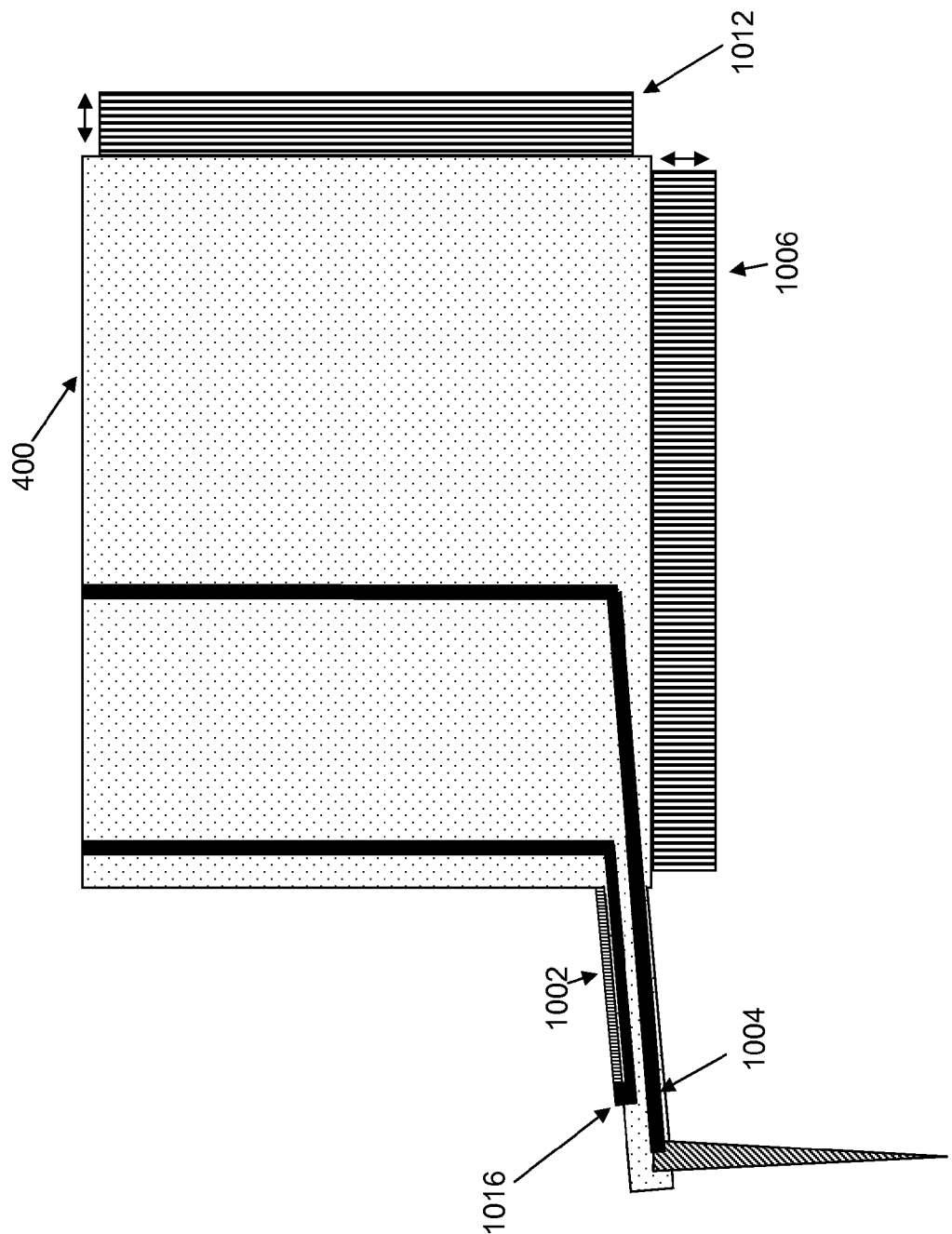
FIG. 7B is the other side plan view of FIG. 7A.

FIG. 7A is a side and end plan view of a planar molded tip (901), cantilever (401) and body structure (400) which incorporates a piezoelectric driver (1002) on the cantilever (401). The cantilever resonant driver is made up of a underlying insulating layer (not shown) of silicon dioxide and/or silicon nitride over which is placed a conductive metal (1016) such as Ti and then Au or Ti, Ag then Au and then a piezoelectric material (1002) such as ZnO followed by another metal coating set (1000) to make a capacitive like structure (for some piezoelectric materials the material may be driven from ends along their lengths). Drive voltages (1044,1046) are then applied to ends of the conductors (1000, 1016) at a resonant frequency to drive the cantilever to oscillate in the z direction moving the tip (901) up and down. Additionally the tip (901) is electrically conductive and may be used through connection 1004 to apply or measure voltage and current from the object being measured or modified. Piezoelectric z translator 1006 and x translator 1012 may be driven by conductors 1008 and 1010 respectively to translate the axis in these directions and/or resonantly drive the tip (901) in the x and/or z direction. A y piezoelectric drive in the normal to the plane of the drawing (and not shown) may also translate and/or drive the cantilever (401) and/or tip (901) resonantly in the y direction. FIG. 7B shows the back side plan view of FIG. 7A with the other piezoelectric drive line 1016 visible.

Figure 7C:
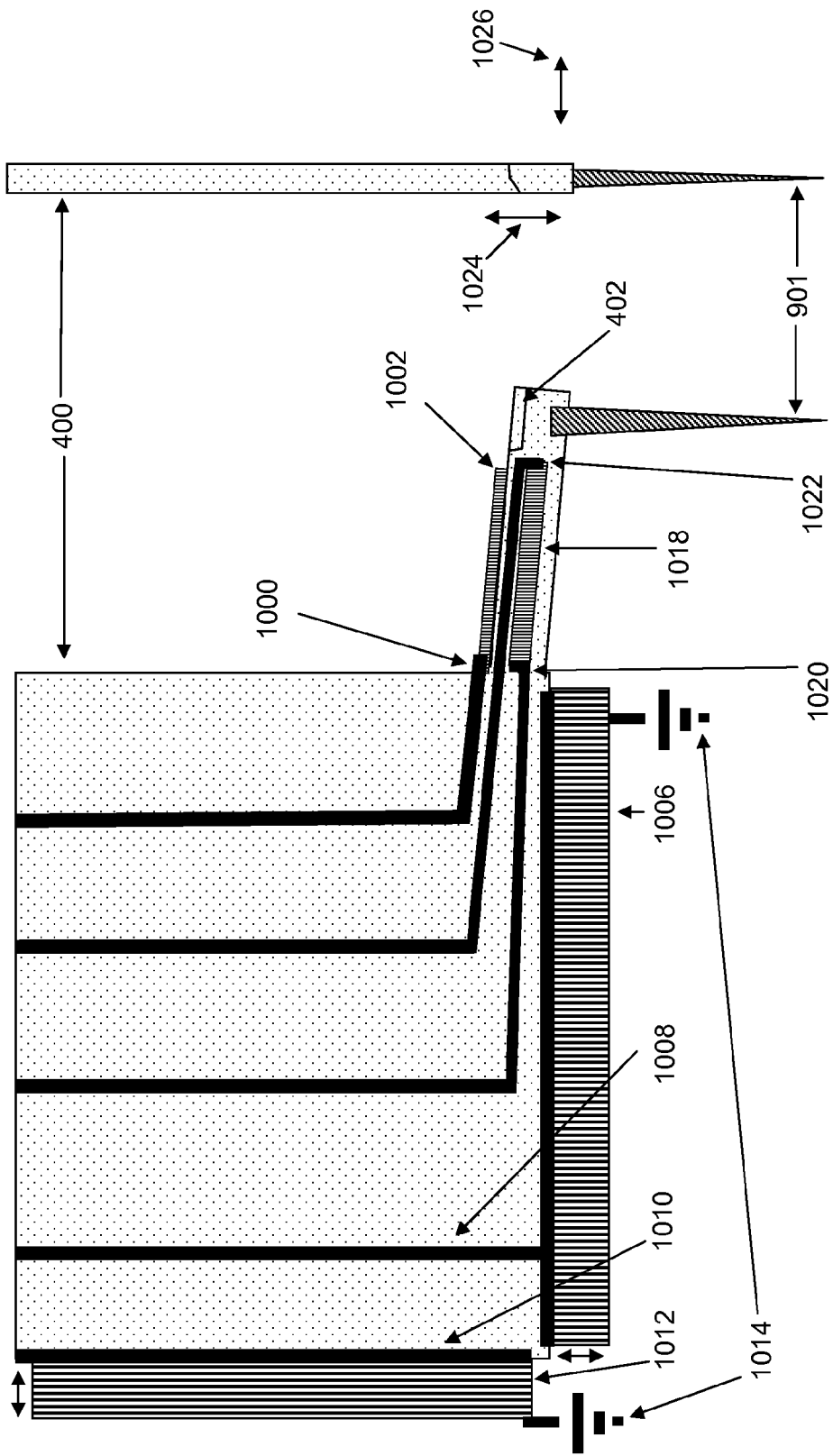
FIG. 7C is the side plan view of a structure similar to FIG. 7A which includes a resonant drive to the cantilever perpendicular to the z direction or tip axial drive.

FIG. 7C shows a variation of FIG. 7A in which an additional piezoelectric driver such as that from FIG. 7A, 1002 is made on the side of the cantilever (401) by driver 1018 with its full length electrodes 1020 and 1022 to provide a resonant y axis drive to the cantilever (401). The cantilever thickness and width are chosen so that the respective drive resonances are not harmonics nor closely match the resonant frequencies of the other axis including the tip resonance. Note that the angled reflector 402 provides a signal on the sampling laser beam (409) for both the z and y axis of motion.

Figure 7D:
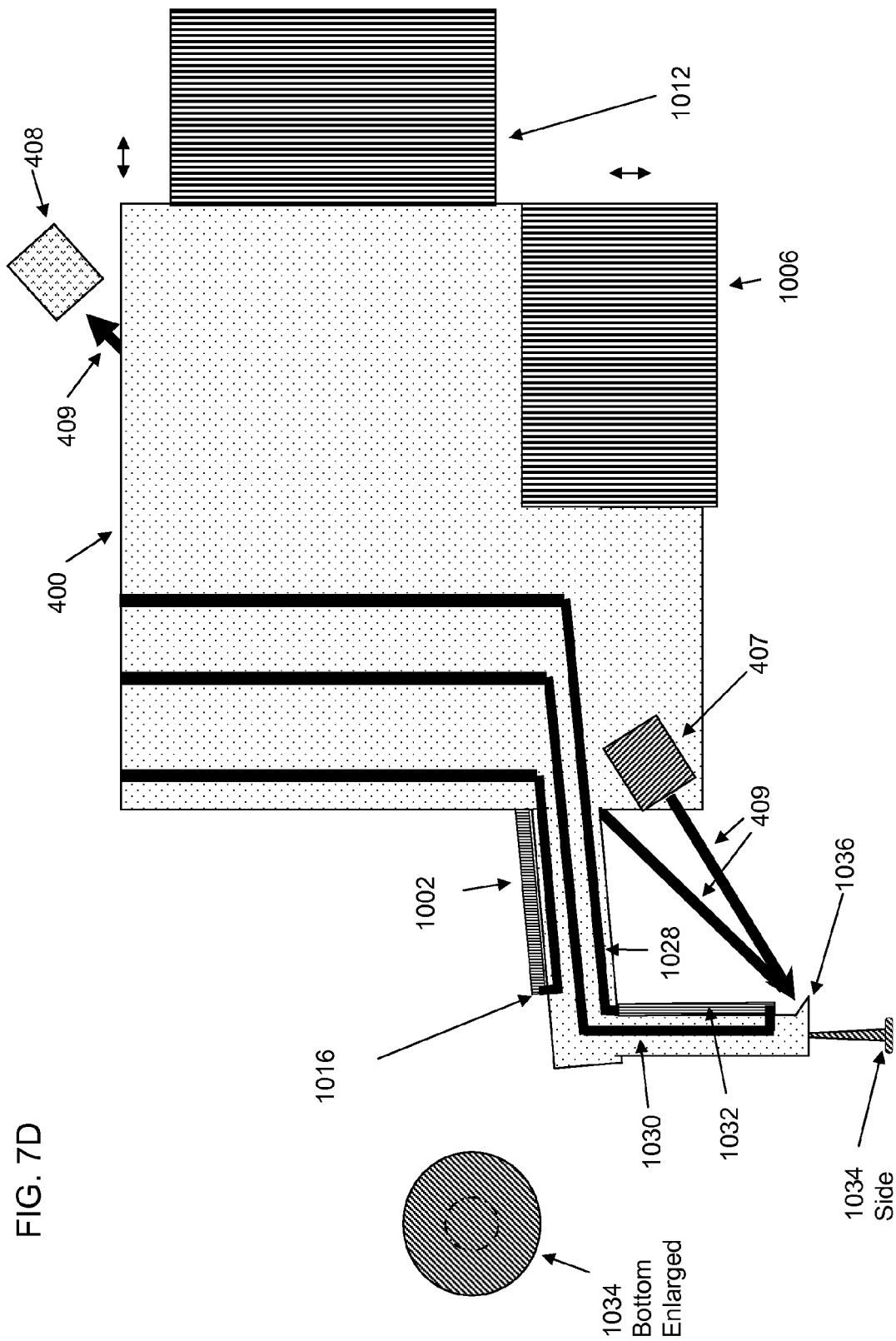
FIG. 7D is a side plan view of the a structure similar to FIG. 7C which includes a third resonant piezoelectric drive perpendicular to those drives of FIGS. 7A and 7C, and illustrates the laser and receiver sensors for the additional axis of motion, along with a special tip and enlarged bottom view of said tip for all direction probing.

FIG. 7D shows a variation of FIG. 7C in which an additional resonant piezoelectric driver (1032) is added for the tip structure (1034) along with a signal reflector (1036). The on tip piezoelectric driver (1032) is otherwise identical to that (1002) of FIG. 7A. This variation also includes a special molded diamond tip (1034) which uses a uniform flat disc (1034 detail) to measure surface variations in all three axes at once.

Figure 7E:
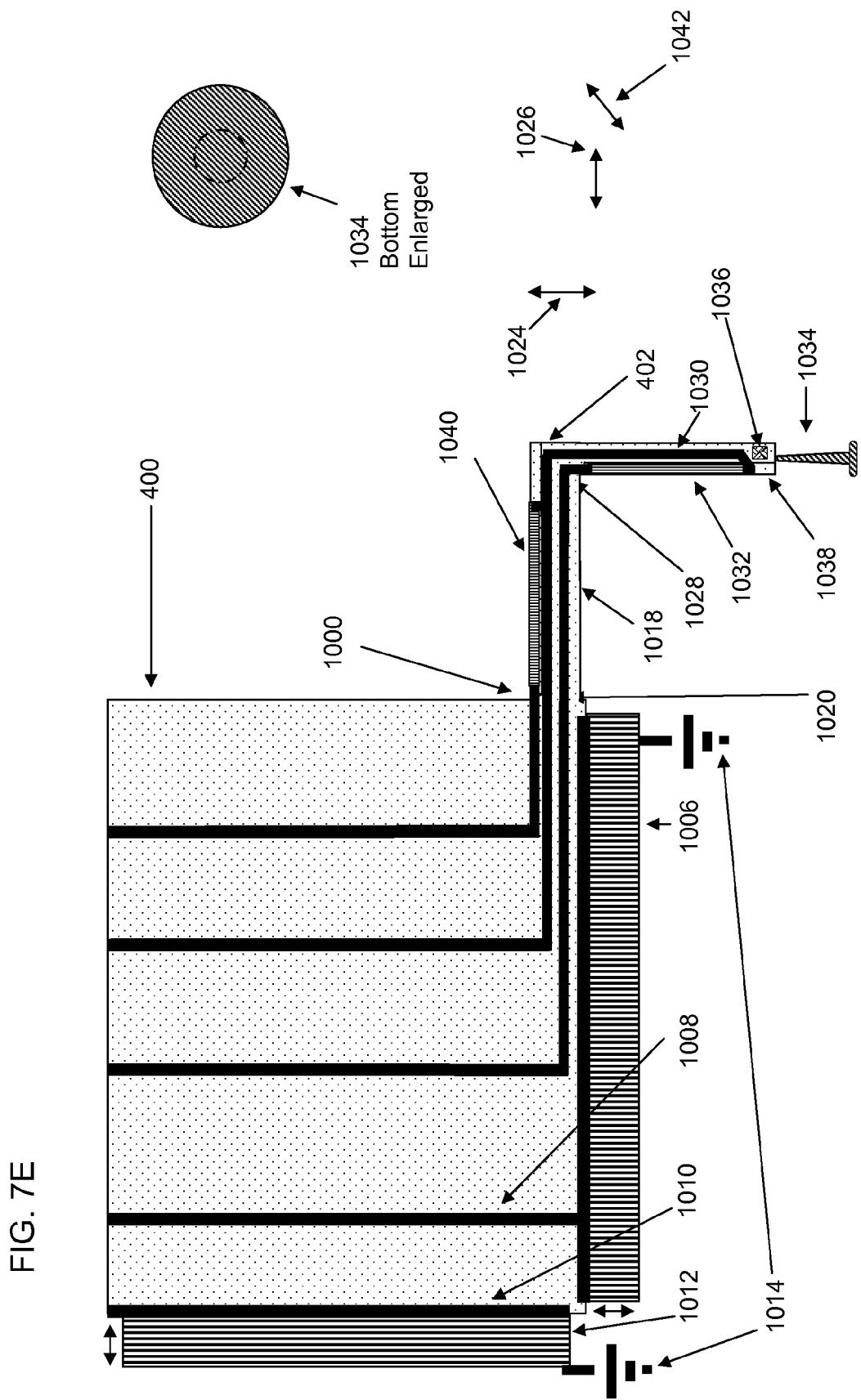
FIG. 7E is a side plan view of the a structure similar to FIG. 7D which includes only two resonant piezoelectric drive perpendicular to each other but on an angled surface which when driven at the appropriate resonant frequency can drive either of two axis or both simultaneously.

FIG. 7E is a variation of FIG. 7D in which the piezoelectric driver (1040) capacitor like structure is placed on an extended angled flat 402 which serves as both a signal surface and a drive mount surface. In this fashion by mixing two sine wave resonant drive frequencies the same piezoelectric driver can excite vibration in two axis z and x at once. Similarly an angled surface (1038) is used to mount the x and y driver (1032) so that by choice of one or more drive frequencies a scan of x and z, x, y and z, or x and y may be obtained. Note that the tip mounting plate area (108) and the cantilever (401) are orthogonal which provides the surfaces required along with the signal reflector (1036) a four faced atomically smooth mirror set self limiting in the 100 silicon chosen for lithographically forming this structure for sensing x and y interactions with the object.

Figure 8A:
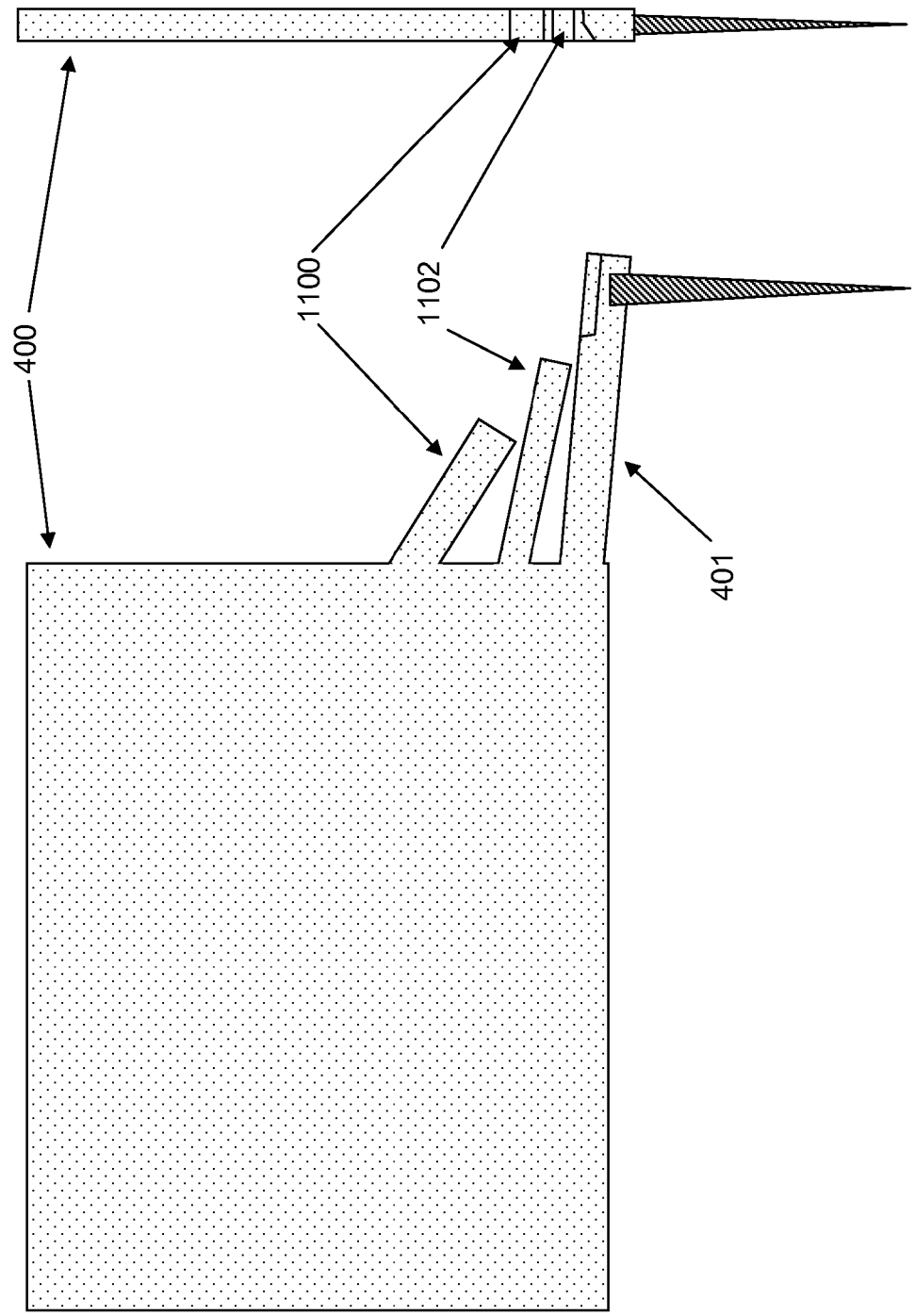
FIG. 8A is a side plan view of a thin tip body, cantilever with tip, secondary cantilever and tertiary cantilever.

FIG. 8A shows in a plan side and end view an example of the lithographically formed multiple stiffness cantilever system in which one or more secondary cantilevers (1102 and 1100) are used to set progressively stiffer behavior of the primary cantilever (401) based on its motion upward toward the secondaries.

Figure 8B:
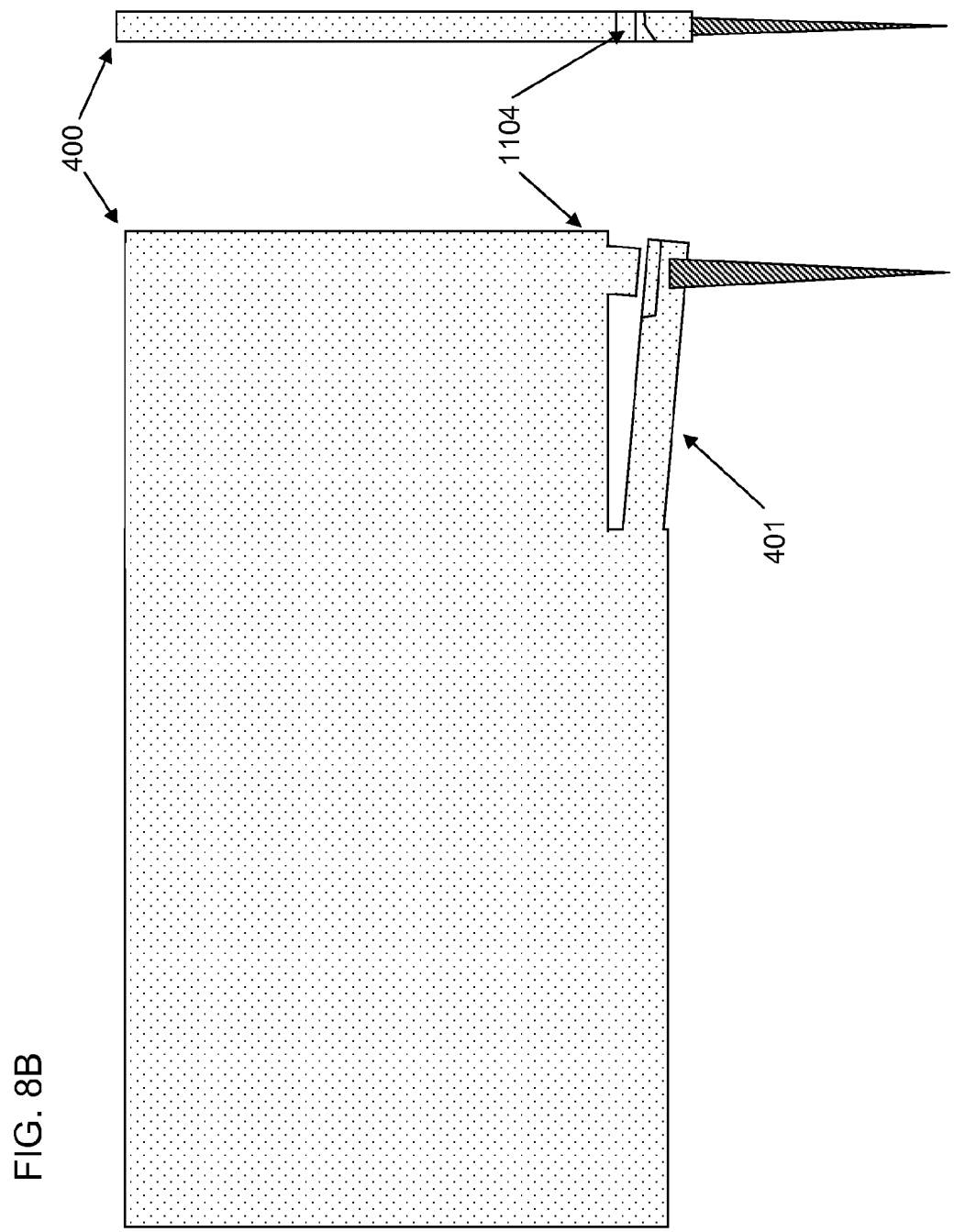
FIG. 8B is a side plan and front plan view of a thin tip body, cantilever with tip, and rigid secondary stop structure.

FIG. 8B shows in a plan side and end view an example of the lithographically formed stepwise rigid cantilever system in which a secondary rigid member (1104) is used to change the behavior of the primary cantilever (401) based on its motion upward from a cantilever to a pinned beam (to further upward motion).

Figure 8C:
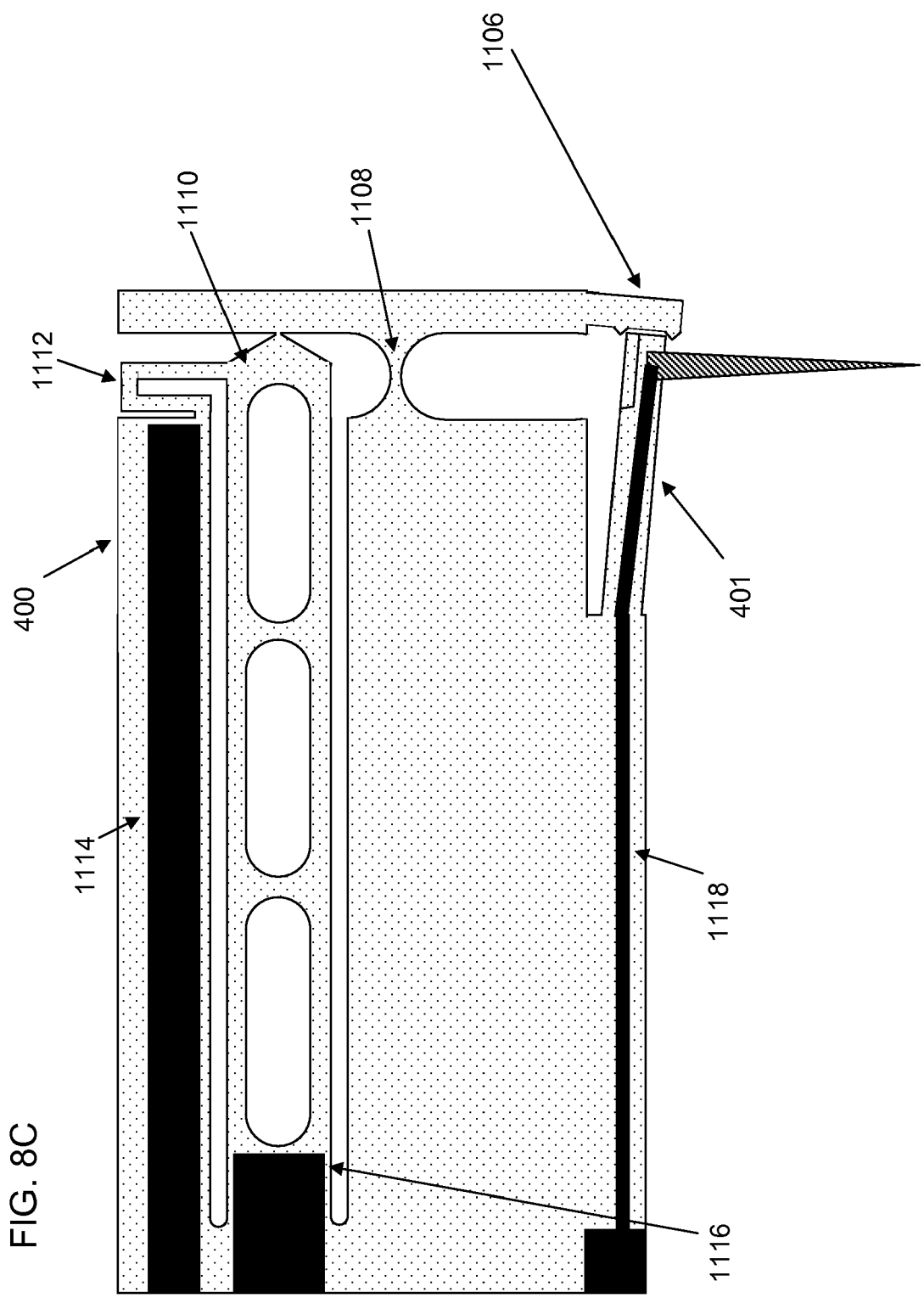
FIG. 8C is a side plan and front plan view of a thin tip body, cantilever with tip, and thermally driven cantilever clamp structure.

FIG. 8C shows in a plan side view an example of the lithographically formed stepwise rigid cantilever system in which a secondary rigid member (1106) is used to change the behavior of the primary cantilever (401) based on the motion of the electrically driven (1114, 1116) thermal actuator (1110) on the walking beam (1106) which clamps the end of the cantilever (401) and changes it from a cantilever to a pinned beam (no further motion in any direction). Electrostatic or piezoelectric drive may also be used to actuate the beam or arranged to directly clamp the cantilever beam end. Note this variation also has a tip electrical connection (1118).

Figure 9A:
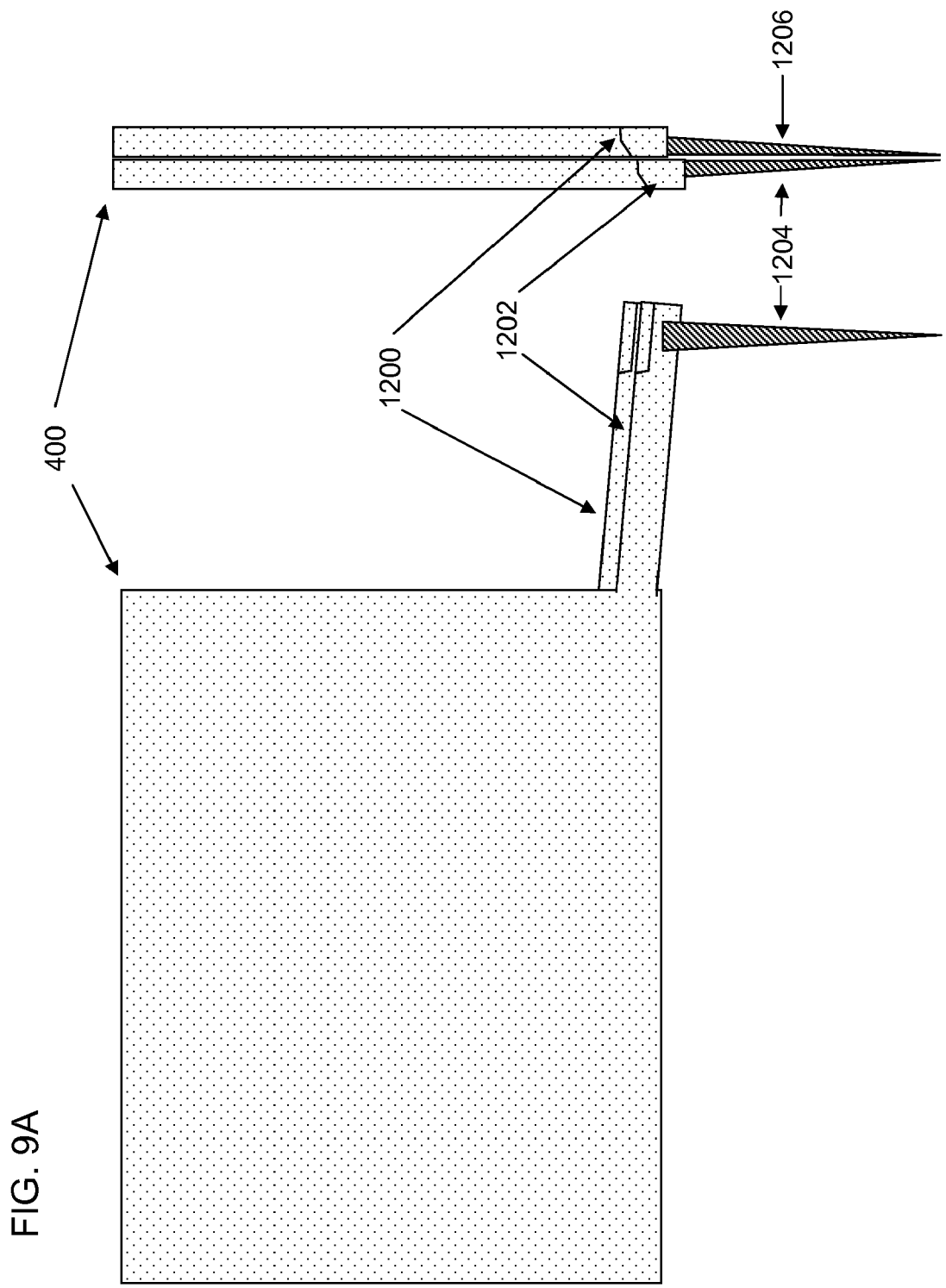
FIG. 9A is a side plan and front plan view of two side by side thin tip bodies, cantilevers with tips.
Figure 9B:
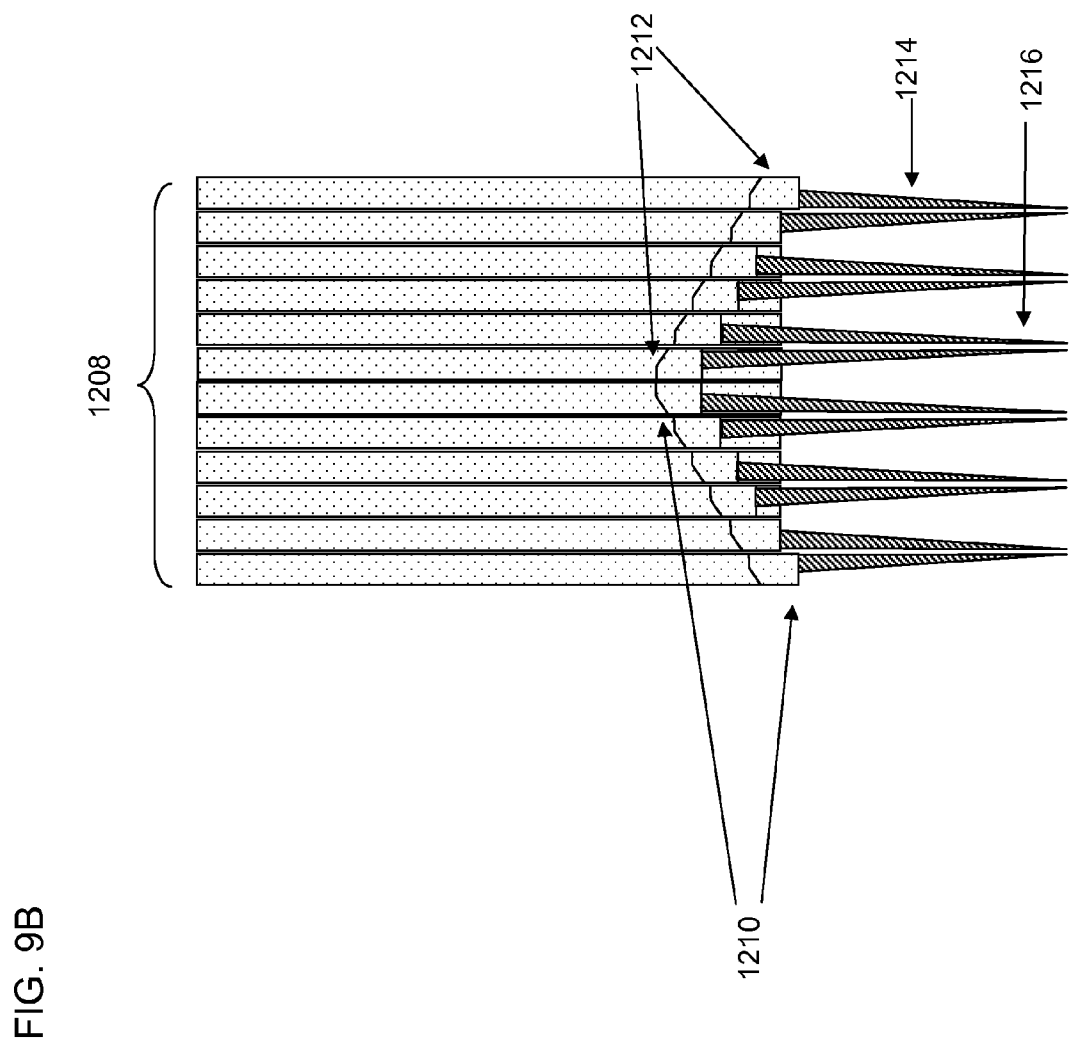
FIG. 9B is a side plan and front plan view of twelve side by side thin tip bodies, cantilevers with tips.
Figure 9C:
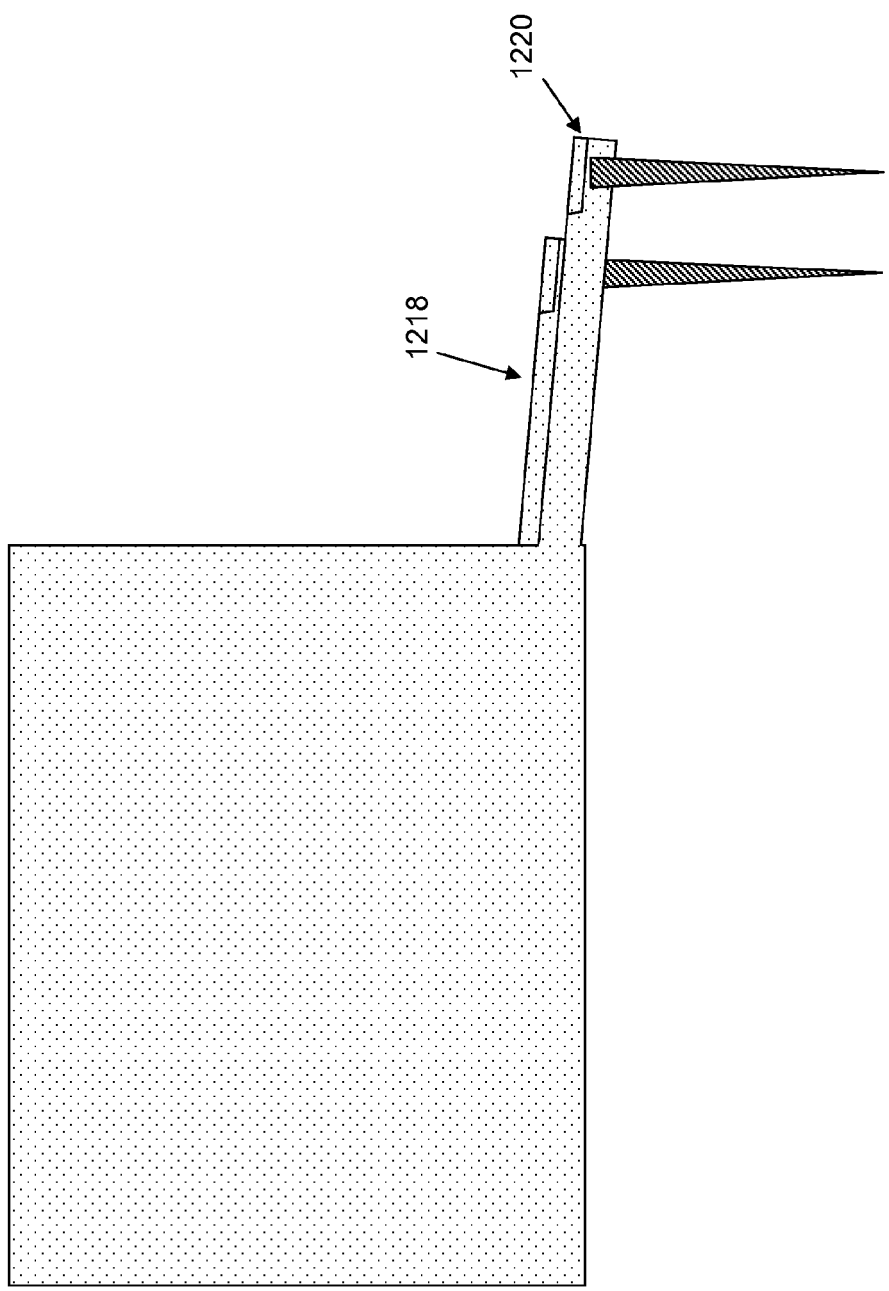
FIG. 9C is a side plan and front plan view of two side by side thin tip bodies, and staggered cantilevers with tips.

FIG. 9A, in plan side view and end view, shows how the thin body (400), cantilever (1200,1202) and tip (1204,1206) may be used to create two or more bonded or clamped arrays of SPMs and further said arrays having the individual signal reflectors staggered in height while the tips themselves are formed to be arbitrarily close to one another. The large variability of design possible with the planar tip assembly fabrication process makes it possible to have hundreds of different individual resonant frequency and other tip characteristics on just a few wafers. FIG. 9B shows an array consisting twelve total components in two rising and descending groups (1210 and 1212) to provide for signal sensing from each side of the array. The plan side view of FIG. 9C sows how the elements of the array may also have variations among the tip assemblies for tip position in the x direction (along the long axis of the cantilever).

Figure 10:
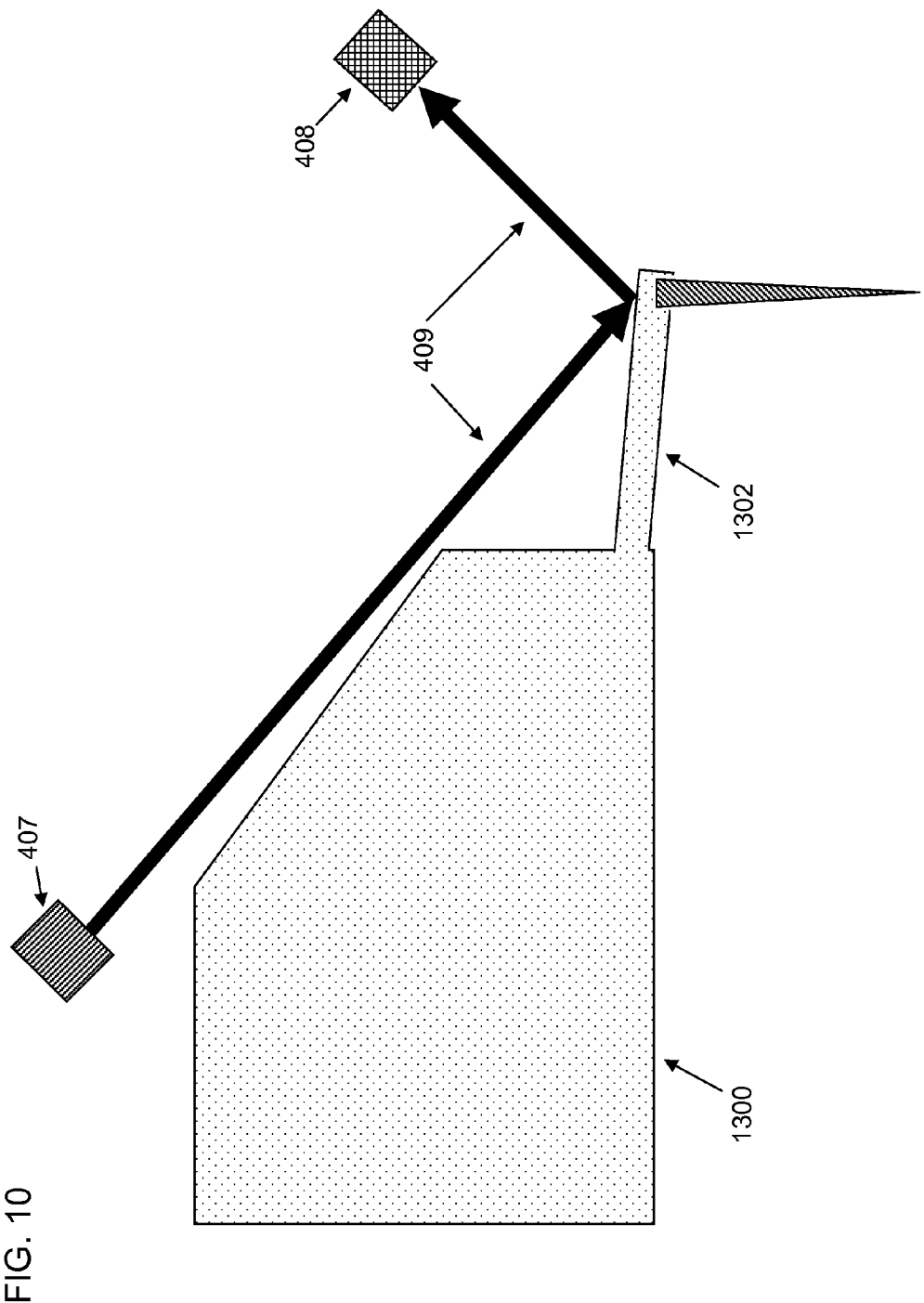
FIG. 10 is a side plan view of a thin tip body relieved for cantilever top laser sensor reflection with laser source, beam and detector.
Figure 11:
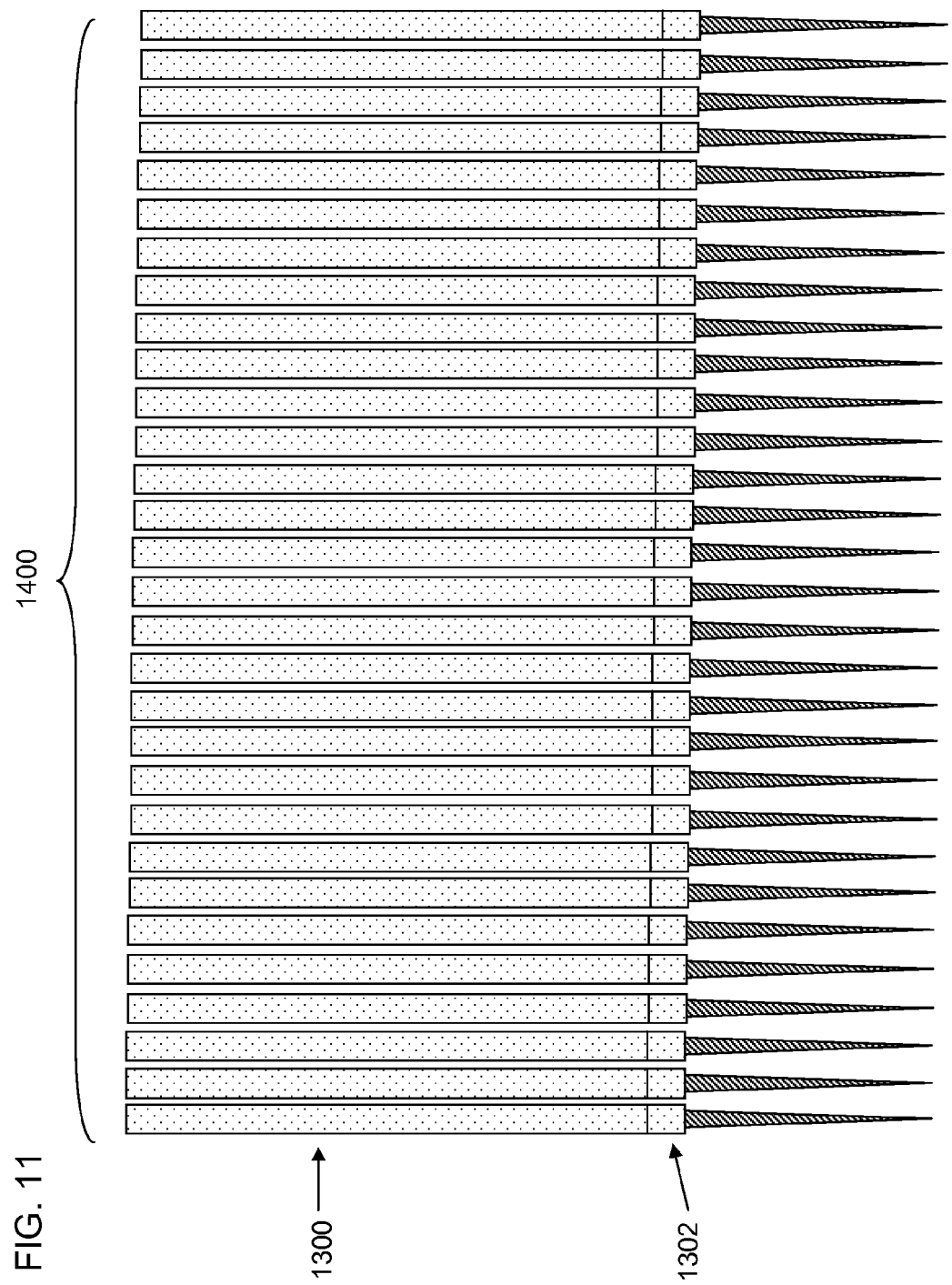
FIG. 11 is a front plan view of 30 thin tip bodies with cantilever top reflectors and tips in an array

FIG. 10 shows a side plan view of a tip assembly (1300 1302) and laser beam (409) source (407) and sensor (408) in which the tip assembly fabrication wafer done in 110 silicon so that the top of cantilever 1302 is an atomically flat reflector surface along its length, while the body has been trimmed at an angle so as not to interfere with the beam path. FIG. 11 shows the tip assembly of FIG. 10 in an array of 30 (1400).

Figure 12A:
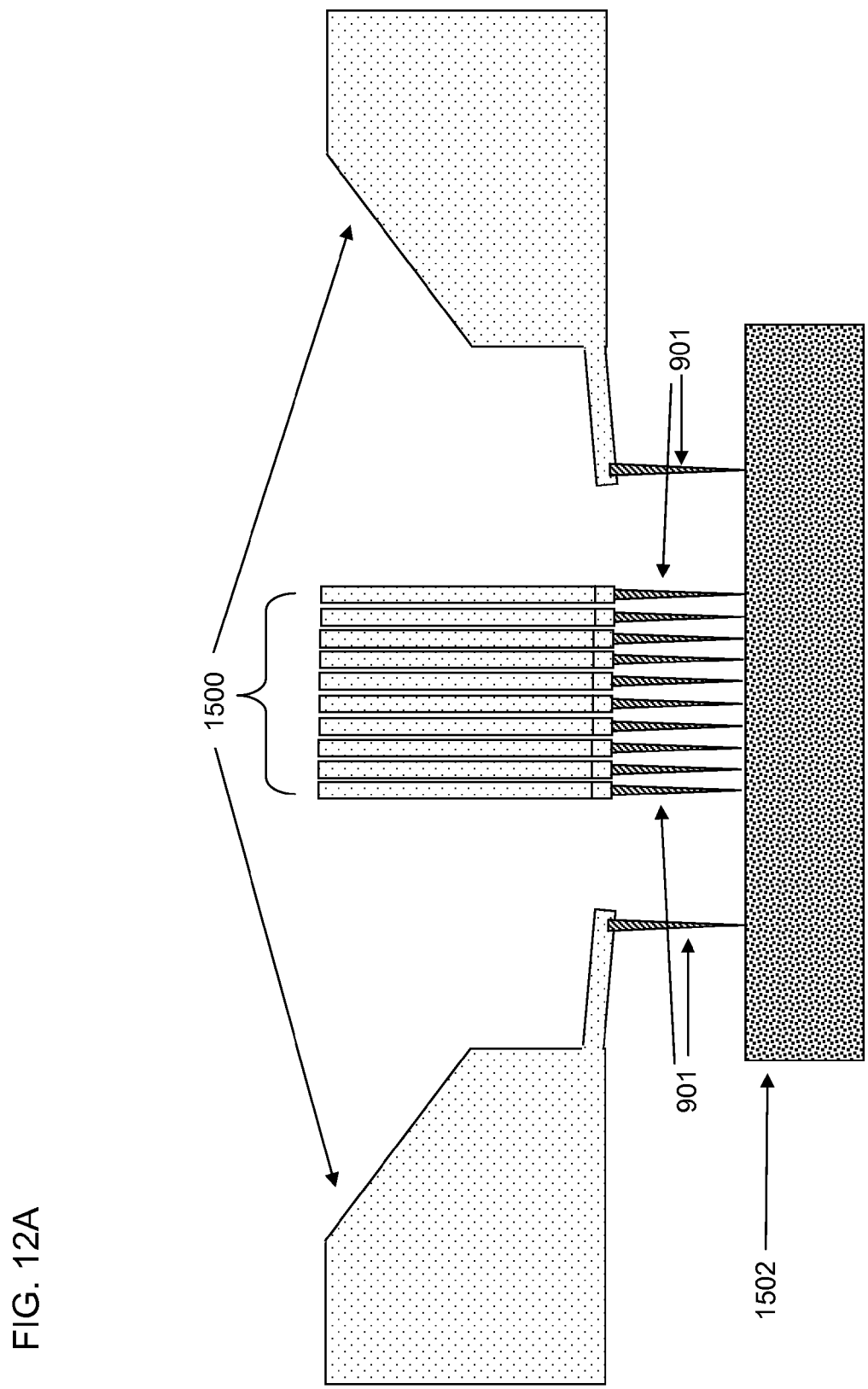
FIG. 12A is a side cross section view of an instrument using four arrays of thin tip bodies, cantilevers and tips to measure or modify and object.
Figure 12B:
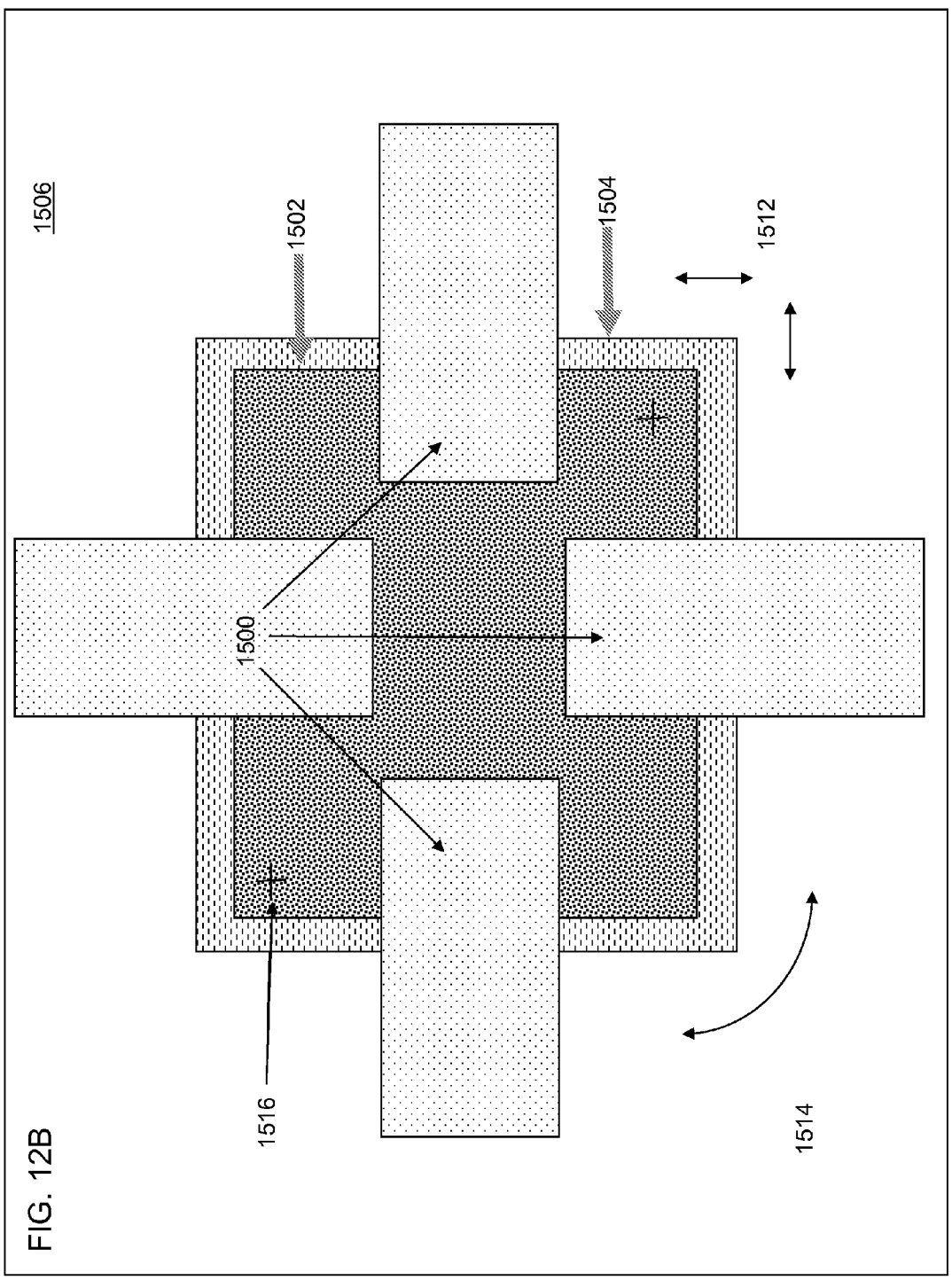
FIG. 12B is a top view of the four arrays, object and object movement stage.
Figure 12C:
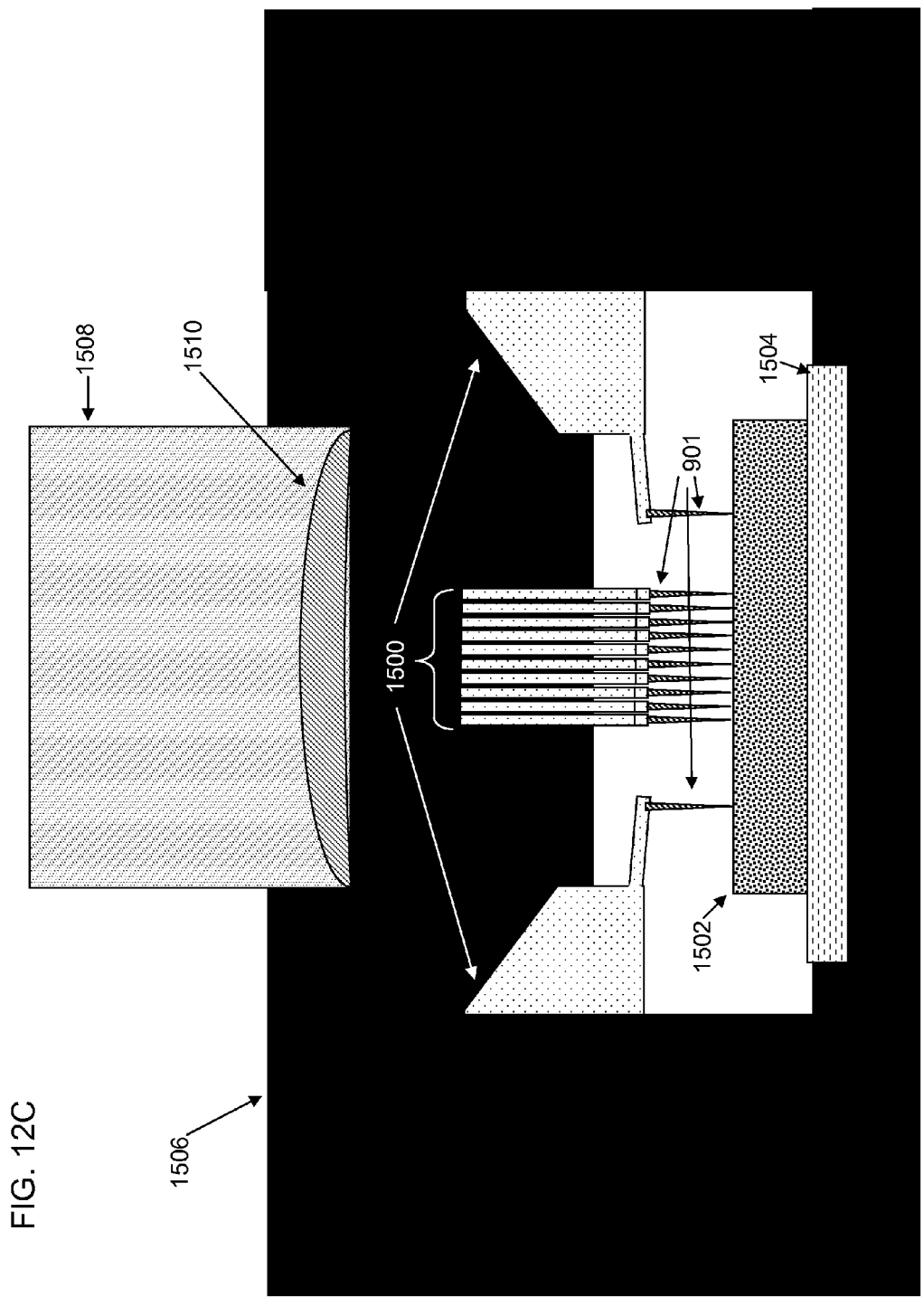
FIG. 12C is a side cross section view of FIG. 12A showing the integrated objective lens and tip array mounting frame.

FIG. 12A shows a cross section view of four sets of arrays (1500) as in FIG. 11 to form an instrument or test array for probing or testing semiconductors or rapidly scanning and/or modifying an objects surface (1502). FIG. 12B is a top plan view of the four arrays (1500), the object (1502) with its reference mark (1516), a positioning stage (1504) capable of positioning the object in x,y, (1512) and theta (rotation 1514). The arrays (1500) are held in bridge structure 1506 and are each postionable in x,y and z. In FIG. 12C the objective (1508 and 1510) used to view the object and the arrays is shown in cross section side view of all the system components.

Figure 13A:
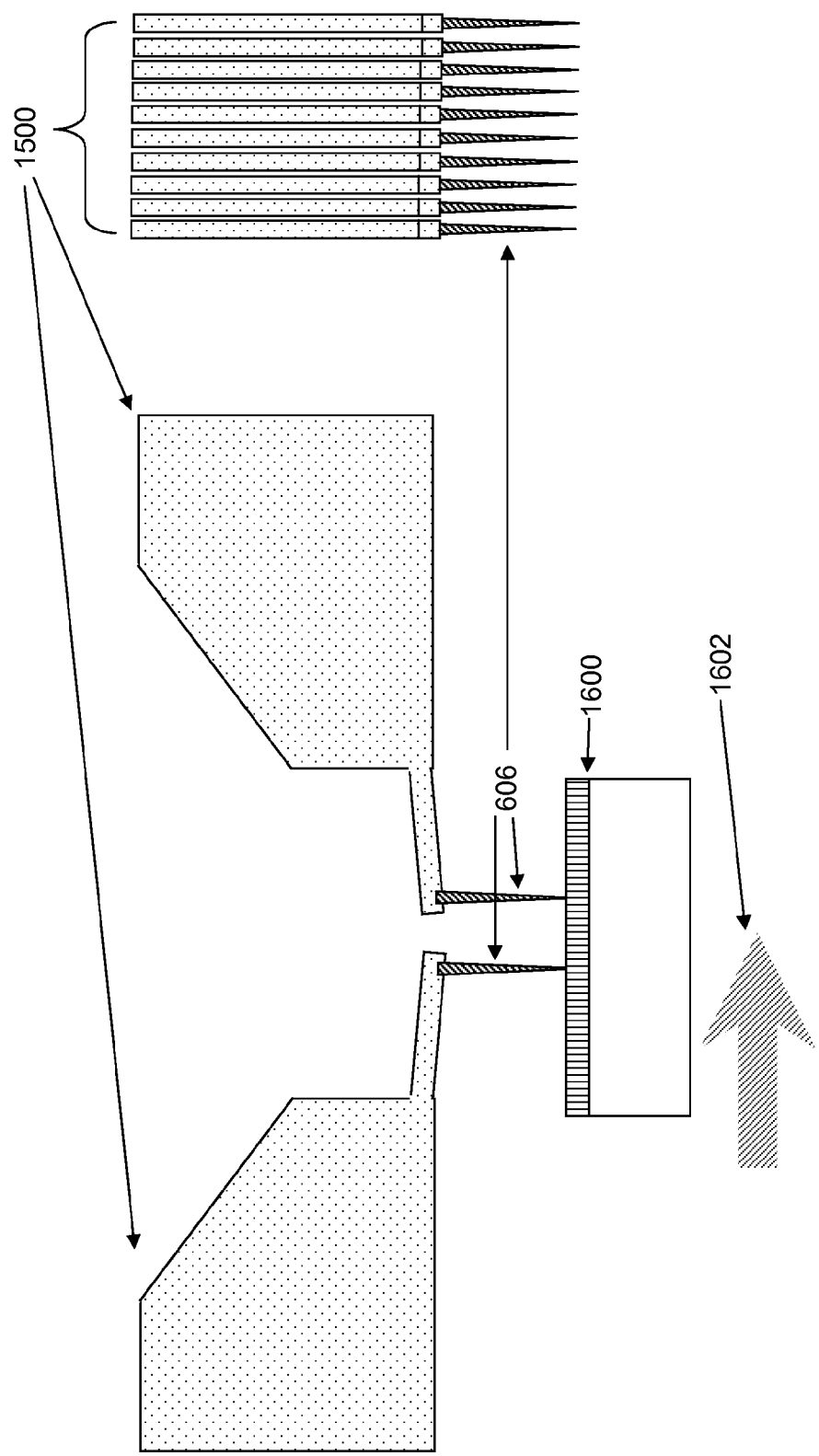
FIG. 13A is a side and front plan view of a two tip array instrument to sense and add or subtract fluid from a multiple well object translated under the arrays.

FIG. 13A is a side cross section view of a system using the arrays of FIGS. 12A-12C, 1500 configured with the fluid delivery tips of FIG. 3A, 606. These tips (606) are arranged in two groups over a chemical or biochemical well (1600) which is translated by a stage or transport means 1602 such that the tip arrays (1500) may be used to add or remove material from the wells as row by row they are transported below the tips.

Figure 13B:
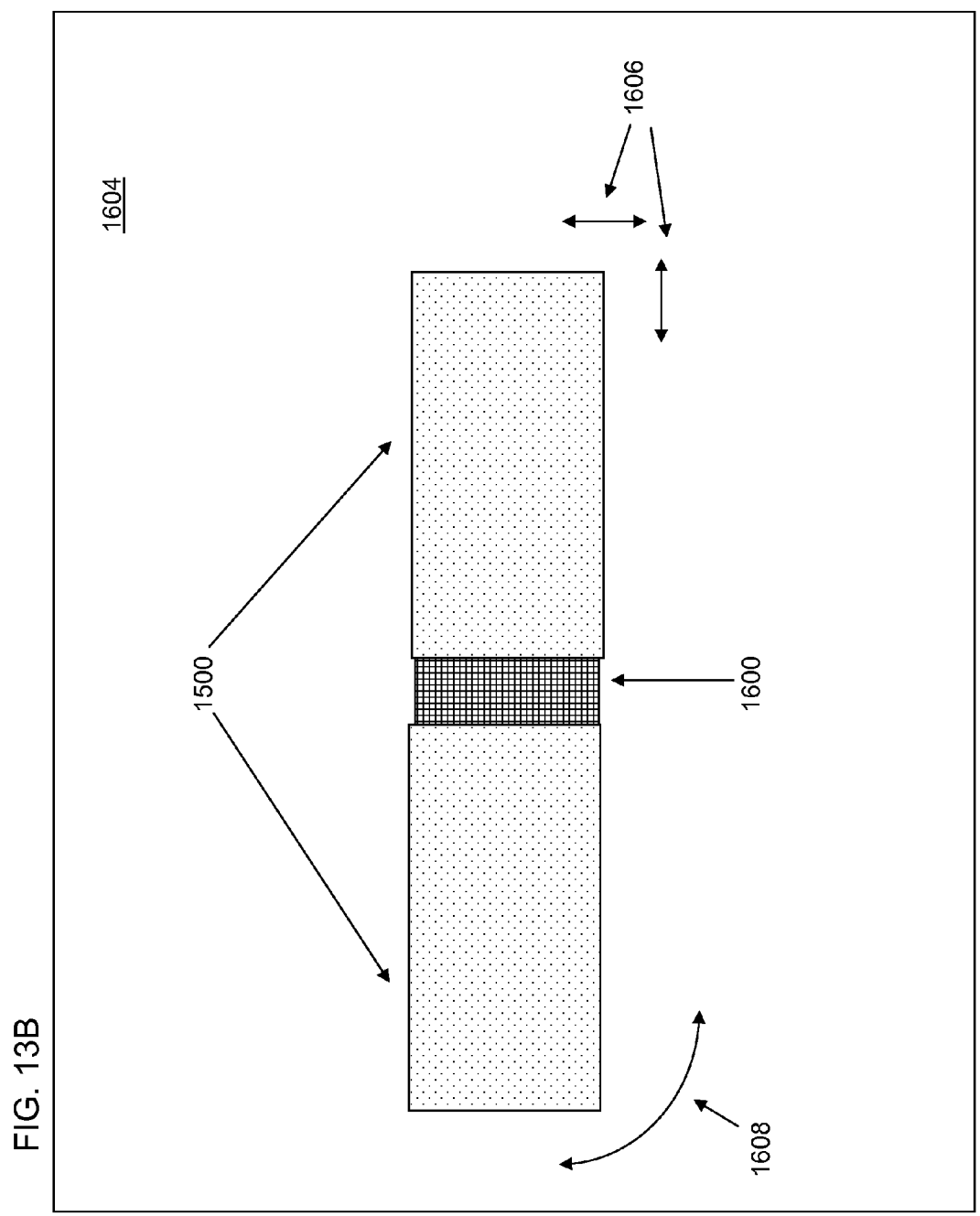
FIG. 13B is a top view of the two arrays, array motion means and the multi-well sample object.

FIG. 13B shows a top view of the arrays (1500) held in a frame (1604) in which the two array groups may be translated (1606) in x,y or z or rotated (1608) as a group with respect to each other and the wells (1600). FIG. 13C is a side cross section view showing the frame (1604), well (1600) translation means (1602), arrays (1500) and fluid tips (606).

Figure 14A:
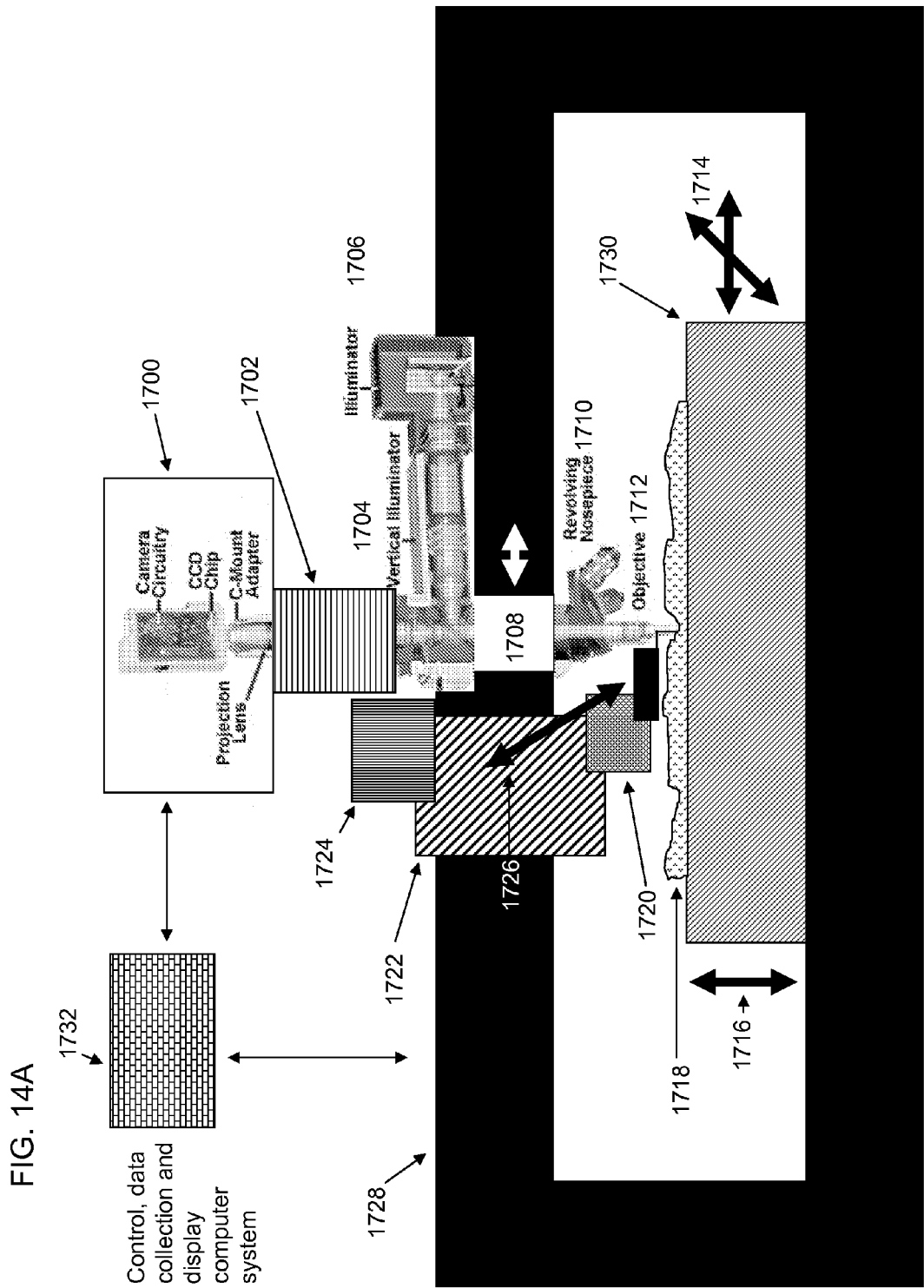
FIG. 14A is a front plan view of a complete integrated Confocal optical and AFM imaging system with tip in place beneath the optical objective.

FIG. 14A shows a complete integrated Confocal/AFM/SPM system including Control and display computer (1732), SPM head (1722), automatic Tip Assembly Change Unit (1724), Rigid low noise Bridge and Stand (1728), Nipkow Disc Optical subsystem (1700, 1702, 1704, 1706 1708, 1710, 1712) consisting of Camera and electronic interface (1700), Nipkow disk unit (1702), Vertical Illuminator (1704), bridge mount and translation means (1708), Revolving Nosepiece (1710), and Objectives (1712), a tip assembly mount and connection means (1720), a Tip assembly change translation means (1726), a stage 1730 and stage translation means (1714 and 1716).

Figure 14B:
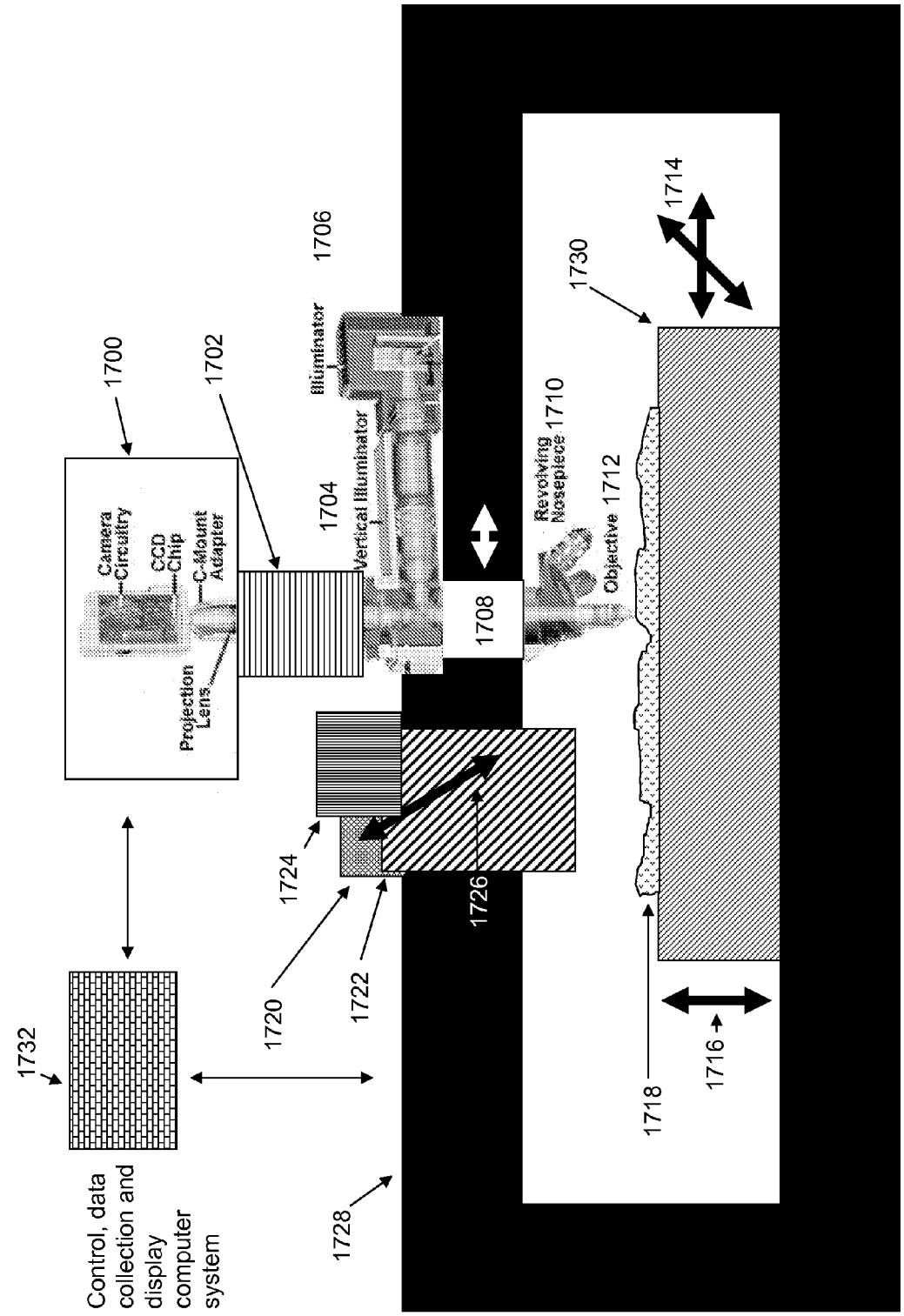
FIG. 14B is a front plan view of a complete integrated Confocal optical and AFM imaging system with tip withdrawn to load position and the optical objective and column displaced to the right.

In operation an object (1718) is placed on the stage (1730) as shown in FIG. 14B with the confocal system moved precisely to the right and the tip assembly withdrawn to the tip change position. The object (1718) is scanned and a surface map of the object is created at a magnification selected by the operator. After the operator selects the working magnification a tip assembly is selected to match the characteristics of the selected confocal objective (including matching working distance, aperture, resolution and type of SPM measurement—example AFM (atomic force microscopy) or MFM (magnetic force microscopy)). Once selected the operator positions the optical microscope over the region to image with the SPM while observing both the surface and SPM tip by doing a confocal scan over just those z sections of the object that include the immediate surface and the tip which is some small increment above the surface based on the initial surface map. The SPM then images the surface and with the high resolution image of the SPM parameters measured (height, true surface profile in x,y and z, i.e. a surface profile which includes more then one triplet of measures for every point in the 2D plane of the stage, magnetic domains, electrical charge distribution, nonsocial spectrophotometer map. This may be done for more then one parameter and final a multi-layer space is created for viewing by the operator having all the dimensions (parameters) that have been selected for the system.

In another embodiment the instrument operation may be automatic and follow a particular profile in order to perform a specific set of measurements for process control, operational testing or biological or chemical identification.

Figure 14C:
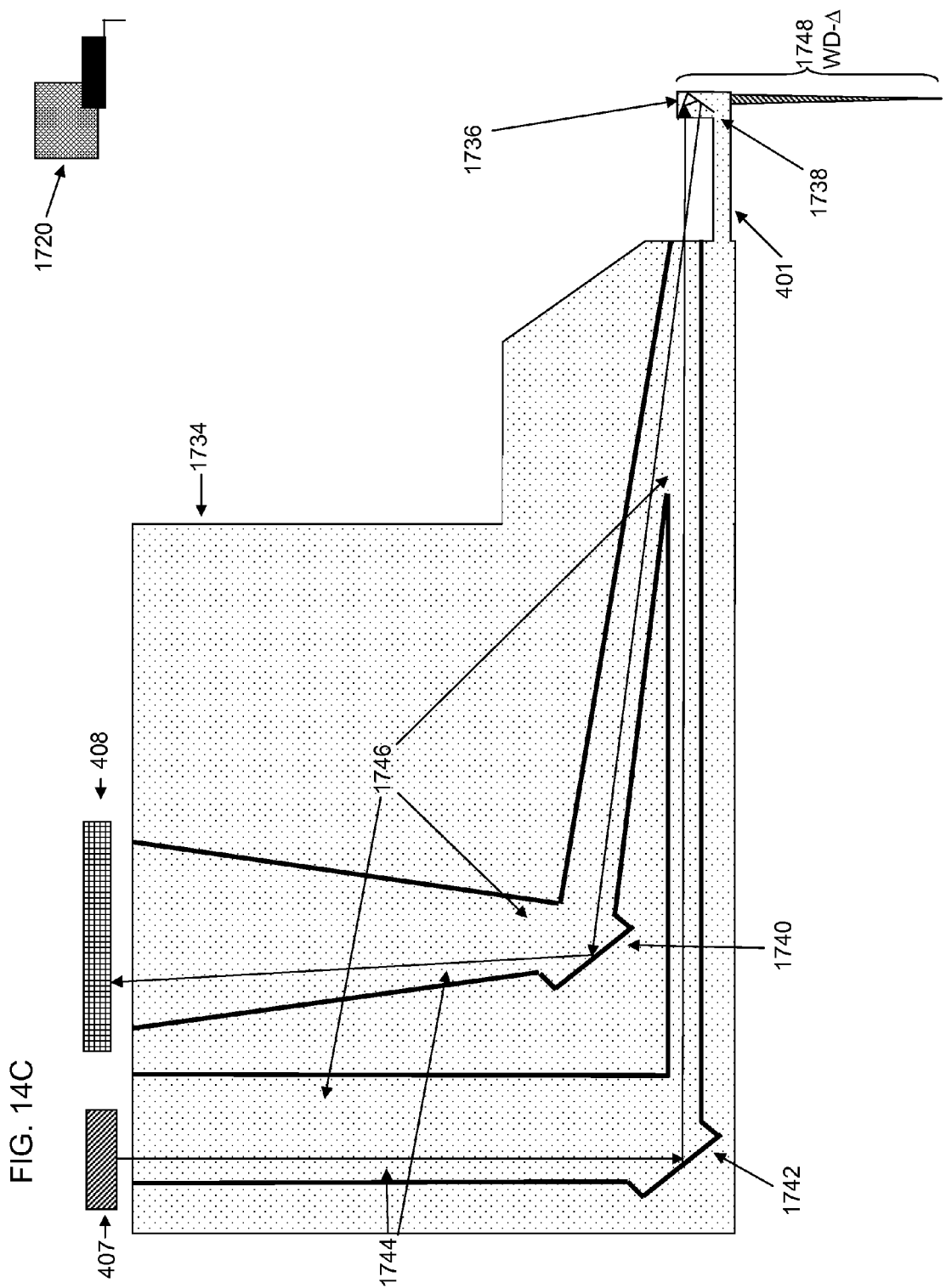
FIG. 14C is side plan view of one of a family of cantilevers, tips and bodies each designed to function with a specific objective of a given optical working distance and with a folded laser optical path incorporated into the body.

FIG. 14C is one embodiment of the laser based signal detection system. Since each Tip assembly is mechanically different in order to match the optical objective performance it is desirable to have the cantilever sense system built in such a way that it is consistent for these varying mechanical configurations. In FIG. 14C a fixed laser light source (407) produces a beam (1744) which is contained in a formed channel (1746) and directed by optical reflecting, diffracting or refracting surfaces (1742) formed by lithographic patterning and wet, dry etching or other means as described herein to the tip end of the cantilever (401) where a component (1736) directs it to another component (1738) and through another channel (1746) to yet another component (1740) and then out to the fixed sensor (408). The system then has the same input and output elements for every tip assembly.

Figure 14D:
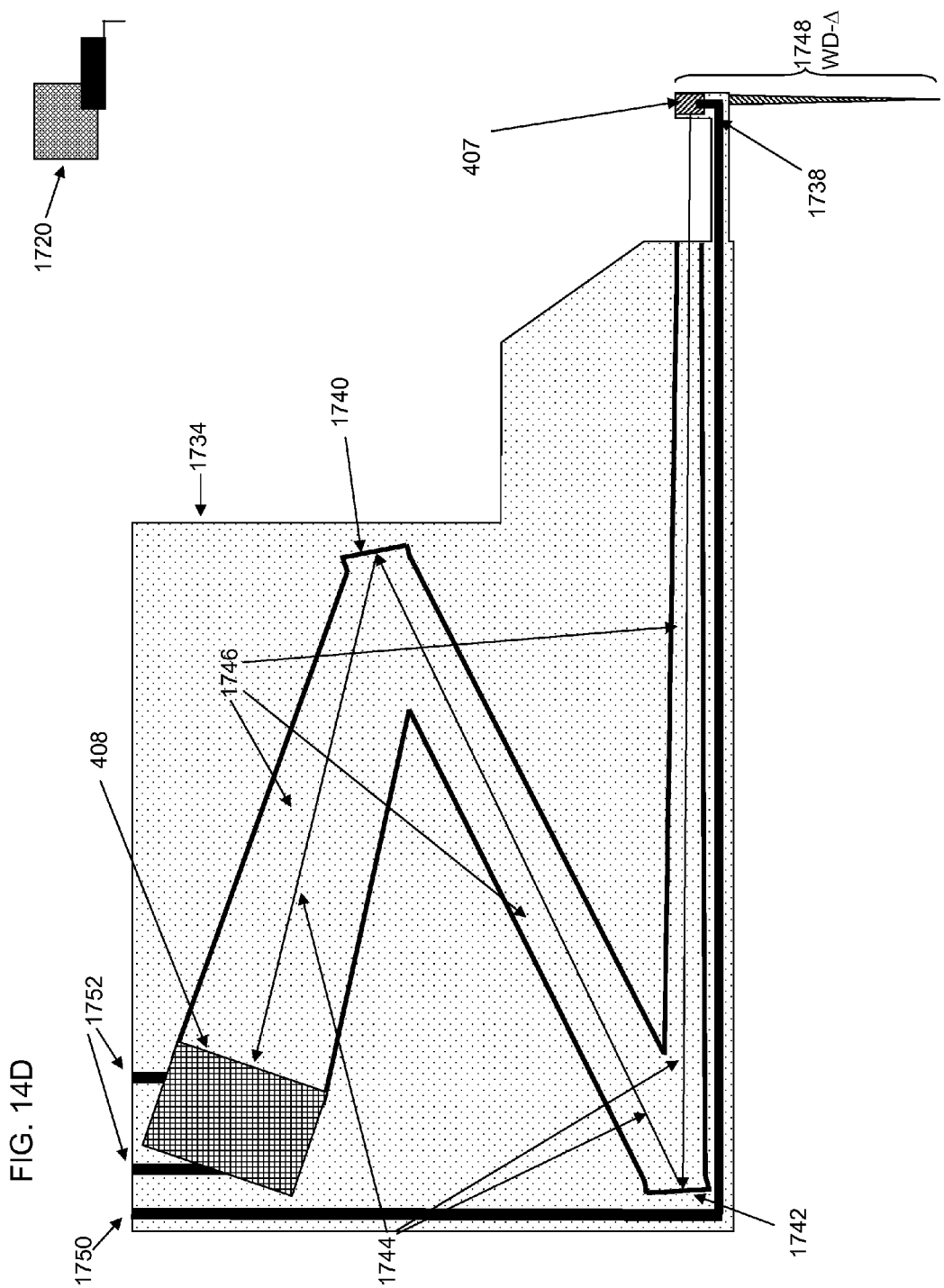
FIG. 14D is side plan view of one of a family of cantilevers, tips and bodies each designed to function with a specific objective of a given optical working distance and with a folded laser optical path and light emitter and detector incorporated into the body.

In an alternative embodiment, FIG. 14D, the fact that many SPM tip assemblies require electrical connections strongly suggests that some embodiments may include only electrical connections and have the light emitter or laser (407) integrated on board the SPM Tip assembly in which a long folded path provides substantial signal amplification when delivered to the on board sensor (408). The light beam (1744) traverses a recessed path to two optical components (1742) and (1740) before reaching 408 the reduction in optical surfaces also reduces signal losses.

The optical surfaces used in FIG. 14C and FIG. 14D may be partly or wholly made by arranging the vertical sides of the wet etch 110 silicon pits and then positioning the wafer planar axis (the wafer flat) so as to form those surfaces at the desired angles to control the beam propagation.

It should also be noted that many of the tool tips described herein have lengths exceeding 80 microns. For instance, with reference to FIG. 2C, tip 403 is described as having length of 250 microns; with reference to FIG. 2E, tip 403 is described as having length of 100 microns. It will be appreciated that even longer tips are possible, with lengths up to several millimeters; even the longest tips can have widths of tens of microns.

Although the invention has been described in terms of the illustrative embodiments, it will be appreciated by those skilled in the art that various changes and modifications may be made to the illustrative embodiments without departing from the spirit or scope of the invention.

Therefore, the above description should not be taken as limiting the scope of the invention as defined by the claims.

REFERENCES

The following U.S. patents by the inventor of the present application are incorporated by reference:
U.S. Pat. No. 6,507,533;
U.S. Pat. No. 6,353,219;
U.S. Pat. No. 6,339,217;
U.S. Pat. No. 6,337,479;
U.S. Pat. No. 6,265,711;
U.S. Pat. No. 6,252,226;
U.S. Pat. No. 6,242,734;
U.S. Pat. No. 6,232,597;
U.S. Pat. No. 5,756,997;
U.S. Pat. No. 5,751,683;
U.S. Pat. No. 5,377,552;
U.S. Pat. No. 5,239,297;
U.S. Pat. No. 4,935,728;
U.S. Pat. No. 4,806,776;
U.S. Pat. No. 4,782,327;
U.S. Pat. No. 4,604,648;
U.S. Pat. No. 4,589,030;
U.S. Pat. No. 4,561,731;
U.S. Pat. No. 4,435,616; and
U.S. Pat. No. 4,403,834.

What is claimed is:

1. An SPM tip assembly including:
a body, a cantilever, and a tip arranged in a configuration, wherein the body, the cantilever and the tip are made entirely from a material in which the configuration is created in a plane having two axes, wherein the z axis or principal axis of motion is one of the two axes.

2. An SPM tip assembly as in claim 1 wherein the width of the cantilever and length of the tip permit the end of the tip and object area adjacent to it to be imaged while the tip is in or near the central axis or in the field of view of an imaging system.

3. An SPM tip assembly as in claim 1 wherein a mold or mandrel structure depends from an end of the cantilever and is used to mold, form or create a tip shaft or entire tip of diamond, sapphire, silicon nitride, silicon, quartz, compound semiconductor, magnetic material, silicon carbide, carbon nanotubes, boron nanotubes, tungsten, any noble metal, any metal carbide, and/or cubic boron nitride.

4. An SPM tip assembly as in claim 1 wherein a piezoelectric drive component is attached to any or all of the cantilever, or tip structure to resonate the device in any or all of the x,y, or z directions.

5. An SPM tip assembly as in claim 4 wherein the piezoelectric drive component is placed on an angled surface so as to drive resonance in two axes at once and wherein the resonant frequencies are chosen by design to be different in each axis.

6. An SPM tip assembly as in claim 1 wherein an electrical connection is made to a shaft of the tip and/or an end of the tip.

7. An SPM tip assembly as in claim 1 further including one or more secondary cantilevers usable in conjunction with upward motion of the primary cantilever to increase the cantilever stiffness to upward force.

8. An SPM tip assembly as in claim 1 wherein two or more planar tip assemblies are used to form an array of tip assemblies.

9. An SPM tip assembly as in claim 1 further including an angled or planar reflector near an end of the cantilever, wherein the angled or planar reflector is made from an atomic crystal plane of the material of a wafer being structured.

10. An SPM tip assembly as in claim 9 wherein the plane material is crystalline silicon oriented 100 or 110.

11. An SPM tip assembly as in claim 1 wherein the configuration is created in a die of a wafer of the material and wherein the tip to cantilever angle is independently configurable for each die on the wafer.

12. An SPM tip assembly as in claim 1 wherein the tip has a length greater than 80 microns.

* * * * *